US008855885B2

(12) United States Patent
Takenaka

(10) Patent No.: US 8,855,885 B2
(45) Date of Patent: Oct. 7, 2014

(54) DEVICE FOR ESTIMATING STATE QUANTITY OF SKID MOTION OF VEHICLE

(75) Inventor: Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 276 days.

(21) Appl. No.: 13/258,143

(22) PCT Filed: Mar. 26, 2010

(86) PCT No.: PCT/JP2010/055377
§ 371 (c)(1),
(2), (4) Date: Sep. 21, 2011

(87) PCT Pub. No.: WO2010/113799
PCT Pub. Date: Oct. 7, 2010

(65) Prior Publication Data
US 2012/0016646 A1 Jan. 19, 2012

(30) Foreign Application Priority Data

Mar. 30, 2009 (JP) ................................. 2009-083630
Mar. 30, 2009 (JP) ................................. 2009-083635

(51) Int. Cl.
B60T 8/24 (2006.01)
B60T 7/12 (2006.01)
(Continued)

(52) U.S. Cl.
CPC ..... B60W 40/101 (2013.01); B60W 2050/0025 (2013.01); B60W 40/076 (2013.01); B60W 2520/14 (2013.01); B60W 2520/28 (2013.01); B60W 2050/0031 (2013.01); B60W 2520/30 (2013.01); B60W 2050/0024 (2013.01); B60T 2270/86 (2013.01); B60W 2520/10 (2013.01); B60T 8/17551 (2013.01); B60W 2720/125 (2013.01); B60W 2050/0054 (2013.01); B60T 8/172 (2013.01); B60W 2520/125 (2013.01); B60T 2230/02 (2013.01)
USPC ................................... 701/72; 703/2; 701/80

(58) Field of Classification Search
None
See application file for complete search history.

(56) References Cited

U.S. PATENT DOCUMENTS 5,471,388 A * 11/1995 Zomotor et al. ................. 701/36
5,671,982 A * 9/1997 Wanke ........................... 303/146
(Continued)

FOREIGN PATENT DOCUMENTS

EP 0781695 7/1997
EP 1775188 4/2007
(Continued)

OTHER PUBLICATIONS

Lee, Hyung-Jik, and Jung, Seul, "Gyro Sensor Drift Compensation by Kalman Filter to Control a Mobile Inverted Pendulum Robot System," IEEE International Conference on Industrial Technology, (Feb. 10-13, 2009), ICIT 2009, pp. 1-6.*
(Continued)

Primary Examiner — Kamini S Shah
Assistant Examiner — David M Rogers
(74) Attorney, Agent, or Firm — Rankin, Hill & Clark LLP

(57) ABSTRACT

A device for estimating the state quantity of a skid motion of a vehicle is provided with an element which finds road surface reaction force model values of respective wheels and a skid motion state quantity model value using a vehicle model including a friction characteristic model between the wheels and the road surface, an element which finds the deviation between the lateral acceleration model value generated in a predetermined position of the vehicle by the resultant force of the road surface reaction force model values and the lateral acceleration detected value indicated by the output of an actual lateral acceleration detecting means, and an element which determines, as the estimated value of the skid motion state quantity, a value obtained by adding a value obtained by passing the deviation through a filter having a high-cut characteristic to the skid motion state quantity model value.

10 Claims, 18 Drawing Sheets

(51) Int. Cl.

| | | |
|---|---|---|
| G06F 7/00 | (2006.01) | |
| G06F 17/00 | (2006.01) | |
| G05D 1/00 | (2006.01) | |
| B60T 8/1755 | (2006.01) | |
| B60T 8/172 | (2006.01) | |
| B60W 40/101 | (2012.01) | |
| B60W 50/00 | (2006.01) | |
| B60W 40/076 | (2012.01) | |

(56) References Cited

U.S. PATENT DOCUMENTS

| | | | | |
|---|---|---|---|---|
| 5,711,024 A | * | 1/1998 | Wanke | 303/146 |
| 5,735,584 A | * | 4/1998 | Eckert | 303/140 |
| 5,774,821 A | * | 6/1998 | Eckert | 303/140 |
| 6,015,192 A | * | 1/2000 | Fukumura | 303/140 |
| 6,195,606 B1 | * | 2/2001 | Barta et al. | 701/70 |
| 7,035,725 B1 | * | 4/2006 | Park et al. | 701/71 |
| 2001/0041957 A1 | * | 11/2001 | McCann et al. | 701/41 |
| 2005/0071061 A1 | * | 3/2005 | Kato et al. | 701/41 |
| 2005/0182548 A1 | * | 8/2005 | Bernzen et al. | 701/70 |
| 2005/0216155 A1 | * | 9/2005 | Kato et al. | 701/41 |
| 2006/0080016 A1 | * | 4/2006 | Kasahara et al. | 701/41 |
| 2006/0273657 A1 | | 12/2006 | Wanke et al. | |
| 2009/0043473 A1 | * | 2/2009 | Nakai et al. | 701/70 |
| 2009/0043474 A1 | * | 2/2009 | Nakai et al. | 701/70 |
| 2009/0048751 A1 | * | 2/2009 | Nakai et al. | 701/70 |

FOREIGN PATENT DOCUMENTS

| | | |
|---|---|---|
| EP | 1873033 | 1/2008 |
| EP | 1892175 | 2/2008 |
| EP | 1950114 | 7/2008 |
| JP | 05-338461 | 12/1993 |
| JP | 08-295216 | 11/1996 |
| JP | 2000-025599 | 1/2000 |
| WO | 9616848 | 6/1996 |
| WO | 2005042321 | 5/2005 |

OTHER PUBLICATIONS

European Search Report dated Apr. 16, 2013, three pages.

* cited by examiner

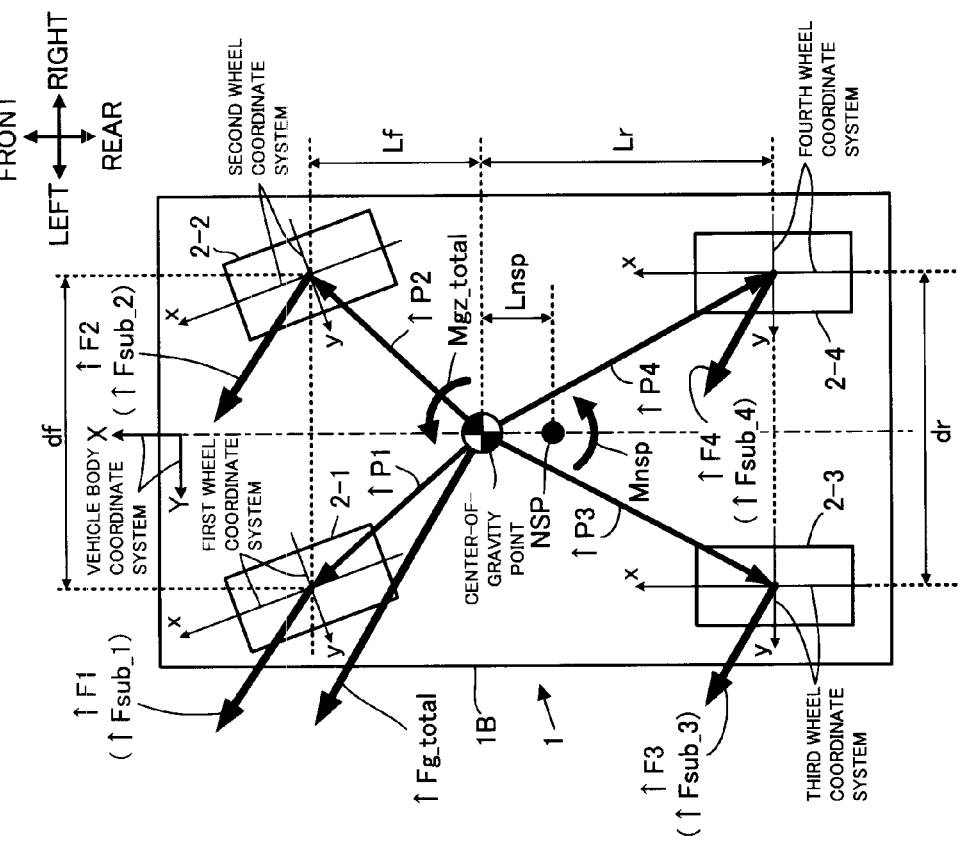
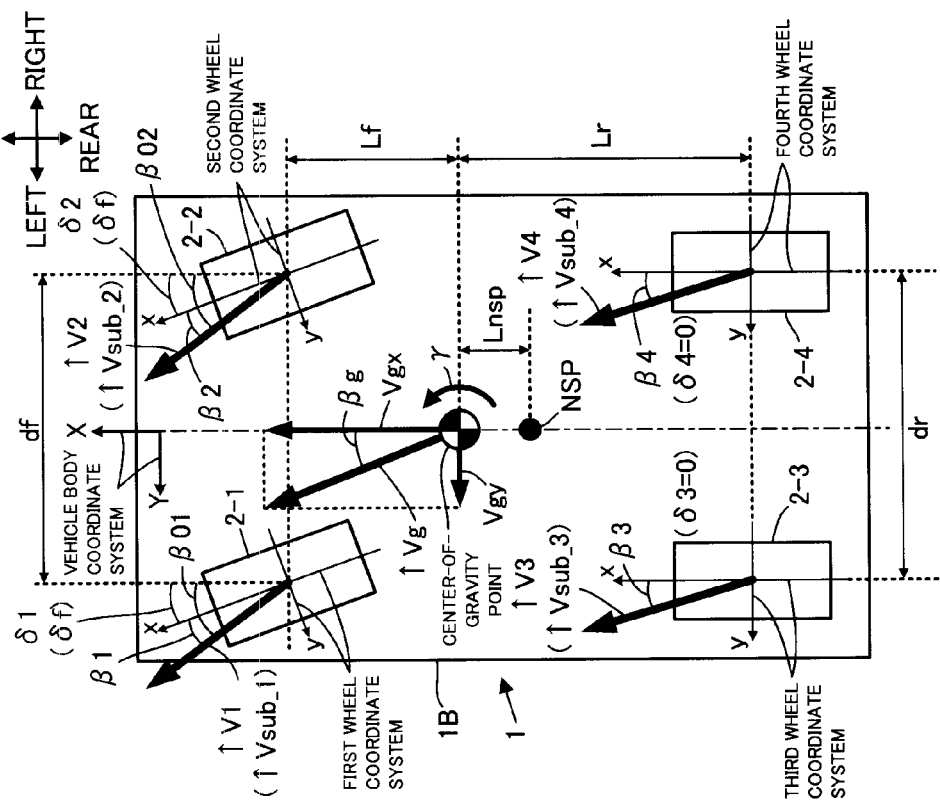
FIG.2(a)
FIG.2(b)

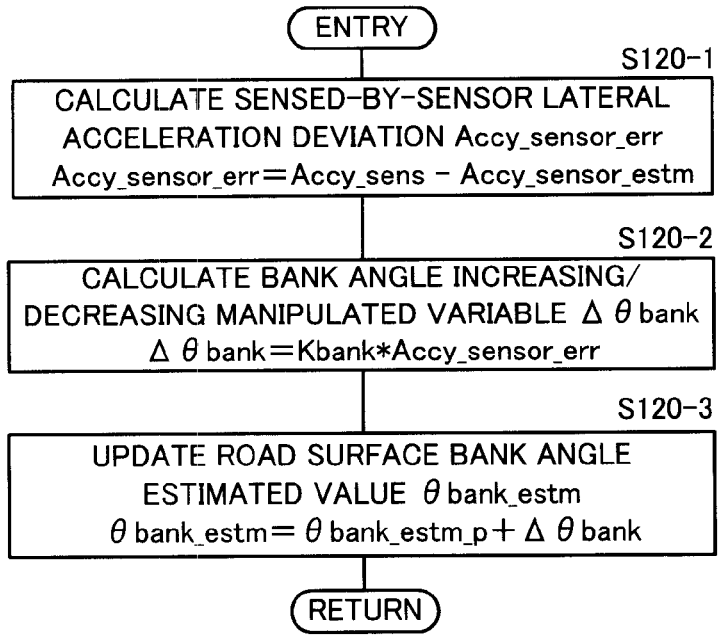
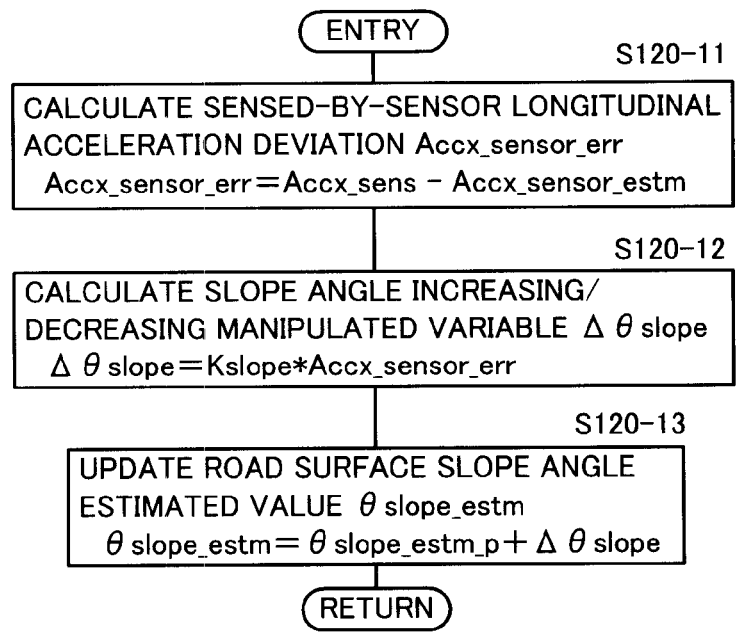

DEVICE FOR ESTIMATING STATE QUANTITY OF SKID MOTION OF VEHICLE

TECHNICAL FIELD

The present invention relates to a device for estimating the state quantity of a skid motion of a vehicle that estimates the skid angle or skid speed of the center of gravity of the vehicle as the state quantity of the skid motion of the vehicle.

BACKGROUND ART

In some cases, it is necessary to estimate the state quantity of a skid motion of a vehicle such as the skid angle or skid speed of the center of gravity of the vehicle for behavior control or the like of the vehicle. Then, as the estimation technique thereof, there has been known a technique disclosed in, for example, Japanese Patent No. 3669668 (hereinafter, referred to as Patent Document 1). According to this technique, a road surface reaction force (friction force) acting on each wheel of the vehicle from a road surface is estimated by using the estimated value of the friction coefficient and a friction characteristic model of the wheel while estimating the friction coefficient of the road surface. Then, the lateral acceleration of the center of gravity of the vehicle, which is dynamically generated, is estimated on the basis of the total sum of forces in the lateral direction of the vehicle (resultant force) of the estimated road surface reaction force. Further, the temporal change rate of the skid angle of the center of gravity of the vehicle is estimated on the basis of the dynamic motion model of the vehicle from the estimated value of the lateral acceleration, the detected value of the vehicle speed, and the detected value of the yaw rate of the vehicle. The estimated value of the skid angle of the center of gravity of the vehicle is found by integrating the temporal change rate.

In the technique of estimating the road surface reaction force (friction force) acting on each wheel of the vehicle and estimating the state quantity of the skid motion of the vehicle by computing a dynamic motion model on the basis of the estimated value of the road surface reaction force as disclosed in Patent Document 1, the estimated value of the road surface reaction force affects the estimated value of the state quantity of the skid motion of the vehicle as a result.

Further, the estimated value of the road surface reaction force is susceptible to the effect of the nonlinearity of the friction characteristics of wheels (the friction characteristics to the road surface) and an error of the friction characteristic model or the like. Particularly, during the transitional period in which the friction coefficient of the road surface or the motion state of the vehicle changes, generally the accuracy of the estimated value of the road surface reaction force easily decreases. Consequently, the accuracy of the estimated value of the state quantity of the skid motion of the vehicle easily decreases. In addition, the road surface reaction force acting on each wheel of the vehicle is affected by the bank angle (cant angle) of the road surface, and even if the state quantity of the skid motion of the vehicle is constant, the road surface reaction force changes according to a change in the bank angle (cant angle) of the road surface.

The technique disclosed in Patent Document 1, however, does not include a technique for compensating for the effect of the decrease in the accuracy of the estimated value of the road surface reaction force during the transitional period in which the friction coefficient of the road surface or the motion state of the vehicle changes and the effect of the change in the road surface reaction force caused along with the change in the bank angle of the road surface. Accordingly, the technique disclosed in Patent Document 1 has a disadvantage that the accuracy of the estimated value of the state quantity of the skid motion of the vehicle easily decreases particularly during the transitional period in which the friction coefficient of the road surface or the motion state of the vehicle changes or in which the bank angle of the road surface changes.

SUMMARY OF THE INVENTION

In view of the above background, the present invention has been made. Therefore, it is an object of the present invention to provide a device for estimating the state quantity of a skid motion of a vehicle capable of increasing the estimation accuracy of the state quantity of the skid motion of the vehicle even in the transitional period in which a change occurs in the friction coefficient or the motion state of the vehicle or in the bank angle of the road surface.

A device for estimating a state quantity of a skid motion of a vehicle according to a first aspect of the present invention is a device which sequentially estimates a value of a skid motion state quantity with a skid angle or a skid speed in a predetermined position of the vehicle defined as the skid motion state quantity to be estimated, the device comprising:

a vehicle model computing means, which finds road surface reaction force model values, each of which is a value of a road surface reaction force including at least a lateral force out of the road surface reaction force acting on each wheel of the vehicle from a road surface on a vehicle model, by performing arithmetic processing of the vehicle model while inputting an observed value of a predetermined type of quantity to be observed related to a behavior of an actual vehicle, which is required to identify at least a slip of the wheel of the vehicle on the vehicle model, into the vehicle model by using the vehicle model, which includes a friction characteristic model representing a relationship between the slip between the wheel of the vehicle and the road surface and the road surface reaction force acting on the wheel from the road surface and represents the dynamics of the vehicle, and which finds a new value of a skid motion state quantity model value, which is a value of the skid motion state quantity generated in the vehicle on the vehicle model due to a resultant force of the road surface reaction force model values by using the road surface reaction force model values and a past calculated value of the skid motion state quantity model value;

a predetermined position actual lateral acceleration detecting means, which includes at least a lateral acceleration sensor sensing actual acceleration in the lateral direction of the vehicle and generates an output based on predetermined position actual lateral acceleration, which is the actual acceleration in the lateral direction in the predetermined position of the vehicle;

a lateral acceleration model value computing means, which finds a predetermined position lateral acceleration model value, which is a value of the acceleration in the lateral direction of the vehicle generated in the predetermined position of the vehicle on the vehicle model by the resultant force of the road surface reaction force model values, by using the road surface reaction force model values;

a lateral acceleration deviation computing means, which finds a lateral acceleration deviation, which is a deviation between a detected value of the predetermined position actual lateral acceleration indicated by the output from the predetermined position actual lateral acceleration detecting means and the predetermined position lateral acceleration model value; and a skid motion state quantity estimated value determining means, which determines, as a correction manipulated variable, a value obtained by passing the lateral acceleration deviation through a filter having a high-cut characteristic or a value obtained by passing the lateral acceleration deviation through the filter and a gain multiplication means, which multiplies an input value by a predetermined gain, and which determines a value obtained by adding the correction manipulated variable to the skid motion state quantity model value as an estimated value of the skid motion state quantity of the actual vehicle (First aspect of the invention).

The term "observed value" in the present invention means a detected value directly observed from a sensor output or an estimated value indirectly observed by using an appropriate model or a natural law from one or more sensor outputs related to a quantity to be observed. This is the same in other aspects of the invention described later.

According to the first aspect of the invention, the vehicle model computing means finds the road surface reaction force model values by performing the arithmetic processing of the vehicle model while inputting the observed value of the predetermined type of quantity to be observed related to the behavior of the actual vehicle, which is required to identify at least the slip of each wheel of the vehicle on the vehicle model, into the vehicle model by using the vehicle model. In this case, more specifically, the road surface reaction force model values, each of which is the value of the road surface reaction force including at least the lateral force out of the road surface reaction force acting on each wheel of the vehicle, is able to be found by, for example, identifying (estimating) the slip of each wheel of the vehicle on the basis of the dynamics of the vehicle from the observed value of the predetermined type of quantity to be observed and inputting the slip into the friction characteristic model.

The observed value of the predetermined type of quantity to be observed may be an observed value of the quantity to be observed, which is required to identify the slip between the wheel and the road surface in the friction characteristic model on the basis of the dynamics of the vehicle used in the vehicle model. The quantity to be observed may be selected beforehand according to the structure of the vehicle model including the friction characteristic model.

Further, in the case where not only the observed value of the quantity to be observed, but also the value of the skid motion state quantity of the vehicle is required in order to identify the slip between the wheel and the road surface, a past calculated value (the value, which has already been calculated in the past: preferably the latest value of past calculated values) of the skid motion state quantity model value may be used.

Moreover, the skid motion of the vehicle depends on a driving/braking force and a lateral force, which are friction forces out of the road surface reaction forces acting on the respective wheels, and is particularly highly dependent on the lateral force. Therefore, the road surface reaction force model value to be found is preferably a value of the road surface reaction force including at least the lateral force of each wheel.

Further, the vehicle model computing means finds the skid motion state quantity model value, which is the value of the skid motion state quantity generated in the vehicle on the vehicle model by the resultant force of the road surface reaction force model values found as described above (a resultant force of the road surface reaction force model values of all wheels of the vehicle on the vehicle model). In this case, the motion of the vehicle is dynamically defined due to the resultant force of the road surface reaction forces (mainly the resultant force of lateral forces) acting on the vehicle as an external force.

Therefore, a new value of the skid motion state quantity model value is able to be found by performing the computation of the dynamic model using the road surface reaction force model values and a past calculated value (preferably, the latest value out of past calculated values) of the skid motion state quantity model value, for example, by inputting the road surface reaction force model values into the dynamic model, which represents a relationship between the road surface reaction force acting on each wheel of the vehicle and the lateral motion in the predetermined position of the vehicle.

For example, the skid motion state quantity model value is able to be sequentially found by calculating a temporal change rate of the skid motion state quantity generated due to the resultant force of the road surface reaction force model values on the basis of a dynamic relationship between a resultant force of road surface reaction forces of the respective wheels on the vehicle model and the temporal change rate of the skid motion state quantity and the road surface reaction force model values and performing sequential integration of the temporal change rate (cumulatively adding the value to the past calculated value of the skid motion state quantity).

Moreover, in the first aspect of the invention, the predetermined position actual lateral acceleration detecting means generates an output based on the predetermined position actual lateral acceleration. In addition, the lateral acceleration model value computing means finds the predetermined position lateral acceleration model value, which is the value of acceleration in the lateral direction of the vehicle generated in the predetermined position of the vehicle on the vehicle model by the resultant force of the road surface reaction force model values of the respective wheels, which have been found by the vehicle model computing means, by using the road surface reaction force model values.

The lateral acceleration model value computing means may be included in the vehicle model computing means.

Moreover, in the case where the lateral acceleration sensor is mounted in the predetermined position of the actual vehicle, the output of the lateral acceleration sensor directly functions as the output indicating the predetermined position actual lateral acceleration.

On the other hand, in the case where the mounting position of the lateral acceleration sensor differs from the predetermined position of the actual vehicle, the output based on the predetermined position actual lateral acceleration is able to be generated, for example, from the output of the lateral acceleration sensor and the output of a yaw rate sensor (or a sensor which detects a yaw angular acceleration) mounted on the vehicle.

Then, in the first aspect of the invention, the lateral acceleration deviation computing means finds a lateral acceleration deviation, which is a deviation between the detected value of the predetermined position actual lateral acceleration indicated by the output of the predetermined position actual lateral acceleration detecting means and the predetermined position lateral acceleration model value.

Here, according to the study by the inventor of the present application, particularly in a situation where the bank angle (cant angle) of the road surface, on which the vehicle is traveling, is maintained substantially constant, the lateral acceleration deviation prominently reflects an influence of an error of the skid motion state quantity model value on the value (true value) of the skid motion state quantity in the predetermined position of the actual vehicle in the transitional period in which the friction coefficient of the road surface or the motion state of the vehicle changes.

More specifically, the value obtained by passing the lateral acceleration deviation through the filter having the low-cut characteristic and the integrating means, which integrates input values, is approximate to an error relative to an actual value (true value) of the skid speed in the predetermined position of the vehicle corresponding to the skid motion state quantity model value in the transitional period, in which the friction coefficient of the road surface or the motion state of the vehicle changes.

Further, the processing of passing the lateral acceleration deviation through the filter having the low-cut characteristic and the integrating means, which integrates input values, as described above is able to be equivalently replaced by processing of passing the lateral acceleration deviation through a filter having a high-cut characteristic or processing of passing the lateral acceleration deviation through the filter and a gain multiplication means, which multiplies an input value by a gain having a predetermined value. In the case of the replacement, the aforesaid integrating means, which is susceptible to accumulation of arithmetic errors, is able to be omitted.

Therefore, in the first aspect of the invention, the aforesaid motion state quantity estimated value determining means is adapted to determine the value obtained by passing the lateral acceleration deviation through the filter having the high-cut characteristic or the value obtained by passing the lateral acceleration deviation through the aforesaid filter and the gain multiplication means, which multiplies the input value by the gain having the predetermined value, as a correction manipulated variable.

Then, the motion state quantity estimated value determining means determines the value obtained by adding the correction manipulated variable to the skid motion state quantity model value as the estimated value of the skid motion state quantity of the actual vehicle.

This enables the determination of the estimated value of the skid motion state quantity, which is a value obtained by correcting the skid motion state quantity model value by using the correction manipulated variable so as to be closer to the value (true value) of the skid motion state quantity in the predetermined position of the actual vehicle than the skid motion state quantity model value in the transitional period in which the friction coefficient of the road surface or the motion state of the vehicle changes.

Consequently, the above enables an increase in the accuracy of the estimated value of the skid motion state quantity in the predetermined position of the vehicle in the transitional period in which the friction coefficient of the road surface or the motion state of the vehicle changes so that the accuracy is higher than that of the skid motion state quantity model value.

Moreover, the processing of passing the lateral acceleration deviation through the integrating means is unnecessary, thereby preventing the accumulation of arithmetic errors caused by the integration of the lateral acceleration deviations in the correction manipulated variable. Therefore, the reliability of the correction manipulated variable is able to be increased, thus enabling an increase in the accuracy of the estimated value of the skid motion state quantity of the vehicle.

In the first aspect of the invention, the predetermined position of the vehicle is, for example, the position of the center of gravity of the vehicle (Second aspect of the invention).

According to the second aspect of the invention, the estimated value of the skid motion state quantity in the position of the center of gravity of the vehicle is able to be found appropriately with high accuracy.

In the second aspect of the invention, the predetermined position lateral acceleration model value is able to be found as a value of acceleration obtained by dividing the value of the translational force component in the lateral direction of the vehicle out of the resultant force of the road surface reaction force model values, which have been found by the vehicle model computing means, by the mass of the vehicle.

Moreover, in the first and second aspects of the invention, the filter is preferably a band-pass filter having a high-cut characteristic and a low-cut characteristic (Third aspect of the invention).

According to the third aspect of the invention, a steady offset component, which is sometimes included in the lateral acceleration deviation due to a drift or the like of the output of the lateral acceleration sensor, is able to be removed by using the low-cut characteristic of the band-pass filter. Thus, the reliability of the correction manipulated variable is able to be further increased and the accuracy of the estimated value of the skid motion state quantity of the vehicle is able to be further increased.

The above band-pass filter does not need to perform high-cut filtering processing and low-cut filtering processing at a time, but may perform the high-cut filtering processing and the low-cut filtering processing in series.

In the above first to third aspects of the invention, the gain having the predetermined value is set to, for example, a value equal to a time constant, which defines a cutoff frequency on the high-frequency side in the high-cut characteristic of the filter (Fourth aspect of the invention).

According to the fourth aspect of the invention, the filter having the high-cut characteristic and the gain multiplication means can be used to easily perform processing equivalent to the processing of passing the lateral acceleration deviation through the filter having the low-cut characteristic and the integrating means.

Moreover, a device for estimating a state quantity of a skid motion of a vehicle according to a second aspect of the present invention is a device which sequentially estimates a value of a skid motion state quantity with a skid angle or a skid speed in a predetermined position of the vehicle defined as the skid motion state quantity to be estimated, the device comprising:

a vehicle model computing means, which finds road surface reaction force model values, each of which is a value of a road surface reaction force including at least a lateral force out of the road surface reaction force acting on each wheel of the vehicle from a road surface on a vehicle model, by performing arithmetic processing of the vehicle model while inputting an observed value of a predetermined type of quantity to be observed related to a behavior of an actual vehicle, which is required to identify at least a slip of the wheel of the vehicle on the vehicle model, into the vehicle model by using the vehicle model, which includes a friction characteristic model representing a relationship between the slip between the wheel of the vehicle and the road surface and the road surface reaction force acting on the wheel from the road surface and represents the dynamics of the vehicle, and which finds a skid motion state quantity model value, which is a value of the skid motion state quantity generated in the vehicle on the vehicle model due to a resultant force of the road surface reaction force model values;

a predetermined position actual lateral acceleration detecting means, which includes at least a lateral acceleration sensor sensing actual acceleration in the lateral direction of the vehicle and generates an output based on predetermined position actual lateral acceleration, which is the actual acceleration in the lateral direction in the predetermined position of the vehicle;

a lateral acceleration model value computing means, which finds a predetermined position lateral acceleration model value, which is a value of the acceleration in the lateral direction of the vehicle generated in the predetermined position of the vehicle on the vehicle model by the resultant force of the road surface reaction force model values, by using the road surface reaction force model values;

a lateral acceleration deviation computing means, which finds a lateral acceleration deviation, which is a deviation between a detected value of the predetermined position actual lateral acceleration indicated by the output from the predetermined position actual lateral acceleration detecting means and the predetermined position lateral acceleration model value;

a yaw angular acceleration detecting means, which generates an output based on angular acceleration about a predetermined yaw axis of the actual vehicle;

a yaw angular acceleration model value computing means, which finds a yaw angular acceleration model value, which is a value of the angular acceleration generated about the predetermined yaw axis in the vehicle on the vehicle model by the resultant force of the road surface reaction force model values, by using the road surface reaction force model values;

a yaw acceleration deviation computing means, which finds a yaw angular acceleration deviation, which is a deviation between a detected value of angular acceleration indicated by the output from the yaw angular acceleration detecting means and the yaw angular acceleration model value; and a skid motion state quantity estimated value determining means, which determines a value obtained by correcting the skid motion state quantity model value according to the lateral acceleration deviation and the yaw angular acceleration deviation, as an estimated value of the skid motion state quantity of the actual vehicle (Fifth aspect of the invention).

According to the fifth aspect of the invention, the vehicle model computing means finds the road surface reaction force model values by performing arithmetic processing of the vehicle model while inputting the observed value of the predetermined type of quantity to be observed related to the behavior of the actual vehicle, which is required to identify at least the slip of the wheel of the vehicle on the vehicle model, into the vehicle model by using the vehicle model, in the same manner as the first aspect of the invention. In this case, more specifically, for example, the slip of each wheel of the vehicle is identified (estimated) on the basis of the dynamics of the vehicle from the observed value of the predetermined type of quantity to be observed, and the slip is input to the friction characteristic model, thereby enabling the road surface reaction force model values, each of which is the value of the road surface reaction force including at least the lateral force out of the road surface reaction forces acting on the respective wheels of the vehicle, to be found.

The observed value of the predetermined type of quantity to be observed may be an observed value of the quantity to be observed, which is required to identify the slip between the wheel and the road surface in the friction characteristic model on the basis of the dynamics of the vehicle to be used for the vehicle model. The quantity to be observed may be selected beforehand according to the structure of the vehicle model including the friction characteristic model.

Moreover, the skid motion of the vehicle depends on a driving/braking force and a lateral force, which are friction forces out of the road surface reaction forces acting on the respective wheels, and is particularly highly dependent on the lateral force. Therefore, the road surface reaction force model value to be found is preferably a value of the road surface reaction force including at least the lateral force of each wheel.

Then, the vehicle model computing means finds the skid motion state quantity model value, which is the value of the skid motion state quantity generated in the vehicle on the vehicle model by the resultant force of the road surface reaction force model values found as described above (a resultant force of the road surface reaction force model values of all wheels of the vehicle on the vehicle model). In this case, the motion of the vehicle is dynamically defined due to the resultant force of the road surface reaction forces (mainly the resultant force of lateral forces) acting on the vehicle as an external force. Therefore, for example, the skid motion state quantity model value is able to be found by performing the computation of the dynamic model by inputting the road surface reaction force model values into the dynamic model representing the relationship between the road surface reaction force acting on each wheel of the vehicle and the lateral motion in the predetermined position of the vehicle.

For example, the skid motion state quantity model value is able to be sequentially found by calculating a temporal change rate of the skid motion state quantity generated due to the resultant force of the road surface reaction force model values on the basis of a dynamic relationship between a resultant force of road surface reaction forces of the respective wheels on the vehicle model and the temporal change rate of the skid motion state quantity and the road surface reaction force model values and performing sequential integration of the temporal change rate (cumulatively adding the calculated value to the past calculated value of the skid motion state quantity).

In the case of integrating the temporal change rates of the skid motion state quantities, a past calculated value (preferably, the latest value of past calculated values) of the skid motion state quantity is required. In this case, in the fifth aspect of the invention, it is possible to employ any one of a mode of using the past calculated value of the skid motion state quantity model value and a mode of using the past calculated value of the estimated value of the skid motion state quantity, as the past calculated value.

Moreover, in the fifth aspect of the invention, the predetermined position actual lateral acceleration detecting means generates an output according to the predetermined position actual lateral acceleration. In addition, the lateral acceleration model value computing means finds the predetermined position lateral acceleration model value, which is the value of the acceleration in the lateral direction of the vehicle generated in the predetermined position of the vehicle on the vehicle model by the resultant force of the road surface reaction force model values of the respective wheels, which has been found by the vehicle model computing means, by using the road surface reaction force model values.

The lateral acceleration model value computing means may be included in the vehicle model computing means. In addition, in the case where the lateral acceleration sensor is mounted in the predetermined position of the actual vehicle, the output of the lateral acceleration sensor directly functions as the output indicating the predetermined position actual lateral acceleration.

On the other hand, in the case where the mounting position of the lateral acceleration sensor differs from the predetermined position of the actual vehicle, the output based on the predetermined position actual lateral acceleration is able to be generated, for example, from the output of the lateral acceleration sensor and the output of a yaw rate sensor (or a sensor which detects a yaw angular acceleration) mounted on the vehicle.

Then, the lateral acceleration deviation computing means finds the lateral acceleration deviation, which is the deviation between the detected value of the predetermined position actual lateral acceleration indicated by the output from the predetermined position actual lateral acceleration detecting means and the predetermined position lateral acceleration model value.

Further, in the fifth aspect of the invention, the yaw angular acceleration detecting means generates the output based on the angular acceleration about the predetermined yaw axis of the actual vehicle. Moreover, the yaw angular acceleration model value computing means finds the yaw angular acceleration model value, which is the value of the angular acceleration generated about the predetermined yaw axis of the vehicle on the vehicle model by the resultant force of the road surface reaction force model values of the respective wheels, which have been found by the vehicle model computing means, by using the road surface reaction force model values.

The moment (thus, the angular acceleration) about the yaw axis of the vehicle generated by the resultant force of the road surface reaction forces acting on the respective wheels is highly dependent on the lateral force out of the road surface reaction force. Therefore, the road surface reaction force model value includes at least the lateral force, by which the yaw angular acceleration model value is able to be appropriately found by using the road surface reaction force model value.

Then, the yaw angular acceleration deviation computing means finds the yaw angular acceleration deviation, which is the deviation between the detected value of the angular acceleration indicated by the output from the yaw angular acceleration detecting means and the yaw angular acceleration model value.

Here, according to the study by the inventor of the present application, as described on the first aspect of the invention, particularly in a situation where the bank angle (cant angle) of the road surface, on which the vehicle is traveling, is maintained substantially constant, the lateral acceleration deviation prominently reflects an influence of an error of the skid motion state quantity model value on the value (true value) of the skid motion state quantity of the actual vehicle in the transitional period in which the friction coefficient of the road surface or the motion state of the vehicle changes. Therefore, in this situation, it is thought that an estimated value higher in accuracy than the skid motion state quantity model value is able to be appropriately found by correcting the skid motion state quantity model value according to the lateral acceleration deviation.

On the other hand, the lateral acceleration sensor of the predetermined position actual lateral acceleration detecting means generally also senses the gravitational acceleration. Therefore, the detected value of the predetermined position actual lateral acceleration, which is indicated by the output of the predetermined position actual lateral acceleration detecting means includes an influence portion of a bank angle (more specifically, a component in a direction parallel to the actual road surface with respect to the lateral direction of the vehicle out of the gravitational acceleration acting on the vehicle) in the case where the road surface has the bank angle (bank angle other than zero).

Therefore, in the transitional period in which the bank angle of the road surface changes, the lateral acceleration deviation changes according to a change in the bank angle of the road surface even if the actual skid motion state quantity of the vehicle is constant (even if the actual motion state of the vehicle is in a steady state).

As described above, in a situation where the lateral acceleration deviation changes due to a change in the bank angle of the road surface, the correction of the skid motion state quantity model value based on the lateral acceleration deviation might cause the value obtained by the correction to be farther away from the value (true value) of the actual skid motion state quantity of the vehicle on the contrary.

Here, according to the study by the inventor of the present application, by comparing the situation where the lateral acceleration deviation changes due to a change in the bank angle of the road surface with the situation where the lateral acceleration deviation changes due to a change in the friction coefficient of the road surface or the motion state of the vehicle, the former situation tends to differ from the latter situation in the combination of the polarity of the lateral acceleration deviation and the polarity of the yaw angular acceleration deviation.

Therefore, in the fifth aspect of the invention, the skid motion state quantity estimated value determining means determines a value obtained by correcting the skid motion state quantity model value according to the lateral acceleration deviation and the yaw angular acceleration deviation as the estimated value of the skid motion state quantity of the actual vehicle.

This enables the determination of the estimated value of the skid motion state quantity by correcting the skid motion state quantity model value so that the estimated value of the skid motion state quantity of the vehicle is closer to the value (true value) of the actual skid motion state quantity than the skid motion state quantity model value in the transitional period in which the friction coefficient of the road surface or the motion state of the vehicle changes.

Consequently, the above enables an increase in the accuracy of the estimated value of the skid motion state quantity of the vehicle in the transitional period in which the friction coefficient of the road surface or the motion state of the vehicle changes so that the accuracy is higher than that of the skid motion state quantity model value.

Further, in a situation where the lateral acceleration deviation changes due to a change in the bank angle of the road surface, the estimated value of the skid motion state quantity is able to be prevented from being farther away from the actual value (true value) by suppressing the correction of the skid motion state quantity model value based on the lateral acceleration deviation.

Therefore, according to the fifth aspect of the invention, the accuracy of estimating the state quantity of the skid motion of the vehicle is able to be increased, including the transitional period in which the friction coefficient, the motion state of the vehicle, or the bank angle of the road surface changes.

In the fifth aspect of the invention, the predetermined position of the vehicle is, for example, the position of the center of gravity of the vehicle in the same manner as the second aspect of the invention (Sixth aspect of the invention).

According to the sixth aspect of the invention, the accuracy of estimating the skid motion state quantity in the position of the center of gravity of the vehicle is able to be increased.

In the sixth aspect of the invention, the predetermined position lateral acceleration model value is able to be found as an acceleration value obtained by dividing the value of the translational force component in the lateral direction of the vehicle out of the resultant force of the road surface reaction force model values, which have been found by the vehicle model computing means, by the mass of the vehicle.

In the fifth or sixth aspect of the invention, more specifically, for example, the configuration in the mode as described below is able to be employed. In the respective modes described below, "*" indicates a multiplication sign.

In a first mode, the vehicle model computing means includes a means which sequentially finds a new value of the skid motion state quantity model value by using the road surface reaction force model values and a past calculated value of the skid motion state quantity model value; the skid motion state quantity estimated value determining means includes: a linear-combined value calculating means, which finds a linear-combined value ($\alpha 1*A+\alpha 2*B$) obtained by linearly combining two weighting factors ($\alpha 1$) and ($\alpha 2$) by which the lateral acceleration deviation (A) and the yaw angular acceleration deviation (B) are multiplied, respectively; a correction basic value determining means, which determines a basic value of a correction manipulated variable for use in correcting the skid motion state quantity model value; and a correction computing means, which determines a value obtained by adding the correction manipulated variable to the skid motion state quantity model value as an estimated value of the skid motion state quantity of the actual vehicle by using a value obtained by passing the basic value through a first filter having a high-cut characteristic or a value obtained by passing the basic value through the first filter and a gain multiplication means, which multiplies an input value by a gain having a predetermined value, as the correction manipulated variable.

In this case, the two weighting factors ($\alpha 1$) and ($\alpha 2$) in the linear-combined value ($\alpha 1*A+\alpha 2*B$) are set, on the assumption that the left direction in a state of facing forward of the vehicle is defined as the positive direction of lateral acceleration of the vehicle and the counterclockwise direction viewed from the above of the vehicle is defined as the positive direction of angular acceleration about the yaw axis of the vehicle, so that the two weighting factors ($\alpha 1$) and ($\alpha 2$) have mutually the same polarity in the case where the neutral steer point (hereinafter, referred to as "NSP") of the actual vehicle lies on a rear side beyond the center of gravity of the vehicle and so that the two weighting factors ($\alpha 1$) and ($\alpha 2$) have polarities different from each other in the case where the NSP lies on a front side beyond the center of gravity of the vehicle.

Further, the correction basic value determining means determines the basic value to be zero in the case where the linear-combined value ($\alpha 1*A+\alpha 2*B$) has a different polarity from the term ($\alpha 1*A$) including the lateral acceleration deviation (A) in the linear-combined value and determines the basic value to be a value closer to zero out of the linear-combined value ($\alpha 1*A+\alpha 2*B$) and the lateral acceleration deviation (A) in the case where the linear-combined value ($\alpha 1*A+\alpha 2*B$) has the same polarity as the term ($\alpha 1*A$) including the lateral acceleration deviation (A) (Seventh aspect of the invention).

Moreover, in a second mode of the fifth or sixth aspect of the invention, the vehicle model computing means includes a means which sequentially finds a new value of the skid motion state quantity model value by using the road surface reaction force model values and a past calculated value of the skid motion state quantity model value;

the skid motion state quantity estimated value determining means includes: a linear-combined value calculating means, which finds a linear-combined value ($\alpha 1*A+\alpha 2*B$) obtained by linearly combining two weighting factors ($\alpha 1$) and ($\alpha 2$) by which a second filtering value (A), which is obtained by passing the lateral acceleration deviation through a second filter having a low-cut characteristic, and a third filtering value (B), which is obtained by passing the yaw angular acceleration deviation through a third filter having a low-cut characteristic, are multiplied, respectively; a correction basic value determining means, which determines a basic value of a correction manipulated variable for use in correcting the skid motion state quantity model value; and a correction computing means, which determines a value obtained by adding the correction manipulated variable to the skid motion state quantity model value as an estimated value of the skid motion state quantity of the actual vehicle by using a value obtained by passing the basic value through a first filter having a high-cut characteristic or a value obtained by passing the basic value through the first filter and a gain multiplication means, which multiplies an input value by a gain having a predetermined value, as the correction manipulated variable.

In this case, the two weighting factors ($\alpha 1$) and ($\alpha 2$) in the linear-combined value ($\alpha 1*A+\alpha 2*B$) are set, similarly to the first mode (the third aspect of the invention), on the assumption that the left direction in a state of facing forward of the vehicle is defined as the positive direction of lateral acceleration of the vehicle and the counterclockwise direction viewed from the above of the vehicle is defined as the positive direction of angular acceleration about the yaw axis of the vehicle, so that the two weighting factors ($\alpha 1$) and ($\alpha 2$) have mutually the same polarity in the case where the neutral steer point (hereinafter, referred to as "NSP") of the actual vehicle lies on a rear side beyond the center of gravity of the vehicle and so that the two weighting factors ($\alpha 1$) and ($\alpha 2$) have polarities different from each other in the case where the NSP lies on a front side beyond the center of gravity of the vehicle.

Further, the correction basic value determining means determines the basic value to be zero in the case where the linear-combined value ($\alpha 1*A+\alpha 2*B$) has a different polarity from the term ($\alpha 1*A$) including second filtering value (A) in the linear-combined value and determines the basic value to be a value closer to zero out of the linear-combined value ($\alpha 1*A+\alpha 2*B$)) and the second filtering value (A) in the case where the linear-combined value ($\alpha 1*A+\alpha 2*B$) has the same polarity as the term ($\alpha 1*A$) including the second filtering value (A) (Eighth aspect of the invention).

The eighth aspect of the invention differs from the seventh aspect of the invention only in the linear-combined value calculating means. More specifically, in the eighth aspect of the invention, the second filtering value, which has been obtained by passing the lateral acceleration deviation through the second filter, is used as the value of A in the linear-combined value ($\alpha 1*A+\alpha 2*B$) in place of the lateral acceleration deviation, and the third filtering value, which has been obtained by passing the yaw angular acceleration deviation through the third filter, is used as the value of B in the linear-combined value ($\alpha 1*A+\alpha 2*B$) in place of the yaw angular acceleration deviation.

In the seventh and eighth aspects of the invention, the vehicle model computing means sequentially finds a new value of the skid motion state quantity model value by using the road surface reaction force model values and a past calculated value of the skid motion state quantity model value. Therefore, the estimated value of the skid motion state quantity as the value obtained by correcting the skid motion state quantity model value is not fed back to the processing of sequentially calculating the skid motion state quantity model value, and the skid motion state quantity model value is calculated independently of the estimated value of the skid motion state.

In this case, according to the study by the inventor of the present application, particularly in a situation where the bank angle (cant angle) of the road surface, on which the vehicle is traveling, is maintained substantially constant, the value obtained by passing the lateral acceleration deviation through the filter having the low-cut characteristic and the integrating means, which integrates the input values, is approximate to an error relative to an actual value (true value) of the skid speed in the predetermined position of the vehicle corresponding to the skid motion state quantity model value in the transitional period, in which the friction coefficient of the road surface or the motion state of the vehicle changes.

Further, the processing of passing the lateral acceleration deviation through the filter having the low-cut characteristic and the integrating means, which integrates input values, as described above is able to be equivalently replaced by processing of passing the lateral acceleration deviation through a filter having a high-cut characteristic or processing of passing the lateral acceleration deviation through the filter and a gain multiplication means, which multiplies an input value by a gain having a predetermined value. In the case of the replacement, the aforesaid integrating means, which is susceptible to accumulation of arithmetic errors, is able to be omitted.

Moreover, for example, in the third aspect of the invention, in the case where the aforesaid two weighting factors ($\alpha 1$) and ($\alpha 2$) are set as described above and in a situation where the lateral acceleration deviation (A) changes due to a change in the bank angle of the road surface, the term ($\alpha 2*B$) (hereinafter, this term is referred to as the second term in some cases) including the yaw angular acceleration deviation (B) in the linear-combined value ($\alpha 1*A+\alpha 2*B$) tends to have a polarity different from that of the term ($\alpha 1*A$) (hereinafter, this term is referred to as the first term in some cases) including the lateral acceleration deviation (A).

On the other hand, in a situation where the lateral acceleration deviation changes due to a change in the friction coefficient of the road surface or the motion state of the vehicle, the second term ($\alpha 2*B$) in the linear-combined value tends to have the same polarity as the polarity of the first term ($\alpha 1*A$).

Further, in a situation where the linear-combined value ($\alpha 1*A+\alpha 2*B$) has a polarity different from that of the first term ($\alpha 1*A$), the first term ($\alpha 1*A$) has a different polarity from that of the second term ($\alpha 1*B$) and the absolute value of the second term ($\alpha 1*B$) is greater than the absolute value of the first term ($\alpha 1*A$). Therefore, in this situation, an influence of the change in the bank angle of the road surface is thought to be prominently seen.

Further, a situation where the linear-combined value ($\alpha 1*A+\alpha 2*B$) has the same polarity as the first term ($\alpha 1*A$) is any one of the situation where the first term ($\alpha 1*A$) has the same polarity as the second term ($\alpha 1*B$) and the situation where the first term ($\alpha 1*A$) and the second term ($\alpha 1*B$) have polarities different from each other and the absolute value of the first term ($\alpha 1*A$) is greater than the absolute value of the second term ($\alpha 1*B$). Therefore, this situation is thought to be a situation where the bank angle of the road surface is constant or the influence of the change in the bank angle is weak while the influence of the change in the friction coefficient of the road surface or the motion state of the vehicle is prominent.

Further, in the situation where the first term ($\alpha 1*A$) and the second term ($\alpha 1*B$) have polarities different from each other and the absolute value of the first term ($\alpha 1*A$) is greater than the absolute value of the second term ($\alpha 1*B$) out of the above situations, the linear-combined value ($\alpha 1*A+\alpha 2*B$) is sometimes closer to zero than the lateral acceleration deviation (A) (the absolute value of the linear-combined value is smaller than the absolute value of the lateral acceleration deviation).

The matters related to the polarity of the linear-combined value and the polarities of the respective terms in the linear-combined value are the same as those in the eighth aspect of the invention.

In addition, in the eighth aspect of the invention, the second filtering value, which is obtained by passing the lateral acceleration deviation through the second filter having the low-cut characteristic, is used in place of the lateral acceleration deviation itself, and the third filtering value, which is obtained by passing the yaw angular acceleration deviation through the third filter having the low-cut characteristic, is used in place of the yaw angular acceleration deviation itself.

Therefore, in the case where the lateral acceleration deviation or the yaw angular acceleration deviation includes a steady offset component due to a drift or the like of the output from the lateral acceleration sensor or a sensor for detecting the yaw angular acceleration, the offset component is able to be removed.

Accordingly, even in the case where the lateral acceleration deviation or the yaw angular acceleration deviation includes a steady offset component, phenomena related to the polarity of the linear-combined value and the polarities of the respective terms in the linear-combined value are easily seen prominently.

In consideration of the phenomena described hereinabove, in the seventh aspect of the invention, the correction basic value determining means determines the basic value to be zero in the case where the linear-combined value ($\alpha 1*A+\alpha 2*B$) has a different polarity from the term ($\alpha 1*A$) including the lateral acceleration deviation (A) in the linear-combined value and determines the basic value to be a value closer to zero out of the linear-combined value ($\alpha 1*A+\alpha 2*B$) and the lateral acceleration deviation (A) in the case where the linear-combined value ($\alpha 1*A+\alpha 2*B$) has the same polarity as the term ($\alpha 1*A$) including the lateral acceleration deviation (A).

Similarly, in the eighth aspect of the invention, as described above, the correction basic value determining means determines the basic value to be zero in the case where the linear-combined value ($\alpha 1*A+\alpha 2*B$) has a different polarity from the term ($\alpha 1*A$) including the second filtering value (A) in the linear-combined value and determines the basic value to be a value closer to zero out of the linear-combined value ($\alpha 1*A+\alpha 2*B$) and the second filtering value (A) in the case where the linear-combined value ($\alpha 1*A+\alpha 2*B$) has the same polarity as the term ($\alpha 1*A$) including the second filtering value (A).

The basic value determined in this manner has a meaning of a value obtained by adjusting the lateral acceleration deviation (A) with the aforesaid polarity relationship between the first term ($\alpha 1*A$) and the second term ($\alpha 1*B$) reflected.

Then, in the seventh and eighth aspects of the invention, the correction computing means of the skid motion state quantity estimated value determining means determines a value obtained by adding the correction manipulated variable to the skid motion state quantity model value as an estimated value of the skid motion state quantity of the actual vehicle by using a value obtained by passing the basic value determined as described above through the first filter having the high-cut characteristic or a value obtained by passing the basic value through the first filter and the gain multiplication means, which multiplies the input value by the gain having the predetermined value, as the correction manipulated variable.

Thereby, according to the seventh and eighth aspects of the invention, in the situation where the lateral acceleration deviation changes due to a change in the friction coefficient of the road surface or the motion state of the vehicle, a value obtained by appropriately correcting the skid motion state quantity model value (a value obtained by adding the correction manipulated variable to the skid motion state quantity model value) according to the linear-combined value or the lateral acceleration deviation is able to be determined as an estimated value of the skid motion state quantity. Consequently, the accuracy of the estimated value is able to be increased so as to be higher than the accuracy of the skid motion state quantity model value.

Moreover, in the situation where the lateral acceleration deviation changes due to a change in the bank angle of the road surface, the correction of the skid motion state quantity model value based on the lateral acceleration deviation is suppressed or the correction is not performed. In other words, the amount of change from the skid motion state quantity model value of the estimated value of the skid motion state quantity is relatively less limited or the estimated value of the skid motion state quantity is determined to be the same value as the skid motion state quantity model value.

Therefore, it is possible to prevent the estimated value of the skid motion state quantity from fluctuating inappropriately relative to the actual value or from being farther away from the actual value due to a change in the bank angle of the road surface, which affects the lateral acceleration deviation, in a situation where the actual skid motion state quantity is maintained constant.

Further, particularly in the eighth aspect of the invention, an effect of a steady offset component is able to be removed even in a case where the steady offset component is included in the lateral acceleration deviation or the yaw angular acceleration deviation. Therefore, it is possible to prevent the skid motion state quantity model value from being inappropriately corrected due to a drift or the like of the output from the lateral acceleration sensor or the sensor for detecting the yaw angular acceleration. Consequently, the accuracy and stability of the estimated value of the skid motion state quantity is able to be further increased.

Supplementally, in the seventh and eighth aspects of the invention, the first filter may be a filter having the low-cut characteristic in addition to the high-cut characteristic (i.e., a band-pass filter).

Moreover, in the eighth aspect of the invention, each of the second filter and the third filter may be a filter having the high-cut characteristic in addition to the low-cut characteristic (i.e., a band-pass filter).

Incidentally, in the fifth or sixth aspect of the invention, it is also possible to use a mode in which a new skid motion state quantity model value is calculated by using a past calculated value of the estimated value of the skid motion state quantity, in place of the past calculated value of the skid motion state quantity model value in calculating the new skid motion state quantity model value by feeding back the estimated value of the skid motion state quantity as a value obtained by correcting the skid motion state quantity model value to the processing of sequentially calculating the skid motion state quantity model value in the calculation processing of the skid motion state quantity model value in the vehicle model computing means.

In this case, if the value obtained by correcting the skid motion state quantity model value by using the correction manipulated variable is determined as the estimated value of the skid motion state quantity, the corrected portions are integrated in the calculation processing of the skid motion state quantity model value.

Therefore, in this case, the integrating means (the integrating means passing the lateral acceleration deviation), which has been described with respect to the seventh and eighth aspects of the invention, is substantially included in the calculation processing of the skid motion state quantity model value. Thus, in this case, the first filter having the high-cut characteristic and the gain multiplication means, which have been described with respect to the seventh and eighth aspects of the invention, are able to be omitted.

Accordingly, in the fifth and sixth aspects of the invention, not only the configurations of the first and second modes, but also the configuration of the third or fourth mode, for example, as described below is able to be used.

In the third mode, the vehicle model computing means includes a means which sequentially finds a new value of the skid motion state quantity model value by using the road surface reaction force model values and a past calculated value of an estimated value of the skid motion state quantity, and the skid motion state quantity estimated value determining means includes: a linear-combined value calculating means, which finds a linear-combined value ($\alpha 1*A+\alpha 2*B$) obtained by linearly combining two weighting factors ($\alpha 1$) and ($\alpha 2$) by which the lateral acceleration deviation (A) and the yaw angular acceleration deviation (B) are multiplied, respectively; a correction basic value determining means, which determines a basic value of a correction manipulated variable for use in correcting the skid motion state quantity model value; and a correction computing means, which determines a value obtained by adding the correction manipulated variable to the skid motion state quantity model value as an estimated value of the skid motion state quantity of the actual vehicle by using the basic value or a value obtained by passing the basic value through a fourth filter having a low-cut characteristic as the correction manipulated variable.

In this case, the two weighting factors ($\alpha 1$) and ($\alpha 2$) in the linear-combined value ($\alpha 1*A+\alpha 2*B$) are set, similarly to the third and fourth aspects of the invention, on the assumption that the left direction in a state of facing forward of the vehicle is defined as the positive direction of lateral acceleration of the vehicle and the counterclockwise direction viewed from the above of the vehicle is defined as the positive direction of angular acceleration about the yaw axis of the vehicle, so that the two weighting factors ($\alpha 1$) and ($\alpha 2$) have mutually the same polarity in the case where the neutral steer point (hereinafter, referred to as "NSP") of the actual vehicle lies on a rear side beyond the center of gravity of the vehicle and so that the two weighting factors ($\alpha 1$) and ($\alpha 2$) have polarities different from each other in the case where the NSP lies on a front side beyond the center of gravity of the vehicle.

Then, the correction basic value determining means determines the basic value to be zero in the case where the linear-combined value ($\alpha 1*A+\alpha 2*B$) has a different polarity from the term ($\alpha 1*A$) including the lateral acceleration deviation (A) in the linear-combined value and determines the basic value to be a value closer to zero out of the linear-combined value ($\alpha 1*A+\alpha 2*B$) and the lateral acceleration deviation (A) in the case where the linear-combined value ($\alpha 1*A+\alpha 2*B$) has the same polarity as the term ($\alpha 1*A$) including the lateral acceleration deviation (A) (Ninth aspect of the invention).

Moreover, in the fourth mode of the fifth or sixth aspect of the invention, the vehicle model computing means includes a means which sequentially finds a new value of the skid motion state quantity model value by using the road surface reaction force model values and a past calculated value of an estimated value of the skid motion state quantity, and the skid motion state quantity estimated value determining means includes: a linear-combined value calculating means, which finds a linear-combined value ($\alpha 1*A+\alpha 2*B$) obtained by linearly combining two weighting factors ($\alpha 1$) and ($\alpha 2$) by which a fifth filtering value (A), which is obtained by passing the lateral acceleration deviation through a fifth filter having a low-cut characteristic, and a sixth filtering value (B), which is obtained by passing the yaw angular acceleration deviation through a sixth filter having a low-cut characteristic, are multiplied, respectively; a correction basic value determining means, which determines a basic value of a correction manipulated variable for use in correcting the skid motion state quantity model value; and a correction computing means, which determines a value obtained by adding the correction manipulated variable to the skid motion state quantity model value as an estimated value of the skid motion state quantity of the actual vehicle by using the basic value or a value obtained by passing the basic value through a fourth filter having a low-cut characteristic as the correction manipulated variable.

In this case, the two weighting factors ($\alpha 1$) and ($\alpha 2$) in the linear-combined value ($\alpha 1*A+\alpha 2*B$) are set, similarly to the third and fourth aspects of the invention, on the assumption that the left direction in a state of facing forward of the vehicle is defined as the positive direction of lateral acceleration of the vehicle and the counterclockwise direction viewed from the above of the vehicle is defined as the positive direction of angular acceleration about the yaw axis of the vehicle, so that the two weighting factors ($\alpha 1$) and ($\alpha 2$) have mutually the same polarity in the case where the neutral steer point (hereinafter, referred to as "NSP") of the actual vehicle lies on a rear side beyond the center of gravity of the vehicle and so that the two weighting factors ($\alpha 1$) and ($\alpha 2$) have polarities different from each other in the case where the NSP lies on a front side beyond the center of gravity of the vehicle.

Moreover, the correction basic value determining means determines the basic value to be zero in the case where the linear-combined value ($\alpha 1*A+\alpha 2*B$) has a different polarity from the term ($\alpha 1*A$) including the fifth filtering value (A) in the linear-combined value and determines the basic value to be a value closer to zero out of the linear-combined value ($\alpha 1*A+\alpha 2*B$) and the second filtering value (A) in the case where the linear-combined value ($\alpha 1*A+\alpha 2*B$) has the same polarity as the term ($\alpha 1*A$) including the fifth filtering value (A), similarly to the eighth aspect of the invention (Tenth aspect of the invention).

In other words, the tenth aspect of the invention differs from the ninth aspect of the invention only in the linear-combined value calculating means. More specifically, in the tenth aspect of the invention, the fifth filtering value, which has been obtained by passing the lateral acceleration deviation through the fifth filter, is used as the value of A in the linear-combined value ($\alpha 1*A+\alpha 2*B$) in place of the lateral acceleration deviation, and the sixth filtering value, which has been obtained by passing the yaw angular acceleration deviation through the sixth filter, is used as the value of B in the linear-combined value ($\alpha 1*A+\alpha 2*B$) in place of the yaw angular acceleration deviation.

In the ninth and tenth aspects of the invention, the basic value determining means is able to determine the basic value as a value obtained by adjusting the lateral acceleration deviation (A) with the aforesaid polarity relationship between the first term ($\alpha 1*A$) and the second term ($\alpha 1*B$) in the linear-combined value ($\alpha 1*A+\alpha 2*B$) reflected, similarly to the seventh and eighth aspects of the invention.

In addition, in the tenth aspect of the invention, the fifth filtering value, which is obtained by passing the lateral acceleration deviation through the fifth filter having the low-cut characteristic, is used in place of the lateral acceleration deviation itself, and the sixth filtering value, which is obtained by passing the yaw angular acceleration deviation through the sixth filter having the low-cut characteristic, is used in place of the yaw angular acceleration deviation itself.

Therefore, in the case where the lateral acceleration deviation or the yaw angular acceleration deviation includes a steady offset component due to a drift or the like of the output from the lateral acceleration sensor or a sensor for detecting the yaw angular acceleration, the offset component is able to be removed.

Accordingly, even in the case where the lateral acceleration deviation or the yaw angular acceleration deviation includes a steady offset component, phenomena related to the polarity of the linear-combined value and the polarities of the respective terms in the linear-combined value are easily seen prominently. Therefore, the reliability of the basic value is increased.

Further, in the ninth and tenth aspects of the invention, the correction computing means of the skid motion state quantity estimated value determining means determines a value obtained by adding the correction manipulated variable to the skid motion state quantity model value as an estimated value of the skid motion state quantity of the actual vehicle by using the basic value determined as described above or a value obtained by passing the basic value through a fourth filter having the low-cut characteristic as the correction manipulated variable.

In this case, in the ninth and tenth aspects of the invention, the vehicle model computing means sequentially finds a new value of the skid motion state quantity model value by using the road surface reaction force model values and a past calculated value of the estimated value of the skid motion state quantity. Therefore, the estimated value of the skid motion state quantity as the value obtained by correcting the skid motion state quantity model value is fed back to the processing of sequentially calculating the skid motion state quantity model value, and the skid motion state quantity model value is calculated so as to be dependent on the estimated value of the skid motion state.

Accordingly, in the calculation processing of the skid motion state quantity model value in the vehicle model computing means, the integrating means (the integrating means passing the lateral acceleration deviation), which has been described with respect to the seventh and eighth aspects of the invention, is substantially included in the calculation processing of the skid motion state quantity model value.

Therefore, the basic value or the value obtained by passing the basic value through the fourth filter having the low-cut characteristic is used as the correction manipulated variable to determine the value obtained by adding the correction manipulated variable to the skid motion state quantity model value as the estimated value of the skid motion state quantity of the actual vehicle, thereby achieving the same effect as the seventh and eighth aspects of the invention.

Specifically, in the situation where the lateral acceleration deviation changes due to a change in the friction coefficient of the road surface or the motion state of the vehicle, a value obtained by appropriately correcting the skid motion state quantity model value according to the linear-combined value or the lateral acceleration deviation is able to be determined as the estimated value of the skid motion state quantity. Consequently, the accuracy of the estimated value is able to be increased so as to be higher than the accuracy of the skid motion state quantity model value.

Moreover, in the situation where the lateral acceleration deviation changes due to a change in the bank angle of the road surface, the correction of the skid motion state quantity model value based on the lateral acceleration deviation is suppressed or the correction is not performed. Therefore, it is possible to prevent the estimated value of the skid motion state quantity from fluctuating inappropriately relative to the actual value or from being farther away from the actual value due to a change in the bank angle of the road surface, which affects the lateral acceleration deviation.

Further, particularly in the tenth aspect of the invention, an effect of a steady offset component is able to be removed even in a case where the steady offset component is included in the lateral acceleration deviation or the yaw angular acceleration deviation. Therefore, it is possible to prevent the skid motion state quantity model value from being inappropriately corrected due to a drift or the like of the output from the lateral acceleration sensor or the sensor for detecting the yaw angular acceleration. Consequently, the accuracy and stability of the estimated value of the skid motion state quantity is able to be further increased.

Moreover, in the case of using the value obtained by passing the basic value through the fourth filter having the low-cut characteristic as the correction manipulated variable and in the case where the basic value includes a steady offset component due to a drift or the like of the output from the lateral acceleration sensor or the sensor for detecting the yaw angular acceleration, the effect of the offset component is able to be removed to prevent the skid motion state quantity model value from being corrected inappropriately. Thus, the accuracy and stability of the estimated value of the skid motion state quantity is able to be further increased.

Supplementally, in the ninth and tenth aspects of the invention, the fourth filter may be a filter having the high-cut characteristic in addition to the low-cut characteristic (i.e., a band-pass filter). Moreover, in the tenth aspect of the invention, each of the fifth filter and the sixth filter may be a filter having the high-cut characteristic in addition to the low-cut characteristic (i.e., a band-pass filter).

BRIEF DESCRIPTION OF THE DRAWINGS

FIGS. 2(*a*) and 2(*b*) are diagrams visually illustrating representative reference characters used in the description of the embodiment;

FIG. 19 is a flowchart illustrating the processing of a bank angle estimating means illustrated in FIG. 18; and FIG. 20 is a flowchart illustrating the processing of a slope angle estimating means illustrated in FIG. 18.

MODE FOR CARRYING OUT THE INVENTION

Hereinafter, the embodiments of the present invention will be described. First, the schematic configuration of a vehicle in each of the embodiments in the present specification will be described with reference to FIG. 1.

Figure 1:
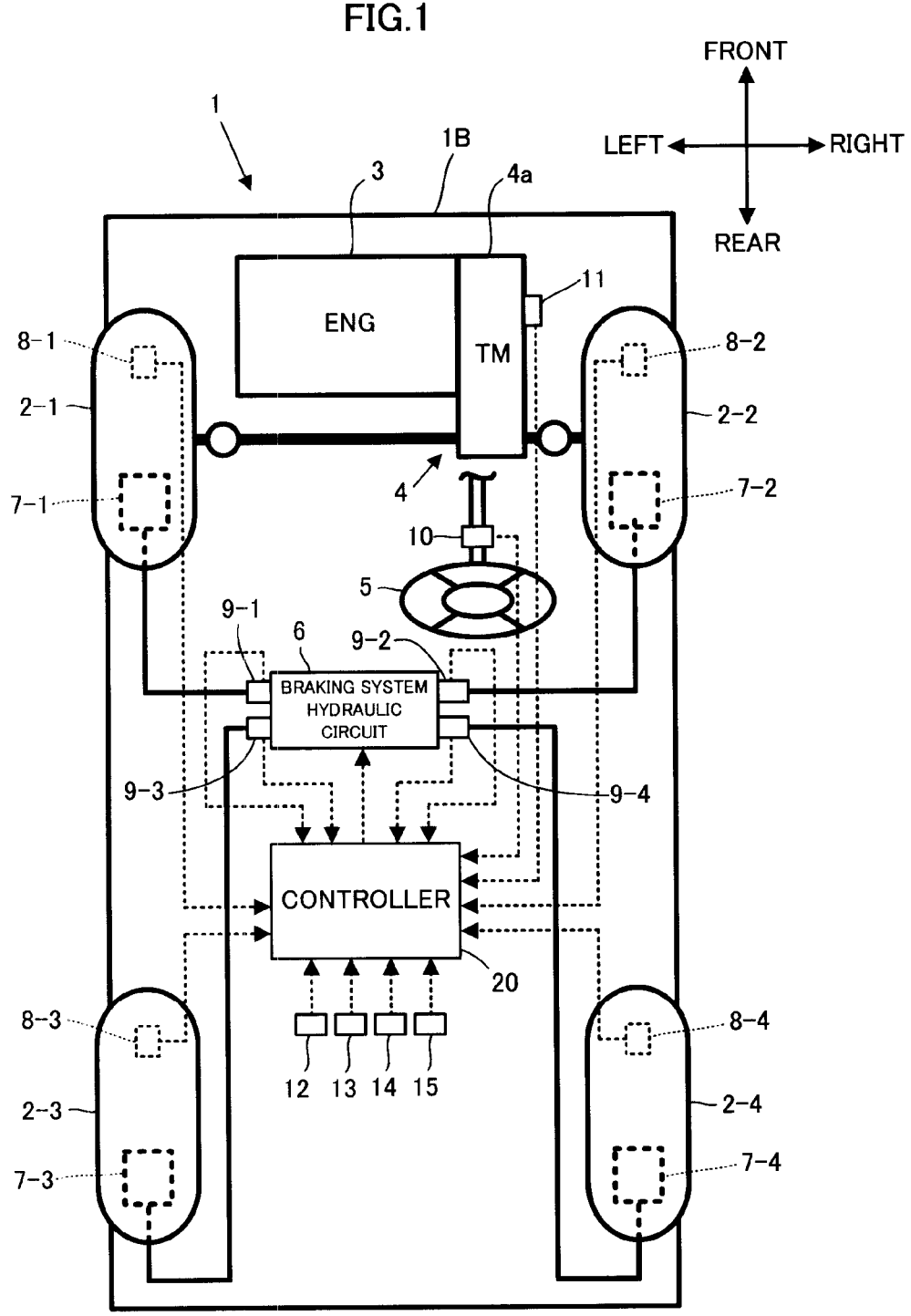
FIG. 1 is a diagram illustrating the schematic configuration of a vehicle in an embodiment.

As illustrated in FIG. 1, a vehicle 1 has a plurality of wheels 2-*i* (i=1, 2, . . . ), a vehicle body 1B being supported on the wheels 2-*i* (i=1, 2, . . . ) through suspension devices, which are not shown.

More specifically, the vehicle 1 according to each of the embodiments has a total of four wheels 2-*i* (i=1, 2, 3, 4), namely, a pair of right and left front wheels 2-1, 2-2 and a pair of right and left rear wheels 2-3, 2-4. In this case, the front wheels 2-1 and 2-2 among the wheels 2-*i* (i=1, 2, 3, 4) are driving wheels functioning as steering wheels, while the rear wheels 2-3 and 2-4 are driven wheels and non-steering wheels.

In the following description, the front left wheel 2-1 of the vehicle 1 will be referred to as the first wheel 2-1, the front right wheel 2-2 will be referred to as the second wheel 2-2, the rear left wheel 2-3 will be referred to as the third wheel 2-3, and the rear right wheel 2-4 will be referred to as the fourth wheel 2-4 in some cases.

Further, any one wheel among the wheels 2-*i* (i=1, 2, 3, 4) will be represented simply as "wheel 2-*i*" or "i-th wheel 2-*i*," omitting the description indicated by (i=1, 2, 3, 4), in some cases.

A suffix "i" will be added to the reference numeral of an element related to each i-th wheel 2-*i* among elements (parts, physical quantities, and the like) other than the wheels 2-*i* (i=1, 2, 3, 4). In this case, for an element corresponding to one particular wheel among the wheels 2-*i* (i=1, 2, 3, 4), the value of i (1 or 2 or 3 or 4) corresponding to a particular wheel will be added in place of the suffix "i."

The vehicle 1 has a drive system for rotatively driving the driving wheels. The drive system has an engine 3 serving as a motive power generating source mounted on the vehicle body 1B in each of the embodiments.

Then, the drive system transmits the motive power (output torque) of the engine 3 to the front wheels 2-1 and 2-2 serving as the driving wheels through a motive power transmission mechanism 4, which includes a transmission 4*a*, thereby rotatively driving the front wheels 2-1 and 2-2. In this case, the motive power of the engine 3 is controlled on the basis of the amount of depression of an accelerator pedal, which is not shown, of the vehicle 1.

In addition, the vehicle 1 is further provided with a steering system for steering the steering wheels. In each of the embodiments, the steering system has a steering wheel 5 disposed at the front in a driver's seat of the vehicle body 1B. The steering system steers the front wheels 2-1 and 2-2 acting as the steering wheels by a steering mechanism, not shown, according to the rotational operation of the steering wheel 5 in an interlocked manner.

The steering mechanism is formed of, for example, a mechanical steering mechanism, such as a rack and pinion or the like or a steering mechanism with an actuator, which has a steering actuator, such as an electric motor (a so-called power steering device).

The vehicle 1 further includes a braking system for braking the travel of the vehicle 1. The braking system in each of the embodiments has a frictional braking mechanism 7-$i$ ($i$=1, 2, 3, 4), such as a disc brake, for each wheel 2-$i$.

Each of these braking mechanisms 7-$i$ ($i$=1, 2, 3, 4) is connected to a braking system hydraulic circuit 6, and a hydraulic pressure (brake pressure) supplied from the braking system hydraulic circuit 6 generates a braking force for braking the rotation of a corresponding wheel 2-$i$.

In this case, the braking system hydraulic circuit 6 basically applies a brake pressure based on the amount of depression of the brake pedal (force on the pedal) to each braking mechanism 7-$i$ by interlocking with the operation of depressing the brake pedal (not shown) of the vehicle 1.

Further, in the vehicle 1 of each of the embodiments, the braking system hydraulic circuit 6 is capable of adjusting the brake pressure (consequently, the braking force on each wheel 2-$i$) applied to each braking mechanism 7-$i$ in response to a control command received from a controller 20, which is described later.

The vehicle 1 further includes a variety of sensors for detecting quantities to be observed, which will be discussed later, and the controller 20, which controls the behaviors and the like of the vehicle 1, in addition to the drive system, the steering system, and the braking system.

In each of the embodiments, the vehicle 1 is provided with sensors such as, for example, wheel rotational angular velocity sensors 8-$i$ ($i$=1, 2, 3, 4), which generate outputs based on the rotational angular velocity of each wheel 2-$i$, brake pressure sensors 9-$i$ ($i$=1, 2, 3, 4), which generate outputs based on the brake pressures supplied to the braking mechanism 7-$i$ of each wheel 2-$i$, a steering control angle sensor 10, which generates an output based on the steering angle (rotational angle) of the steering wheel 5, a transmission sensor 11, which generates an output based on the operating state (a transmission gear ratio or the like) of the transmission 3, an acceleration sensor 12, which generates an output based on the amount of depression of the accelerator pedal (not shown) of the vehicle 1, a yaw rate sensor 13, which generates an output based on a yaw rate, which is an angular velocity about the yaw axis of the vehicle 1 (about the vertical axis of the vehicle body 1B), a longitudinal acceleration sensor 14, which generates an output based on the acceleration in the direction of the roll axis (the longitudinal direction of the vehicle body 1B) of the vehicle 1, and a lateral acceleration sensor 15, which generates an output based on the acceleration in the direction of the pitch axis of the vehicle 1 (the lateral direction (horizontal direction) of the vehicle body 1B).

The controller 20 is an electronic circuit unit, which includes a CPU, a RAM, a ROM, and the like, and receives outputs (detection data) of the aforesaid sensors. The controller 20 then carries out predetermined arithmetic processing based on a program, which has been installed beforehand, while using the received detection data and set data, which has been stored and retained in advance, thereby controlling the behaviors of the vehicle 1.

In this case, the controller 20 has a function for controlling a behavior of the vehicle 1, such as a rotational motion about the yaw axis (turning motion) or a skid motion, to a desired behavior by, for example, controlling the braking force of each wheel 2-$i$ supplied by each braking mechanism 7-$i$ through the braking system hydraulic circuit 6.

Further, the controller 20 also has a function for sequentially estimating the state quantity (a skid angle, a skid speed, or the like) of the skid motion of the vehicle 1 or sequentially estimating a friction coefficient of a road surface on which the vehicle 1 is traveling, in order to carry out the processing of controlling the behavior of the vehicle 1.

The above has described the schematic configuration of the vehicle 1 in each embodiment to be described in the present specification.

The vehicle to which the present invention applies is not limited to the vehicle 1 having the configuration described above. For example, the motive power generating source of the drive system of the vehicle 1 may be an electric motor. Alternatively, both an engine and an electric motor may be installed in the vehicle 1 as motive power generating sources.

The driving wheels of the vehicle 1 may alternatively be the rear wheels 2-3 and 2-4, or both the front wheels 2-1, 2-2 and the rear wheels 2-3, 2-4. Further, the drive system may be constructed so as to be capable of individually adjusting the driving force to be supplied to each driving wheel from a motive power generating source.

The steering system of the vehicle 1 may be constructed to steer the rear wheels 2-3 and 2-4 by actuators appropriately in addition to steering the front wheels 2-1 and 2-2 by interlocking with the rotational operation of the steering wheel 5. The number of wheels does not have to be four.

Referring now to FIGS. 2($a$) and 2($b$), major reference characters (variables) and terms used in the following description of each embodiment is described below.

In FIGS. 2($a$) and 2($b$), variables preceded by "↑," such as ↑V1 and ↑F1, denote vector quantities. A vector quantity is expressed in the form of a column vector (a transposed vector of a row vector) when the components are represented using an appropriate coordinate system.

In the description of each embodiment, "x" is used as the arithmetic symbol of the multiplication of vector quantities (namely, an exterior product), while "*" is used as the arithmetic symbol of multiplication other than exterior products, such as the multiplication of scalar quantities or the multiplication of a scalar quantity and a vector quantity. To represent the transposition of a row vector, a superscript "T" is attached at top right of a component of the row vector.

In a vehicle body coordinate system, the longitudinal direction of the vehicle body 1B is an X-axis direction, while the lateral direction (the horizontal direction) of the vehicle body 1B is a Y-axis direction. In this case, the front direction of the vehicle body 1B is defined as the positive direction of the X-axis, while the left direction of the vehicle body 1B is defined as the positive direction of the Y-axis.

The X-axis direction of the vehicle body coordinate system may be referred to simply as the longitudinal direction or the direction of the roll axis of the vehicle 1 in some cases. Further, the Y-axis direction of the vehicle coordinate system may be referred to simply as the lateral direction or the direction of the pitch axis of the vehicle 1 in some cases. In addition, the direction of the yaw axis of the vehicle 1 (the vertical direction of the vehicle body 1B) is orthogonal to an XY plane of the vehicle body coordinate system (orthogonal to the X-axis and the Y-axis).

An i-th wheel coordinate system is a coordinate system in which a direction parallel to the rotational surface of an i-th wheel 2-$i$ (a plane orthogonal to the rotational axis of the i-th wheel 2-$i$), which is the longitudinal direction of the i-th wheel 2-$i$, is defined as the direction of the x-axis and the direction parallel to the rotational axis of an i-th wheel 2-$i$, which is the horizontal direction (lateral direction) of the i-th wheel 2-*i*, is defined as the direction of the y-axis when the vehicle 1 is observed from above in the direction of the yaw axis.

In this case, the front direction of the i-th wheel 2-*i* is defined as the positive direction of the x-axis and the left direction of the i-th wheel 2-*i* is defined as the positive direction of the y-axis. An xy plane of the i-th wheel coordinate system is parallel to an XY plane of the vehicle body coordinate system and orthogonal to the direction of the yaw axis of the vehicle 1.

Supplementally, the term "orthogonal" and "parallel" in the present specification do not mean only orthogonal and parallel in strict senses, but the terms may mean approximately orthogonal or parallel.

A reference character "δi" denotes the rudder angle (hereinafter referred to simply as the wheel rudder angle) of the i-th wheel 2-*i*. More specifically, each wheel rudder angle δi is an angle formed by the rotational surface of the i-th wheel 2-*i* relative to the x-axis direction of the vehicle body coordinate system when the vehicle 1 is observed from above in the yaw-axis direction. In the vehicle 1 according to the embodiment, the rear wheels 2-3 and 2-4 are non-steering wheels, so that δ3=δ4=0 always applies.

A reference character "↑Vg" denotes the moving speed vector of the center-of-gravity point of the vehicle 1 relative to a road surface (hereinafter referred to as "vehicle center-of-gravity velocity vector") observed by being projected onto the XY plane of the vehicle body coordinate system.

The vehicle center-of-gravity velocity vector ↑Vg is a vector composed of a component in the X-axis direction and a component in the Y-axis direction of the vehicle body coordinate system. In this case, the component in the X-axis direction of the vehicle center-of-gravity velocity vector ↑Vg will be denoted by Vgx and will be referred to as the vehicle center-of-gravity longitudinal velocity Vgx, and the component in the Y-axis direction will be denoted by Vgy and will be referred to as the vehicle center-of-gravity skid speed Vgy.

In other words, the vehicle center-of-gravity longitudinal velocity Vgx means the traveling speed (vehicle speed) of the vehicle 1. Although not shown in FIGS. 2(*a*) and 2(*b*), a temporal change rate (differential value) of the vehicle center-of-gravity longitudinal velocity Vgx will be referred to as the vehicle center-of-gravity longitudinal velocity change rate Vgdot_x and a temporal change rate (differential value) of the vehicle center-of-gravity skid speed Vgy will be referred to as the vehicle center-of-gravity skid speed change rate Vgdot_y.

A reference character "βg" denotes a skid angle of the center-of-gravity point of the vehicle 1 (hereinafter referred to as the vehicle center-of-gravity skid angle).

More specifically, the vehicle center-of-gravity skid angle βg is the angle formed by the vehicle center-of-gravity velocity vector ↑Vg with respect to the X-axis direction of the vehicle body coordinate system. Thus, $\beta g = \tan^{-1}(Vgy/Vgx)$ holds.

A reference character "↑Vi" denotes the moving speed vector of a ground contact portion of the i-th wheel 2-*i* relative to a road surface (hereinafter referred to simply as the advancing speed vector of the i-th wheel 2-*i* or simply as the wheel advancing speed vector), as observed by being projected onto the XY plane of the vehicle body coordinate system.

Each wheel advancing speed vector ↑Vi is a vector composed of a component in the X-axis direction and a component in the Y-axis direction of the vehicle body coordinate system. In this case, although not shown in FIGS. 2(*a*) and 2(*b*), the component in the X-axis direction of each wheel advancing speed vector ↑Vi will be denoted by Vx_i and the component in the Y-axis direction thereof will be denoted by Vy_i.

A reference character "↑Vsub_i" denotes a moving speed vector of the ground contact portion of the i-th wheel 2-*i* relative to the road surface (hereinafter referred to as the wheel advancing speed vector on the wheel coordinate system), as observed by being projected onto the xy plane of the i-th wheel coordinate system.

The wheel advancing speed vector on each wheel coordinate system ↑Vsub_i is a vector composed of a component in the x-axis direction and a component in the y-axis direction of the i-th wheel coordinate system. In this case, although not shown in FIGS. 2(*a*) and 2(*b*), the component in the x-axis direction of the wheel advancing speed vector on each wheel coordinate system ↑Vsub_i will be denoted by Vsubx_i, while the component in the y-axis direction of the wheel advancing speed vector on each wheel coordinate system ↑Vsub_i will be denoted by Vsuby_i.

The wheel advancing speed vector on the wheel coordinate system ↑Vsub_i of each wheel 2-*i* and the wheel advancing speed vector ↑Vi are vector quantities sharing the same spatial orientation and magnitude except that the coordinate systems for representing the vector quantities are different.

A reference character "βi" denotes a skid angle (hereinafter referred to simply as the wheel skid angle in some cases) of the i-th wheel 2-*i*.

More specifically, each wheel skid angle βi is the angle formed by the wheel advancing speed vector on the wheel coordinate system ↑Vsub_i of the i-th wheel 2-*i* with respect to the x-axis direction of the i-th wheel coordinate system. Thus, $\beta i = \tan^{-1}(Vsuby\_i/Vsubx\_i)$ holds.

A reference character "β0*i*" denotes an angle formed by the wheel advancing speed vector ↑Vi of the i-th wheel 2-*i* with respect to the X-axis direction of the vehicle body coordinate system (=βi+δi: hereinafter referred to as the wheel position skid angle). In the embodiment, the rear wheels 2-3 and 2-4 are non-steering wheels, so that β03=β3 and β04=β4 hold. Hence, β03 and β04 are not shown.

A reference character "γ" denotes an angular velocity about the yaw axis of the vehicle 1, that is, the yaw rate.

A reference character "df" denotes the interval between the front wheels 2-1 and 2-2 in the lateral direction of the vehicle 1 (the Y-axis direction of the vehicle body coordinate system), that is, the tread between the front wheels 2-1 and 2-2. A reference character "dr" denotes the interval between the rear wheels 2-3 and 2-4 in the lateral direction of the vehicle 1 (the Y-axis direction of the vehicle body coordinate system), that is, the tread between the rear wheels 2-3 and 2-4. Hereinafter, "df" will stand for the front wheel tread and "dr" will stand for the rear wheel tread.

A reference character "Lf" denotes the distance between the axle (rotating shaft) of the front wheels 2-1 and 2-2 and the center-of-gravity point of the vehicle 1 (the distance in the longitudinal direction of the vehicle 1) when δ1=δ2=0. A reference character "Lr" denotes the distance between the axle (rotating shaft) of the rear wheels 2-3 and 2-4 and the center-of-gravity point of the vehicle 1 (the distance in the longitudinal direction of the vehicle 1). Hereinafter, Lf stands for the distance between the front wheel axle and the center of gravity, while Lr stands for the distance between the rear wheel axle and the center of gravity.

A reference character "↑Pi" denotes a position vector of the i-th wheel 2-*i* (hereinafter referred to simply as the wheel position vector in some cases) as observed from the center-of-gravity point of the vehicle 1 when the vehicle 1 is observed from above in the yaw-axis direction.

Each wheel position vector ↑Pi is a vector composed of a component in the X-axis direction and a component in the Y-axis direction of the vehicle body coordinate system. In this case, although not shown in FIGS. 2(a) and 2(b), the component in the X-axis direction of each wheel position vector ↑Pi is denoted by Px_i while the component in the Y-axis direction thereof is denoted by Py_i.

In the case where the center-of-gravity point of the vehicle 1 in the Y-axis direction of the vehicle body coordinate system lies on the central line of the vehicle width of the vehicle 1, ↑P1=(Lf, df/2)$^T$, ↑P2=(Lf, −df/2)$^T$, ↑P3=(−Lr, df/2)$^T$, and ↑P4=(−Lr, −dr/2)$^T$ hold.

A reference character "↑Fi" denotes a road surface reaction force of the i-th wheel 2-i (a translational force vector acting from a road surface onto the i-th wheel 2-i), as observed by being projected onto the XY plane of the vehicle body coordinate system. Hereinafter, ↑Fi denotes a wheel two-dimensional road surface reaction force or a two-dimensional road surface reaction force.

The wheel two-dimensional road surface reaction force ↑Fi denotes a vector composed of a component in the X-axis direction and a component in the Y-axis direction of the vehicle body coordinate system. Here, spatially (three-dimensionally), the road surface reaction force acting on each wheel 2-i from a road surface is a resultant force vector of the driving/braking force, which is a translational force component in the x-axis direction of the i-th wheel coordinate system, a lateral force, which is a translational force component in the y-axis direction thereof, and a ground contact load, which is a translational force component in the yaw-axis direction.

Therefore, the wheel two-dimensional road surface reaction force ↑Fi is a vector obtained by representing the resultant vector of the driving/braking force and the lateral force of the i-th wheel 2-i (corresponding to the frictional force acting on the i-th wheel 2-i from a road surface) by means of the vehicle body coordinate system.

In this case, although not shown in FIGS. 2(a) and 2(b), the component in the X-axis direction of the wheel two-dimensional road surface reaction force ↑Fi is denoted by Fx_i and the component in the Y-axis direction thereof is denoted by Fy_i. In the following description, the spatial road surface reaction force as the resultant vector of the driving/braking force, the lateral force, and the ground contact load of each wheel 2-i is referred to as the wheel three-dimensional road surface reaction force or the three-dimensional road surface reaction force. Further, the ground contact load, which is a component in the yaw-axis direction of the three-dimensional road surface reaction force of each wheel 2-i, is denoted by Fz_i.

A reference character "↑Fsub_i" denotes the road surface reaction force of the i-th wheel 2-i as observed by being projected onto the xy plane of the i-th wheel coordinate system (hereinafter referred to as the wheel two-dimensional road surface reaction force on the wheel coordinate system).

Each wheel two-dimensional road surface reaction force on the wheel coordinate system ↑Fsub_i is a vector composed of a component in the x-axis direction of the i-th wheel coordinate system and a component in the y-axis direction thereof. In this case, although not shown in FIGS. 2(a) and 2(b), the component in the x-axis direction of each wheel two-dimensional road surface reaction force on the wheel coordinate system ↑Fsub_i is denoted by Fsubx_i and the component in the y-axis direction thereof is denoted by Fsuby_i.

The component in the x-axis direction Fsubx_i is, in other words, the driving/braking force of the i-th wheel 2-i. The component in the y-axis direction Fsuby_i is, in other words, the lateral force of the i-th wheel 2-i. The wheel two-dimensional road surface reaction force on the wheel coordinate system ↑Fsub_i of the i-th wheel 2-i and the wheel two-dimensional road surface reaction force ↑Fi of the i-th wheel 2-i are vector quantities sharing the same spatial orientation and magnitude except that the coordinate systems for representing the vector quantities are different.

A reference character "↑Fg_total" denotes a spatial translational force vector acting on the center-of-gravity point of the vehicle 1 (hereinafter referred to as the total road surface reaction force resultant translational force vector) due to the resultant force of the road surface reaction forces acting on the wheels 2-i (i=1, 2, 3, 4), i.e., the resultant force of the wheel three-dimensional road surface reaction forces (i=1, 2, 3, 4).

In this case, although not shown in FIGS. 2(a) and 2(b), the component in the X-axis direction of the vehicle body coordinate system of the total road surface reaction force resultant translational force vector ↑Fg_total is denoted by Fgx_total, the component in the Y-axis direction of the vehicle body coordinate system is denoted by Fgy_total, and the component in the yaw-axis direction is denoted by Fgz_total. The reference character Fgx_total may be referred to as the total road surface reaction force resultant longitudinal force and the reference character Fgy_total may be referred to as the total road surface reaction force resultant lateral force in some cases.

A reference character "Mgz_total" denotes a moment acting about the yaw axis at the center-of-gravity point of the vehicle 1 due to the resultant force of the road surface reaction forces acting on the wheels 2-i (i=1, 2, 3, 4), i.e., the resultant force of the i-th wheel three-dimensional road surface reaction forces (i=1, 2, 3, 4) (hereinafter the moment Mgz_total is referred to as the total road surface reaction force resultant yaw moment). The component in the yaw-axis direction Fgz_total of the resultant force of the wheel three-dimensional road surface reaction forces (i=1, 2, 3, 4) does not contribute to the total road surface reaction force resultant yaw moment Mqz_total.

Hence, the total road surface reaction force resultant yaw moment Mgz_total virtually represents the moment acting about the yaw axis at the center-of-gravity point of the vehicle 1 due to the resultant force of the wheel two-dimensional road surface reaction forces ↑Fi (i=1, 2, 3, 4), i.e., the resultant force of the driving/braking forces and the lateral forces of all wheels 2-i (i=1, 2, 3, 4).

Supplementally, in each of the embodiments described in the present specification, the resultant force of the road surface reaction forces acting on the wheels 2-i (i=1, 2, 3, 4) is regarded as the entire external force acting on the vehicle 1.

More specifically, the external forces acting on the vehicle 1 include air resistance and the like in addition to the road surface reaction force acting on each wheel 2-i from a road surface. In each of the embodiments, however, external forces other than road surface reaction forces are considered sufficiently small to be ignored, as compared with the resultant force of road surface reaction forces acting on the wheels 2-i (i=1, 2, 3, 4).

Thus, ↑Fg_total and Mgz_total mean a translational force vector and a moment, respectively, acting on the center-of-gravity point of the vehicle 1 due to the whole external force acting on the vehicle 1.

A reference character "NSP" denotes the neutral steer point of the vehicle 1. The NSP means the load application point (the working point) of the resultant force of the lateral forces Fsuby_i (i=1, 2, 3, 4) acting on all the wheels 2-i (i=1, 2, 3, 4) when a vehicle center-of-gravity skid angle βg (≠0) occurs while the vehicle 1 is traveling in a situation where δ1=δ2=0 holds.

More specifically, the NSP means an intersecting point of the straight line which passes the center-of-gravity point of the vehicle 1 and extends in the X-axis direction of the vehicle body coordinate system (the longitudinal direction of the vehicle 1) and the line of action of the resultant force of the lateral forces Fsuby_i (i=1, 2, 3, 4) acting on all wheels 2-i (i=1, 2, 3, 4) when the vehicle 1 is observed from above in the yaw-axis direction.

A reference character "Lnsp" denotes the distance between the center-of-gravity point of the vehicle 1 in the X-axis direction of the vehicle body coordinate system (the longitudinal direction of the vehicle 1) and the NSP (hereinafter referred to as the distance between the vehicle center of gravity and the NSP).

If the NSP lies on a rear side beyond the center-of-gravity point of the vehicle 1, then a value of the distance Lnsp between the vehicle center of gravity and the NSP is considered to be a positive value. If the NSP lies on a front side beyond the center-of-gravity point of the vehicle 1, then a value of the distance Lnsp between the vehicle center of gravity and the NSP is considered to be a negative value.

A reference character "Mnsp" denotes a moment acting about the yaw axis at the NSP (hereinafter referred to as the NSP yaw moment) due to the resultant force of the road surface reaction forces acting on the wheels 2-i (i=1, 2, 3, 4), that is, the resultant force of the wheel three-dimensional road surface reaction forces (i=1, 2, 3, 4) or the resultant force of the wheel two-dimensional road surface reaction forces ↑Fi (i=1, 2, 3, 4).

In other words, the NSP yaw moment Mnsp is a moment of the total sum of the total road surface reaction force resultant yaw moment Mgz_total and the moment generated about the yaw axis at the NSP by the total road surface reaction force resultant translational force vector ↑Fg_total (=Lnsp*Fgy_total).

Supplementally, in each of the embodiments, regarding the state quantities related to a rotational motion about the yaw axis, such as an angle about the yaw axis, an angular velocity, and angular acceleration (δi, δi, γ, and the like), and the moments about the yaw axis (Mgz_total, Mnsp, and the like), a counterclockwise direction is defined as a positive direction when the vehicle 1 is observed from above in the yaw-axis direction.

Although not shown in FIGS. 2(a) and 2(b), variables given below are used in the following description in addition to the aforesaid variables (reference characters).

A reference character "θh" denotes the steering angle of the steering wheel 5 (a rotational angle, which is hereinafter referred to as the steering control angle).

A reference character "γdot" denotes the angular acceleration about the yaw axis of the vehicle 1 (hereinafter referred to as the yaw angular acceleration).

A reference character "ωw_i" denotes the rotational angular velocity of the i-th wheel 2-i (hereinafter referred to simply as the wheel rotational angular velocity in some cases). A reference character "Rw_i" denotes the effective radius of the i-th wheel 2-i (hereinafter referred to simply as the effective wheel radius). A reference character "Vw_i" denotes the wheel speed of the i-th wheel 2-i defined as the product of ωw_i and Rw_i (=ωw_i*Rw_i), i.e., the velocity of the ground contact portion of the i-th wheel 2-i in the circumferential direction, as observed from the center of the rotation of the i-th wheel 2-i.

Each wheel speed Vw_i coincides with the component in the x-axis direction Vsubx_i of the wheel advancing speed vector on the wheel coordinate system ↑Vsub_i in a state wherein no slip of the i-th wheel 2-i exists.

A reference character "κi" denotes the slip rate of the i-th wheel 2-i (a longitudinal slip rate: hereinafter referred to simply as the wheel slip rate in some cases). A reference character "Tq_i" denotes a torque of the total sum of a driving torque supplied from the drive system of the vehicle 1 to the i-th wheel 2-i and a braking torque supplied from the braking system of the vehicle 1 (hereinafter referred to simply as the wheel torque in some cases). A reference character "Iw_i" denotes the inertia moment of the i-th wheel 2-i (hereinafter referred to simply as the wheel inertia moment in some cases).

A reference character "m" denotes the mass of the entire vehicle 1 (hereinafter referred to as the vehicle mass), and a reference character "Iz" denotes the inertia moment about the yaw axis of the entire vehicle 1 at the center-of-gravity pont of the vehicle 1 (hereinafter referred to as the vehicle yaw inertia moment).

A reference character "Accx" denotes the acceleration (=Vgdot_x−Vgy*γ) obtained by adding the component in the X-axis direction (=−Vgy*γ) of the vehicle body coordinate system of the acceleration generated at the center-of-gravity point of the vehicle 1 due to a centrifugal force from a turning motion of the vehicle 1 to the vehicle center-of-gravity longitudinal velocity change rate Vgdot_x.

A reference character "Accy" denotes the acceleration (=Vgdot_y+Vgx*γ) obtained by adding the component in the Y-axis direction (=Vgx*γ) of the vehicle body coordinate system of the acceleration generated at the center-of-gravity point of the vehicle 1 due to a centrifugal force from a turning motion of the vehicle 1 to the vehicle center-of-gravity skid speed change rate Vgdot_y.

In other words, the reference characters Accx and the Accy denote the component in the X-axis direction and the component in the Y-axis direction, respectively, of the acceleration of a motion at the center-of-gravity point of the vehicle 1 observed in the vehicle body coordinate system (a second-order differential value at the position of the center-of-gravity point in the vehicle body coordinate system). Hereinafter, the reference character Accx is referred to as the vehicle center-of-gravity longitudinal acceleration and the reference character Accy is referred to as the vehicle center-of-gravity lateral acceleration.

A reference character "μ" denotes the friction coefficient of a road surface (the coefficient of friction relative to each wheel 2-i: hereinafter referred to as the road surface friction coefficient in some cases).

The road surface friction coefficient μ in each of the embodiments is a relative friction coefficient, which uses, as the reference thereof, the coefficient of friction between a road surface in a certain reference state, such as a standard dry road surface (hereinafter referred to as the reference road surface) and each wheel 2-i. The road surface friction coefficient μ is considered to be the same at a ground contact location of any one of the wheels 2-i (i=1, 2, 3, 4).

A reference character "θbank" denotes the bank angle of a road surface (hereinafter referred to as the road surface bank angle in some cases). A reference character "θslope" denotes a slope angle of a road surface (hereinafter referred to as the road surface slope angle in some cases).

The road surface bank angle θbank is the inclination angle of a road surface relative to a horizontal plane, as observed in the direction of the roll axis of the vehicle 1. The road surface slope angle θslope is the inclination angle of a road surface relative to a horizontal plane, as observed in the direction of the pitch axis of the vehicle 1.

The road surface bank angle θbank is generally referred to as a cant angle of a road surface in an automotive engineering field. In the present specification, however, the term "bank angle" is used. In each of the embodiments described in the present specification, a road surface bank angle θbank in the case where the vehicle 1 on a road surface is in a right-down sloping posture is defined as a positive angle. Further, a road surface slope angle θslope in the case where the vehicle 1 on a road surface is in a front-down sloping posture is defined as a positive angle.

A reference character "Rot(δi)" denotes a coordinate transformation matrix for transforming a vector quantity expressed in the i-th wheel coordinate system (a vector quantity composed of a component in the x-axis direction and a component in the y-axis direction of the i-th wheel coordinate system) into a vector quantity expressed in the vehicle body coordinate system (a vector quantity composed of a component in the X-axis direction and a component in the Y-axis direction of the vehicle body coordinate system).

A coordinate transformation matrix R(δi) is a matrix (secondary square matrix), which is dependent on the rudder angle δi of the i-th wheel 2-i and which has column vectors $(\cos(\delta i), \sin(\delta i))^T$ and $(-\sin(\delta i), \cos(\delta i))^T$ as a component of a first column and a component of a second column, respectively.

In this case, if a certain vector quantity ↑A is denoted by $(ax, ay)^T$ on the i-th wheel coordinate system and denoted by $(Ax, Ay)^T$ on the vehicle body coordinate system, then the relationship between $(Ax, Ay)^T$ and $(ax, ay)^T$ is expressed by $(Ax, Ay)^T = Rot(\delta i)*(ax, ay)^T$.

Accordingly, the relationship between the wheel advancing speed vector ↑Vi of each of the wheels 2-i and the wheel advancing speed vector on the wheel coordinate system ↑Vsub_i is given by ↑Vi=Rot(δi)*↑Vsub_i. Similarly, the relationship between the wheel two-dimensional road surface reaction force ↑Fi of each of the wheels 2-i and the wheel two-dimensional road surface reaction force ↑Fsub_i on the wheel coordinate system is given by ↑Fi=Rot(δi)*↑Fsub_i.

The coordinate transformation matrix for transforming a vector quantity expressed in the vehicle body coordinate system into a vector quantity expressed in the i-th wheel coordinate system, i.e., an inverse matrix of Rot(δi), is Rot(−δi).

In the following description, the term "actual" will, in some cases, prefix a name or a designation, such as a state quantity or a vector quantity, like "an actual yaw rate" to represent the state quantity or the vector quantity of an actual value (true value).

In this case, a variable (reference character) denoting the state quantity or the vector quantity will be suffixed by "_act" (e.g., "γ_act").

Further, to express an observed value (a detected value or an estimated value) of a state quantity or a vector quantity, the name (designation) of the state quantity or the vector quantity will be suffixed by "detected value" or "estimated value" (e.g., "yaw rate detected value" or "yaw rate estimated value").

In this case, as a general rule, the term "estimated value" is used for an observed value calculated by a vehicle model computing means 24, which is described later, or other observed values generated on the basis of the calculated observed values.

A term "model estimated value," however, is used for an observed value, which is calculated by dynamic computation (computation of the dynamic model representing the dynamics of the vehicle) performed by the vehicle model computing means 24 and is appropriately modified to determine the final "estimated value" in each arithmetic processing cycle, in order to distinguish the observed value from the final "estimated value." In addition, the term "detected value" is used for an observed value, which is obtained on the basis of an output of a certain sensor without using the observed value calculated by the vehicle model computing means 24.

For a detected value, a variable (reference character) is suffixed by "_sens" such as, for example, "γ_sens." For an estimated value, a variable (reference character) is suffixed by "_estm" such as, for example, "γ_estm."

Further, for a model estimated value, a variable (reference character) is suffixed by "_predict" such as, for example, "γ_predict."

Further, to express a temporal change rate of a state quantity (a differential value based on time), "dot" is added in a variable (reference character) of the state quantity such as, for example, "γdot."

Based on the description given above, the embodiments of the present invention will be described in detail below.

[First Embodiment]

Figure 3:
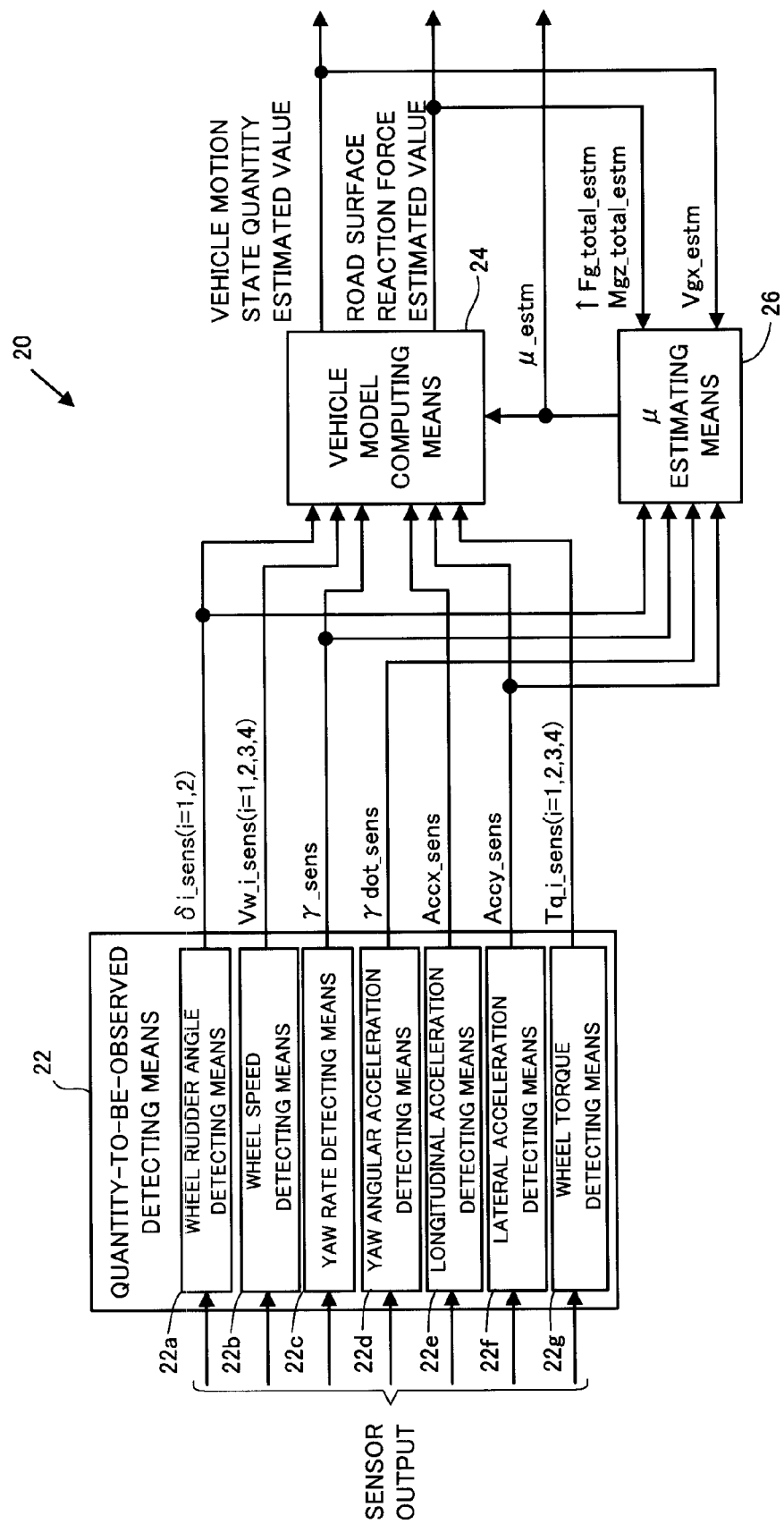
FIG. 3 is a block diagram illustrating the main functions of a controller in a first embodiment.

First, the processing of the controller 20 in a first embodiment will be described in detail. In this embodiment, as illustrated in the block diagram of FIG. 3, the controller 20 has, as major functional means, a quantity-to-be-observed detecting means 22, a vehicle model computing means 24, and a μ estimating means 26.

The quantity-to-be-observed detecting means 22 uses outputs from the aforesaid various sensors of the vehicle 1 (detection data) to carry out the processing for detecting predetermined types of quantities to be observed related to a behavior of the vehicle 1, and generates detected values of the quantities to be observed.

In this embodiment, the quantities to be observed by the quantity-to-be observed detecting means 22 include actual rudder angles δ1_act and δ2_act of steering wheels (front wheels) 2-1 and 2-2, an actual wheel speed Vw_i act (i=1, 2, 3, 4), an actual yaw rate γ_act and an actual yaw angular acceleration γdot_act of the vehicle 1, an actual vehicle center-of-gravity longitudinal acceleration Accx_act and an actual vehicle center-of-gravity lateral acceleration Accy_act, and an actual wheel torque Tq_i _act (i=1, 2, 3, 4).

To generate the detected values of the quantities to be observed, the quantity-to-be-observed detecting means 22 has a wheel rudder angle detecting means 22a, which generates wheel rudder angle detected values δ1_sens and δ2_sens of the front wheels 2-1 and 2-2, respectively, a wheel speed detecting means 22b, which generates the wheel speed detected value Vw_i_sens (i=1, 2, 3, 4), a yaw rate detecting means 22c, which generates a yaw rate detected value γ_sens, a yaw angular acceleration detecting means 22d, which generates a yaw angular acceleration detected value γdot_sens, a longitudinal acceleration detecting means 22e, which generates the vehicle center-of-gravity longitudinal acceleration detected value Accx_sens, a lateral acceleration detecting means 22f, which generates the vehicle center-of-gravity lateral acceleration detected value Accy_sens, and a wheel torque detecting means 22g, which generates a wheel torque detected value Tq_i_sens (i=1, 2, 3, 4).

The vehicle model computing means 24 estimates a road surface reaction force acting on each wheel 2-i by using a dynamic model, which includes a friction characteristic model that expresses a relationship between the slip between each wheel 2-i and a road surface and a road surface reaction force acting on the wheel 2-i from the road surface and a vehicle motion model that expresses a relationship between an external force acting on the vehicle 1 and a motion of the vehicle 1 (hereinafter referred to simply as the vehicle model in some cases), and the vehicle model computing means 24 further carries out the processing for estimating the state quantity of a motion of the vehicle 1 dynamically caused by the road surface reaction force acting as the external force on the vehicle 1.

To carry out the processing, the vehicle model computing means 24 receives the inputs of the detected values of the predetermined types of quantities to be observed (in this embodiment, δ1_sens, δ2_sens, Vw_i_sens, γ_sens, Accx_sens, Accy_sens, and Tq_i_sens), which have been generated by the quantity-to-be-observed detecting means 22, and also a latest road surface friction coefficient estimated value μ_estm, which has already been determined by the μ estimating means 26. Then, the vehicle model computing means 24 uses these input values and the aforesaid vehicle model to estimate the road surface reaction force of each wheel 2-$i$ or the state quantity of the motion of the vehicle 1.

To estimate the road surface reaction force of each wheel 2-$i$ or the state quantity of the motion of the vehicle 1, the vehicle model computing means 24 uses not only the aforesaid input values, but also the estimated values (including model estimated values) of the state quantity of the motion of the vehicle 1, which have already been obtained in the past arithmetic processing cycles.

The estimated values found by the vehicle model computing means 24 are roughly classified into a road surface reaction force estimated value, which is an estimated value related to a road surface reaction force, the translational motions in the longitudinal direction (the direction of the roll axis) and the lateral direction (the direction of the pitch axis) of the vehicle 1, and a vehicle motion state quantity estimated value, which is the estimated value of a state quantity related to a rotational motion about the yaw axis.

In this case, the road surface reaction force estimated value includes the estimated value of the driving/braking force Fsubx_i of each wheel 2-$i$, the estimated value of the lateral force Fsuby_i, and the estimated value of a ground contact load Fz_i, and further includes a total road surface reaction force resultant translational force vector estimated value ↑Fg_total_estm (Fgx_total_estm and Fgy_total_estm), and the total road surface reaction force resultant yaw moment estimated value Mgz_total_estm.

Further, the vehicle motion state quantity estimated value includes the yaw rate estimated value γ_estm, the vehicle center-of-gravity longitudinal velocity estimated value Vgx_estm, the vehicle center-of-gravity skid speed estimated value Vgy_estm, the vehicle center-of-gravity skid speed model estimated value Vgy_predict, and the like.

In this case, in this embodiment, more specifically, regarding the yaw rate γ, the vehicle center-of-gravity longitudinal velocity Vgx, and the vehicle center-of-gravity skid speed Vgy, a model estimated value for each is calculated and then each model estimated value is appropriately modified, by which the final estimated value in each arithmetic processing cycle is determined.

Regarding the yaw rate γ, however, the model estimated value γ_predict and the final estimated value γ_estm thereof are determined so as to coincide or substantially coincide with the yaw rate detected value γ_sens (so as not to deviate from γ_sens).

In the same manner, regarding the vehicle center-of-gravity longitudinal velocity Vgx, the model estimated value Vgx_predict and the final estimated value Vgx_estm thereof are determined so as to coincide or substantially coincide with the selected wheel speed detected value Vw_i_sens_select, which is described later, as the detected value of the vehicle speed (so as not to deviate from Vw_i_sens_select).

The μ estimating means 26 carries out the processing for estimating the friction coefficient μ of a road surface on which the vehicle 1 is traveling (the road surface friction coefficient μ).

To implement the processing, the μ estimating means 26 receives the inputs of δ1_sens, δ2_sens, γ_sens, γdot_sens, and Accy_sens among the detected values of the quantities to be observed, which have been generated by the quantity-to-be-observed detecting means 22, the total road surface reaction force resultant translational force vector estimated value ↑Fg_total_estm (more specifically, the total road surface reaction force resultant lateral force estimated value Fgy_total_estm of ↑Fg_total_estm) and the total road surface reaction force resultant yaw moment estimated value Mgz_total_estm calculated by the vehicle model computing means 24, and the vehicle center-of-gravity longitudinal velocity estimated value Vgx_estm among the vehicle motion state quantity estimated values calculated by the vehicle model computing means 24.

Then, the μ estimating means 26 uses these input values to calculate the road surface friction coefficient estimated value μ_estm, which is the estimated value of the road surface friction coefficient μ.

Figure 4:
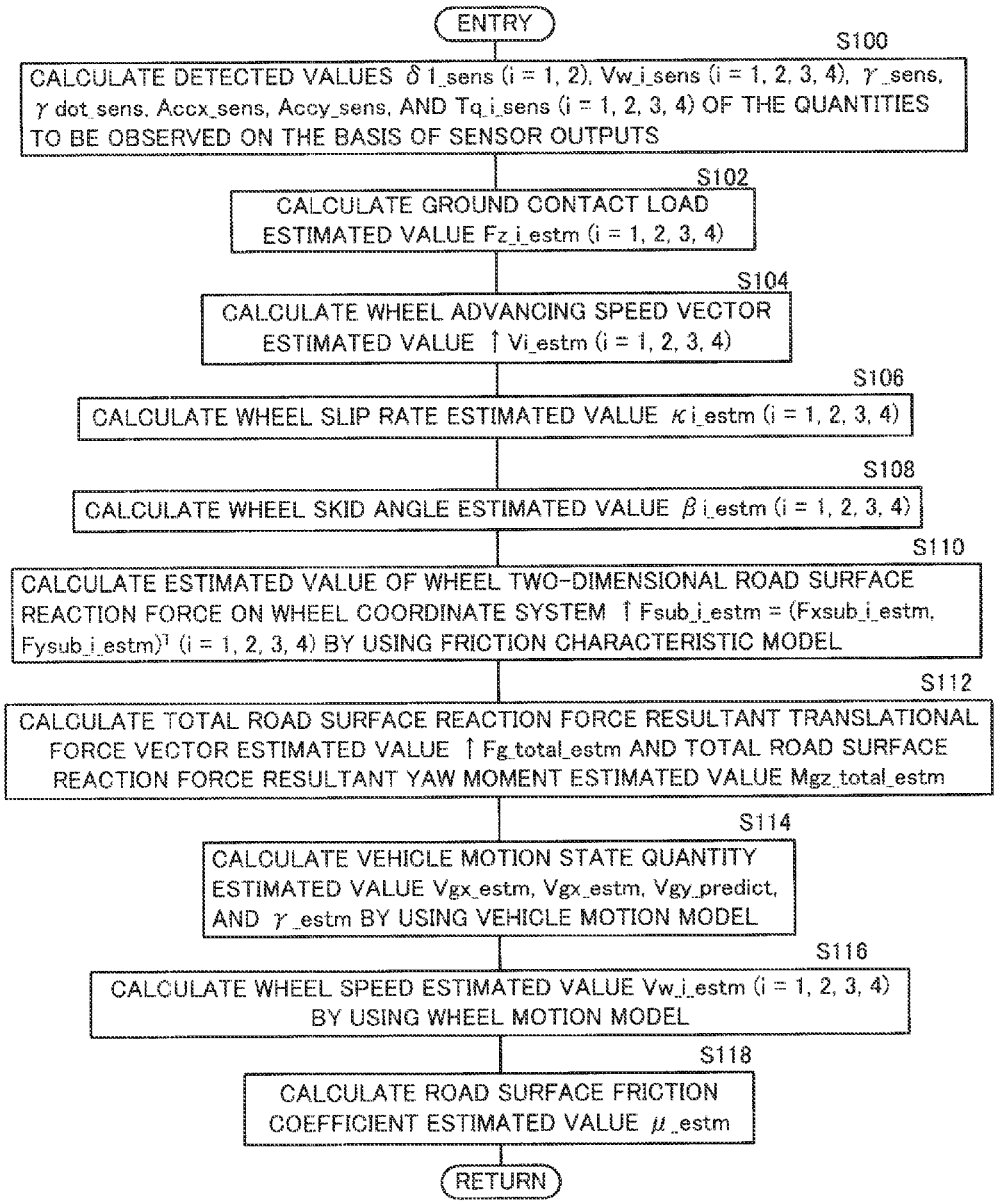
FIG. 4 is a flowchart illustrating processing of the controller in the first embodiment.

The controller 20 sequentially implements the processing illustrated in the flowchart of FIG. 4 at a predetermined arithmetic processing cycle by the quantity-to-be-observed detecting means 22, the vehicle model computing means 24, and the μ estimating means 26.

In the following description, in order to distinguish the value (a detected value, an estimated value, or the like) obtained in the current (present) arithmetic processing cycle of the controller 20 from a value obtained in the previous (last) arithmetic processing cycle, the former is referred to as "the current value" and the latter as "the previous value" in some cases. Further, the reference character of the previous value is suffixed by a suffix "_p" such as "γ_estm_p").

In this case, "the previous value" means the latest value among the values already obtained in past arithmetic processing cycles of the controller 20. Any value means a current value unless otherwise specified as a current value or a previous value.

Referring to FIG. 4, the controller 20 first carries out the processing of the quantity-to-be-observed detecting means 22 in S100.

The quantity-to-be-observed detecting means 22 generates the detected values δ1_sens, δ2_sens, Vw_i_sens (i=1, 2, 3, 4), γ_sens, γdot_sens, Accx_sens, Accy_sens, and Tq_i_sens of the quantities to be observed on the basis of the outputs of various sensors, including the wheel rotational angular velocity sensor 8-$i$ (i=1, 2, 3, 4), the brake pressure sensor 9-$i$ (i=1, 2, 3, 4), the steering control angle sensor 10, the transmission sensor 11, the acceleration sensor 12, the yaw rate sensor 13, the longitudinal acceleration sensor 14, and the lateral acceleration sensor 15.

More specifically, the wheel rudder angle detected values δ1_sens and δ2_sens are generated by the wheel rudder angle detecting means 22*a* on the basis of outputs of the steering control angle sensor 10.

Here, in this embodiment, the actual rudder angle δ1_act of the first wheel 2-1 and the actual rudder angle δ2_act of the second wheel 2-2 are the same, so that the δ1_sens is regarded as equal to δ2_sens. Accordingly, hereinafter, the rudder angles δ1 and δ2 of the front wheels 2-1 and 2-2 are generically referred to as a front rudder angle δf, and the wheel rudder angle detected values δ1_sens and δ2_sens will be generically referred to as a front wheel rudder angle detected value δf_sens.

Then, the wheel rudder angle detecting means 22a finds the front wheel rudder angle detected value δf_sens (=δ1_sens=δ2_sens) as the rudder angle detected value common to the front wheels 2-1 and 2-2 on the basis of a steering control angle detected value θh_sens, which is the value of a steering control angle (converted value) indicated by an output value of the steering control angle sensor 10, according to a preset relationship (in the form of a model, a map, or the like) between the steering control angle θh and the front wheel rudder angle δf.

For example, in the case where the steering mechanism of the vehicle 1 is constructed such that the actual rudder angles δ1_act and δ2_act of the front wheels 2-1 and 2-2 are substantially proportional to the actual steering control angle θh_act, the value δf_sens is calculated by multiplying the θh_sens by a preset proportional constant (the so-called overall steering ratio).

In the case where the steering mechanism of the steering system has a steering actuator, as with a power steering device, the operation state of the steering actuator or a state quantity defining the operation state may be detected in addition to the steering control angle detected value θh_sens or in place of the steering control angle detected value θh_sens and the detected value may be used to find the front wheel rudder angle detected value δf_sens.

Alternatively, a more accurate steering system model or the like may be used to individually find the rudder angle detected values δ1_sens and δ2_sens of the front wheels 2-1 and 2-2, respectively. Then, the average value of the individual rudder angle detected values δ1_sens and δ2_sens of the front wheels 2-1 and 2-2 (=(δ1_sens+δ2_sens)/2) may be found as the front wheel rudder angle detected value δf_sens that represents the actual rudder angles δ1_act and δ2_act of the front wheels 2-1 and 2-2.

The wheel speed detected values Vw_i_sens (i=1, 2, 3, 4) are generated by the wheel speed detecting means 22b on the basis of the outputs of the wheel rotational angular velocity sensors 8-i respectively corresponding thereto.

To be more specific, the wheel detecting means 22b finds the wheel speed detected value Vw_i_sens by multiplying the wheel rotational angular velocity detected value ωw_i_sens, which is the value of angular acceleration (converted value) indicated by an output value of the wheel rotational angular velocity sensor 8-i, by the value of a preset effective radius Rw_i of the i-th wheel 2-i for each wheel 2-i.

The yaw rate detected value γ_sens and the yaw angular acceleration detected value γdot_sens are generated by the yaw rate detecting means 22c and the yaw angular acceleration detecting means 22d, respectively, on the basis of the outputs of the yaw rate sensor 13.

More specifically, the yaw rate detecting means 22c generates the value (converted value) of the angular velocity, which is indicated by an output value of the yaw rate sensor 13, as the yaw rate detected value γ_sens. In addition, the yaw angular acceleration detecting means 22d differentiates the yaw rate detected value γ_sens (finds a temporal change rate) to generate the yaw angular acceleration detected value γdot_sens, or generates the value (converted value) of the angular acceleration, which is indicated by the value obtained by differentiating an output value of the yaw rate sensor 13, as the yaw angular acceleration detected value γdot_sens.

Alternatively, the yaw angular acceleration detected value γdot_sens can be generated on the basis of an output of a different sensor from the yaw rate sensor 13.

For instance, two acceleration sensors are installed in the vehicle body 1B such that the sensors are spaced away from each other with an interval Lacc provided therebetween in the direction orthogonal to the direction of the yaw axis of the vehicle 1 (e.g., in the direction of the roll axis or the pitch axis of the vehicle 1). In this case, these two acceleration sensors are disposed such that the two acceleration sensors sense the acceleration in a direction orthogonal to the direction of the interval between the two acceleration sensors and to the direction of the yaw axis.

This arrangement allows the yaw angular acceleration detected value γdot_sens to be generated by dividing the difference between the acceleration detected values indicated by the output values of the two acceleration sensors by the interval Lacc.

The vehicle center-of-gravity longitudinal acceleration detected value Accx_sens is generated by the longitudinal acceleration detecting means 22e on the basis of an output of the longitudinal acceleration sensor 14. Further, the vehicle center-of-gravity lateral acceleration detected value Accy_sens is generated by the lateral acceleration detecting means 22f on the basis of an output of the lateral acceleration sensor 15.

Here, in this embodiment, the position of the center-of-gravity point of the vehicle 1 is identified beforehand, and the longitudinal acceleration sensor 14 and the lateral acceleration sensor 15 are fixed to the vehicle body 1B such that the sensors are positioned at the center-of-gravity point. The longitudinal acceleration sensor 14 and the lateral acceleration sensor 15 may be an acceleration sensor formed as an integral structure (a two-axis acceleration sensor).

The longitudinal acceleration detecting means 22e generates the value (converted value) of the acceleration indicated by an output value of the longitudinal acceleration sensor 14 as the vehicle center-of-gravity longitudinal acceleration detected value Accx_sens. The lateral acceleration detecting means 22f generates the value (converted value) of the acceleration indicated by an output value of the lateral acceleration sensor 15 as the vehicle center-of-gravity lateral acceleration detected value Accy_sens.

Even if the longitudinal acceleration sensor 14 or the lateral acceleration sensor 15 is disposed at a position deviating from the center-of-gravity point of the vehicle 1, the vehicle center-of-gravity longitudinal acceleration detected value Accx_sens or the vehicle center-of-gravity lateral acceleration detected value Accy_sens can be generated by correcting the acceleration detected value indicated by an output value of the sensor 14 or 15 according to the yaw angular acceleration detected value γdot_sens (or the differential value of the yaw rate detected value γ_sens).

For example, if the longitudinal acceleration sensor 14 is disposed at a position which is away to the left side from the center-of-gravity point of the vehicle 1 by an interval denoted by Ly, then the vehicle center-of-gravity longitudinal acceleration detected value Accx_sens can be generated by adding the value, which is obtained by multiplying the yaw angular acceleration detected value γdot_sens (or the differential value of the yaw rate detected value γ_sens) by Ly, to the acceleration detected value indicated by an output value of the longitudinal acceleration sensor 14 (the detected value of the acceleration at the position of the sensor 14).

Similarly, if the lateral acceleration sensor 15 is disposed at a position which is away to the front side from the center-of-gravity point of the vehicle 1 by an interval denoted by Lx, then the vehicle center-of-gravity lateral acceleration detected value Accy_sens can be generated by subtracting the value obtained by multiplying the yaw angular acceleration detected value γdot_sens (or the differential value of the yaw rate detected value γ_sens) by Lx from the acceleration detected value indicated by an output value of the lateral acceleration sensor 15 (the detected value of the acceleration at the position of the sensor 15).

Supplementally, the acceleration detected (sensed) by the longitudinal acceleration sensor 14 carries a meaning as the component in the longitudinal direction of the vehicle body 1B (the component in the X-axis direction of the vehicle body coordinate system) of an acceleration vector generated at the center-of-gravity point of the vehicle 1 by the entire external force (resultant force) acting on the vehicle 1 (the acceleration vector obtained by dividing the translational force vector acting on the center-of-gravity point of the vehicle 1 due to the entire external force by a vehicle 1 mass m).

In this case, if the actual road surface slope angle θslope_act is zero, then the acceleration sensed by the longitudinal acceleration sensor 14 is the actual vehicle center-of-gravity longitudinal acceleration Accx_act itself as the proper object to be detected.

Meanwhile, if the actual road surface slope angle θslope_act is not zero, then the longitudinal direction (the X-axis direction) of the vehicle body 1B, which is the sensing direction of the longitudinal acceleration sensor 14, is inclined by θslope_act relative to a horizontal plane.

Hence, the longitudinal acceleration sensor 14 senses not only the actual vehicle center-of-gravity longitudinal acceleration Accx_act but also an acceleration component in a direction parallel to the longitudinal direction of the vehicle body 1B ($=-g*\sin(\theta slope\_act)$; g: Gravitational acceleration constant) of the gravitational acceleration.

Thus, the vehicle center-of-gravity longitudinal acceleration detected value Accx_sens as the acceleration indicated by an output of the longitudinal acceleration sensor 14 is actually the detected value of the acceleration obtained by superimposing an acceleration component in a direction parallel to the longitudinal direction of the vehicle body 1B of the gravitational acceleration onto the actual vehicle center-of-gravity longitudinal acceleration Accx_act ($=Accx\_act-g*\sin(\theta slope\_act)$) (This includes the case where θslope_act is zero).

Similarly to the above, the acceleration detected (sensed) by the lateral acceleration sensor 15 carries a meaning as the component in the lateral direction of the vehicle body 1B (the component in the Y-axis direction of the vehicle body coordinate system) of an acceleration vector generated at the center-of-gravity point of the vehicle 1 by the entire external force (resultant force) acting on the vehicle 1.

In this case, if the actual road surface bank angle θbank_act is zero, then the acceleration sensed by the lateral acceleration sensor 15 is the actual vehicle center-of-gravity lateral acceleration Accy_act itself as the proper object to be detected.

Meanwhile, if the actual road surface bank angle θbank_act is not zero, then the lateral direction (the Y-axis direction) of the vehicle body 1B, which is the sensing direction of the lateral acceleration sensor 15, is inclined by θbank_act relative to a horizontal plane.

Hence, the lateral acceleration sensor 15 senses not only the actual vehicle center-of-gravity lateral acceleration Accy_act but also an acceleration component in a direction parallel to the lateral direction of the vehicle body 1B ($=g*\sin(\theta bank\_act)$) of the gravitational acceleration.

Thus, the vehicle center-of-gravity lateral acceleration detected value Accy_sens as the acceleration indicated by an output of the lateral acceleration sensor 15 is actually the detected value of the acceleration obtained by superimposing an acceleration component in a direction parallel to the lateral direction of the vehicle body 1B of the gravitational acceleration onto the actual vehicle center-of-gravity lateral acceleration Accy_act ($=Accy\_act+g*\sin(\theta bank\_act)$) (This includes the case where θbank_act is zero).

In the following description, the acceleration defined as the sum of the vehicle center-of-gravity longitudinal acceleration Accx and the acceleration component in the direction parallel to the longitudinal direction of the vehicle body 1B ($=-g*\sin(\theta slope)$) of the gravitational acceleration ($=Accx-g*\sin(\theta slope)$) (that is, the acceleration sensed by the longitudinal acceleration sensor 14) is referred to as the sensed-by-sensor longitudinal acceleration Accx_sensor.

Similarly, the acceleration defined as the sum of the vehicle center-of-gravity lateral acceleration Accy and the acceleration component in the direction parallel to the lateral direction of the vehicle body 1B ($=g*\sin(\theta bank)$) of the gravitational acceleration ($=Accx+g*\sin(\theta bank)$) (that is, the acceleration sensed by the lateral acceleration sensor 15) is referred to as the sensed-by-sensor lateral acceleration Accy_sensor.

The sensed-by-sensor longitudinal acceleration Accx_sensor agrees with the vehicle center-of-gravity longitudinal acceleration Accx when θslope is zero. The sensed-by-sensor lateral acceleration Accy_sensor agrees with the vehicle center-of-gravity lateral acceleration Accy when θbank is zero.

In a precise sense, therefore, the vehicle center-of-gravity longitudinal acceleration detected value Accx_sens generated by the longitudinal acceleration detecting means 22e and the vehicle center-of-gravity lateral acceleration detected value Accy_sens generated by the lateral acceleration detecting means 22f mean the detected value of the sensed-by-sensor longitudinal acceleration Accx_sensor and the detected value of the sensed-by-sensor lateral acceleration Accy_sensor, respectively.

The wheel torque detected value Tq_i_sens (i=1, 2, 3, 4) is generated by the wheel torque detecting means 22g on the basis of an output of the brake pressure sensor 9-i and outputs of the acceleration sensor 12 and the transmission sensor 11 corresponding thereto.

To be specific, the wheel torque detecting means 22g recognizes an output torque (required torque) of the engine 3 from the detected value of the amount of depression on the accelerator pedal indicated by an output value of the acceleration sensor 12 and also recognizes the reduction ratio between the engine 3 and each wheel 2-i from the detected value of the transmission gear ratio of the transmission 4a indicated by an output value of the transmission sensor 4a.

Then, the wheel torque detecting means 22g finds the driving torque to be transmitted to each wheel 2-i from the engine 3 (the driving torque to be imparted to each wheel 2-i by the drive system of the vehicle 1) on the basis of the recognized output torque of the engine 3 and the aforesaid reduction ratio.

Further, the wheel torque detecting means 22g finds the braking torque to be imparted to each wheel 2-i from each braking mechanism 7-i (the braking torque to be imparted to each wheel 2-i by the braking system of the vehicle 1) on the basis of the brake pressure detected value indicated by an output value of the brake pressure sensor 9-i.

Then, the wheel torque detecting means 22g calculates the value of a torque of the total sum of the found driving torque and braking torque (a resultant torque) as the wheel torque detected value Tq_i_sens for each wheel 2-i.

The above has described the details of the processing in S100 (the processing of the quantity-to-be-observed detecting means 22).

In the processing of the quantity-to-be-observed detecting means 22, an output of a sensor may be passed through a filter, such as a high-cut filter, for removing a high-frequency noise component and then input to the detecting means 22a to 22g.

Alternatively, the detected value of a quantity to be observed, which has been obtained by using an output of a sensor as it is, may be taken as a provisional detected value, and the provisional detected value may be passed through a filter, such as a high-cut filter, to generate a formal detected value of the quantity to be observed.

Regarding the vehicle center-of-gravity lateral acceleration detected value Accy, in particular, if a means for detecting or estimating the roll angle of the vehicle body 1B (a relative inclination angle about the roll axis of the vehicle body 1B with respect to a road surface) is provided (the aforesaid means is, for example, a means which detects the stroke of a suspension by a sensor and calculates the roll angle of the vehicle body 1B from the detected value thereof), then an influence portion of an output of the lateral acceleration sensor 15 attributable to a roll motion of the vehicle body 1B (an influence portion of the gravitational acceleration contained in an output of the acceleration sensor 15 caused by the tilting of the lateral acceleration sensor 15 by a roll angle of the vehicle body 1B) is estimated by using an observed value of the roll angle. Then, preferably, the estimated influence portion is subtracted from the acceleration detected value indicated by an output value of the lateral acceleration sensor 15 so as to obtain the vehicle center-of-gravity lateral acceleration detected value Accy.

After carrying out the processing of the quantity-to-be-observed detecting means 22 as described above, the controller 20 carries out the processing of S102 to S116 by the vehicle model computing means 24.

Figure 5:
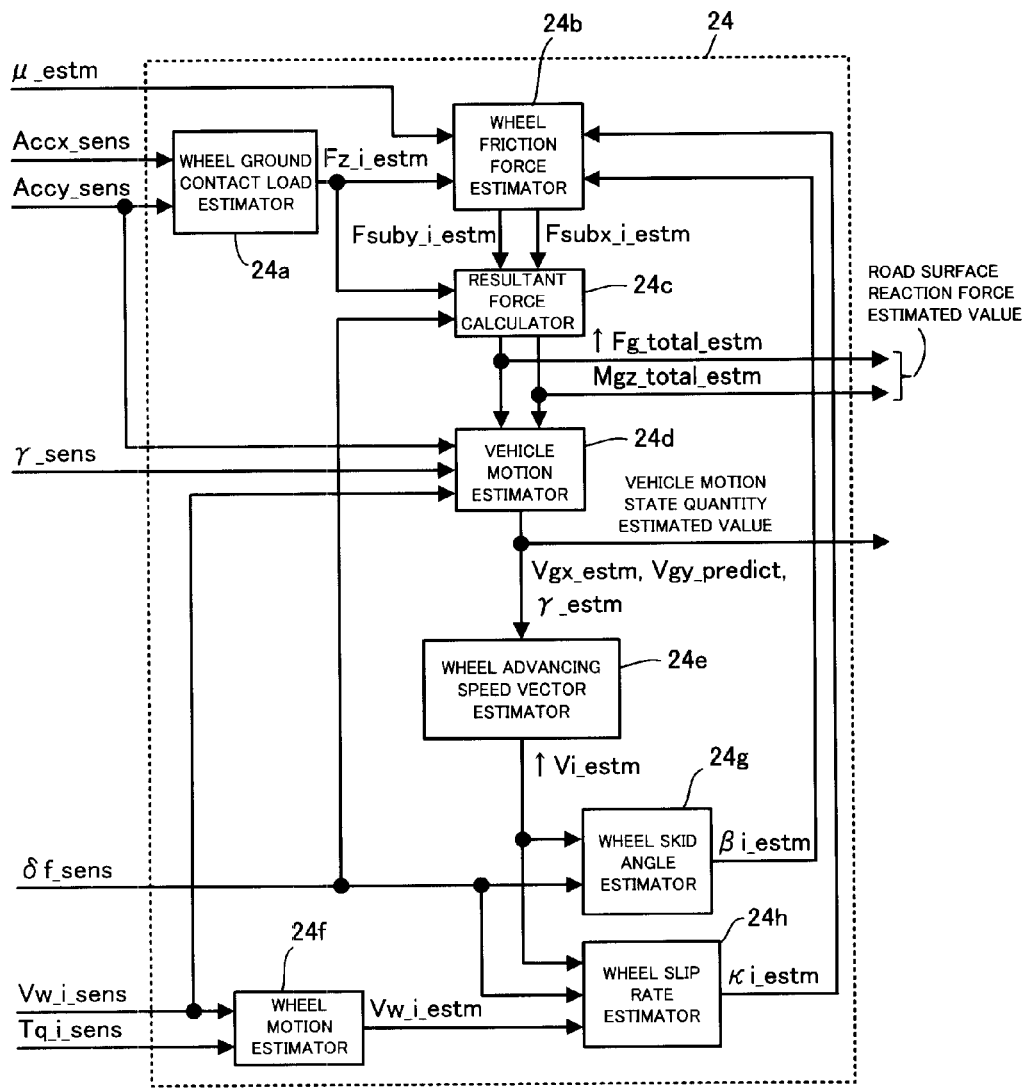
FIG. 5 is a block diagram illustrating the functions of a vehicle model computing means illustrated in FIG. 3.

The following describes the processing in detail with reference to FIG. 4 and FIG. 5.

As illustrated in FIG. 5, the vehicle model computing means 24 has, as the functions thereof, a wheel ground contact load estimator 24a, which finds a ground contact load estimated value Fz_i_estm of each wheel 2-i, a wheel friction force estimator 24b, which finds a driving/braking force estimated value Fsubx_i_estm, which is the estimated value of a component in the x-axis direction of the wheel two-dimensional road surface reaction force ↑Fsub_i on the wheel coordinate system of each wheel 2-i, and a lateral force estimated value Fsuby_i_estm, which is the estimated value of a component in the y-axis direction thereof, a resultant force calculator 24c, which finds the total road surface reaction force resultant translational force vector ↑Fg_total_estm and the total road surface reaction force resultant yaw moment Mgz_total_estm, a vehicle motion estimator 24d, which finds a vehicle motion state quantity estimated value (including a model estimated value), a wheel advancing speed vector estimator 24e, which finds the wheel advancing speed vector estimated value ↑Vi_estm of each wheel 2-i, a wheel motion estimator 24f, which finds the wheel speed estimated value Vw_i_estm of each wheel 2-i, a wheel skid angle estimator 24g, which finds a wheel skid angle estimated value βi_estm of each wheel 2-i, and a wheel slip rate estimator 24h, which finds the wheel slip rate estimated value κi_estm of each wheel 2-i.

In the processing of S102 to S116, first, in S102, the wheel ground contact load estimator 24a calculates the ground contact load estimated value Fz_i_estm of each wheel 2-i.

In this case, according to this embodiment, the wheel ground contact load estimator 24a uses the vehicle center-of-gravity longitudinal acceleration detected value Accx_sens and the vehicle center-of-gravity lateral acceleration detected value Accy_sens of the detected values of quantities to be observed, which have been obtained in S100, to calculate the ground contact load estimated value Fz_i_estm (i=1, 2, 3, 4) according to an expression 1-1 given below.

$$Fz\_i\_estm = Fz0\_i + Wx\_i * Accx\_sens + Wy\_i * Accy\_sens \qquad \text{Expression 1-1}$$

where, in expression 1-1, Fz0_i denotes a value of the ground contact load Fz_i of the i-th wheel 2-i in a state where the vehicle 1 is parked (stationary) on a horizontal road surface (hereinafter referred to as the ground contact load reference value), Wx_i denotes a weighting factor, which defines a change in the ground contact load Fz_i of the i-th wheel 2-i dependent upon the vehicle center-of-gravity longitudinal acceleration Accx (a change from Fz0_i), and Wy_i denotes a weighting factor, which defines a change in the ground contact load Fz_i of the i-th wheel 2-i dependent upon the vehicle center-of-gravity lateral acceleration Accy (a change from Fz0_i). The values of these Fz0_i, Wx_i, and Wy_i are predetermined values that have been set beforehand.

Thus, according to expression 1-1, a change in the ground contact load Fz_i (an increased or decreased quantity from the ground contact load reference value Fz0_i) of each wheel 2-i attributable to the acceleration of the center-of-gravity point of the vehicle 1 (the acceleration in a direction orthogonal to the yaw-axis direction) is found by linearly combination of the vehicle center-of-gravity longitudinal acceleration detected value Accx_sens and the vehicle center-of-gravity lateral acceleration detected value Accy_sens. Then, the change is added to the ground contact load reference value Fz0_i to obtain the ground contact load estimated value Fz_i_estm.

Alternatively, the relationship between the vehicle center-of-gravity longitudinal acceleration Accx and the vehicle center-of-gravity lateral acceleration Accy and the ground contact load Fz_i may be formed into a map beforehand, and the ground contact load estimated value Fz_i_estm of each wheel 2-i may be found on the basis of the map according to the vehicle center-of-gravity longitudinal acceleration detected value Accx_sens and the vehicle center-of-gravity lateral acceleration detected value Accy_sens.

The Fz_i_estm may be found by reflecting the dynamic characteristic of a suspension device, which is not shown, of the vehicle 1.

For example, the dynamic characteristic of the suspension device of the vehicle 1 is modeled in association with a rotational motion about the roll axis of the vehicle body 1B (a roll motion) or a rotational motion about the pitch axis thereof (a pitch motion) in advance. Then, motional state quantity related to the roll motion or the pitch motion, e.g., the inclination angle of the vehicle body 1B about the roll axis or the observed value of the changing velocity thereof, and the inclination angle of the vehicle body 1B about the pitch axis or the observed value of the changing velocity thereof, and the aforesaid model indicating the dynamic characteristic of the suspension device are used to estimate the translational force in the vertical direction (the yaw-axis direction) acting on each wheel 2-i from the suspension device.

Then, for each wheel 2-i, the estimated translational force and the gravity acting on the wheel 2-i are added to find the ground contact load estimated value Fz_i_estm of each wheel 2-i. This makes it possible to further enhance the accuracy of the ground contact load estimated value Fz_i_estm (i=1, 2, 3, 4).

If the change in the ground contact load Fz_i of each wheel 2-i is regarded sufficiently small, then the processing in S102 may be omitted and the ground contact load estimated value Fz_i_estm may be set to a predetermined value that has been set beforehand (e.g., the ground contact load reference value Fz0_i).

In the case where the ground contact load estimated value Fz_i_estm (i=1, 2, 3, 4) is determined without using the vehicle center-of-gravity longitudinal acceleration detected value Accx_sens and the vehicle center-of-gravity lateral acceleration detected value Accy_sens as described above, there is no need to input Accx_sens and Accy_sens to the wheel ground contact load estimator 24a.

Subsequently, in S104, the wheel advancing speed vector estimator 24e calculates the wheel advancing speed vector estimated value ↑Vi_estm of each wheel 2-i.

In this case, the wheel advancing speed vector estimator 24e calculates each wheel advancing speed vector estimated value ↑Vi_estm (=(Vx_i_estm, Vy_i_estm)$^T$) according to expression 1-2 given below on the basis of the vehicle center-of-gravity longitudinal velocity estimated value Vgx_estm_p of the vehicle motion state quantity estimated value (the previous value) calculated by the processing in S114 (the processing by the vehicle motion estimator 24d), which is described later, in a previous arithmetic processing cycle, the vehicle center-of-gravity skid speed model estimated value Vgy_predict_p, the yaw rate estimated value γ_estm_p, and each wheel position vector ↑Pi (=(Px_i, Py_i)$^T$), which has been set beforehand.

Expression 1-2

↑Vi_estm = (Vx_i_estm, Vy_i_estm)$^T$

= (Vgx_estm_p, Vgy_predict_p)$^T$ +

(−Py_i ∗ γestm_p, Px_i ∗ γestm_p)$^T$ where the second term of the right side of expression 1-2 means a relative speed of the i-th wheel 2-i with respect to the center-of-gravity point of the vehicle 1 (a relative speed in the direction orthogonal to the yaw-axis direction) produced by a rotational motion about the yaw axis of the vehicle 1 (a rotational motion in which the value of the yaw rate is γestm_p).

In place of the yaw rate estimated value (the previous value) γ_estm_p of expression 1-2, a yaw rate detected value γ_sens (the previous value or the current value) may be used. In addition, in place of the vehicle center-of-gravity longitudinal velocity estimated value (the previous value) Vgx_estm_p of expression 1-2, the selected wheel speed detected value Vw_i_sens select (the previous value or the current value), which is described later, may be used.

Subsequently, in S106, the wheel slip rate estimator 24h calculates the wheel slip rate estimated value κi_estm of each wheel 2-i.

In this case, the wheel slip rate estimator 24h calculates each wheel slip rate estimated value κi_estm on the basis of the front wheel rudder angle detected value (the current value) δf_sens (=δ1_sens=δ2_sens) of the detected values of the quantities to be observed that have been obtained in S100, the wheel speed estimated value (the previous value) Vw_i_estm_p (i=1, 2, 3, 4) calculated by the processing in S116 (the arithmetic processing by the wheel motion estimator 24f), which is discussed later, in the previous arithmetic processing cycle, and the wheel advancing speed vector estimated value (the current value) ↑Vi_estm (i=1, 2, 3, 4) calculated in S114.

To be more specific, the wheel slip rate estimator 24h first calculates the wheel advancing speed vector estimated value on the wheel coordinate system ↑Vsub_i_estm by coordinate-transforming the wheel advancing speed vector estimated value ↑Vi_estm according to expression 1-3 given below for each wheel 2-i.

↑Vsub_i_estm=Rot(−δi_sens)∗↑Vi_estm    Expression 1-3

In this case, in expression 1-3, the front wheel rudder angle detected value δf_sens is used as the values of δ1_sens and δ2_sens for the front wheels 2-1 and 2-2.

Further, in this embodiment, the rear wheels 2-3 and 2-4 are non-steering wheels, so that the values of δ3_sens and δ4_sens in expression 1-3 are zero. Hence, the arithmetic processing of expression 1-3 may be omitted for the rear wheels 2-3 and 2-4, because ↑Vsub_3_estm=↑V3_estm and ↑Vsub_4_estm=↑V4_estm hold.

If the estimated value of a component in the y-axis direction Vsuby_i_estm of the wheel advancing speed vector estimated value on each wheel coordinate system ↑Vsub_i_estm is not used for the arithmetic processing (the processing in S108 or the like), which is discussed later, then the estimated value of only the component in the x-axis direction Vsubx_i_estm of the wheel advancing speed vector estimated value on each wheel coordinate system ↑Vsub_i_estm may be calculated.

Then, the wheel slip rate estimator 24h calculates the wheel slip rate estimated value κi_estm according to expression 1-4 given below for each wheel 2-i on the basis of estimated value of the component in the x-axis direction Vsubx_i_estm of the wheel advancing speed vector estimated value on the wheel coordinate system ↑Vsub_i_estm calculated as described above and the wheel speed estimated value (the previous value) Vw_i_estm_p.

κi_estm=(Vsubx_i_estm−Vw_i_estm_p)/
max(Vsubx_i_estm,Vw_i_estm_p)    Expression 1-4

In this case, when the vehicle 1 is accelerated by imparting the driving force from the drive system of the vehicle 1 to the front wheels 2-1 and 2-2, which are the driving wheels, Vsubx_i_estm≤Vw_i_estm_p holds, by which κi_estm≤0 holds. When the vehicle 1 is decelerated by imparting a braking force from the braking system of the vehicle 1 to each wheel 2-i, Vsubx_i_estm≥Vw_i_estm_p holds, by which κi_estm≥0 holds.

In place of the wheel speed estimated value (the previous value) Vw_i_estm_p of expression 1-4, the wheel speed detected value Vw_i_sens (the previous value or the current value) may be used. In this case, the wheel motion estimator 24f, which is described in detail later, is unnecessary.

Subsequently, in S108, the wheel skid angle estimator 24g calculates the wheel skid angle estimated value βi_estm of each wheel 2-i.

In this case, the wheel skid angle estimator 24g calculates each wheel skid angle estimated value βi_estm on the basis of the front wheel rudder angle detected value δf_sens (=δ1_sens=δ2_sens) of the detected values of the quantities to be observed, which have been obtained in S100, and the wheel advancing speed vector estimated value ↑Vi_estm (i=1, 2, 3, 4) calculated in S104.

To be specific, the wheel skid angle estimator 24g first calculates the wheel position skid angle estimated value β0i_estm for each wheel 2-i according to expression 1-5 given below on the basis of the estimated value of a component in the X-axis direction Vx_i_estm of the wheel advancing speed vector estimated value ↑Vi_estm and the estimated value of a component in the Y-axis direction Vy_i_estm.

β0i_estm=tan$^{-1}$(Vy_i_estm/Vx_i_estm)    Expression 1-5

Then, wheel skid angle estimator 24g calculates the wheel skid angle estimated value βi_estm for each wheel 2-i according to expression 1-6 given below on the basis of the wheel position skid angle estimated value β0i_estm calculated as described above and the rudder angle detected value δi_sens.

$$\beta i\_estm = \beta 0i\_estm - \delta i\_sens \qquad \text{Expression 1-6}$$

In this case, in expression 1-6, the front wheel rudder angle detected value δf_sens is used as the values of δ1_sens and δ2_sens for the front wheels 2-1 and 2-2.

Further, in this embodiment, the rear wheels 2-3 and 2-4 are non-steering wheels, and therefore the values of δ3_sens and δ4_sens in expression 1-6 are zero. Hence, β3_estm=β03_estm and β4_estm=β04_estm hold.

The wheel skid angle estimated value βi_estm may be calculated according to expression 1-7 given below on the basis of the estimated value of a component in the x-axis direction Vsubx_i_estm and the estimated value of a component in the y-axis direction Vsuby_i_estm of the wheel advancing speed vector estimated value on the wheel coordinate system ↑Vsub_i_estm calculated according to the aforesaid expression 1-3.

$$\beta i\_estm = \tan^{-1}(Vsuby\_i\_estm/Vsubx\_i\_estm) \qquad \text{Expression 1-7}$$

Subsequently, in S110, the wheel friction force estimator 24b calculates the estimated value of the wheel two-dimensional road surface reaction force on the wheel coordinate system ↑Fsub_i (=(Fsubx_i_estm, Fsuby_i_estm)$^T$) of each wheel 2-i.

Here, the wheel friction force estimator 24b has a friction characteristic model, which expresses the relationship between the slip between each wheel 2-i and a road surface and the road surface reaction force acting on the wheel 2-i from the road surface.

The friction characteristic model in this embodiment represents the driving/braking force Fsubx_i of the wheel two-dimensional road surface reaction force on the wheel coordinate system ↑Fsub_i as the friction force acting on each wheel 2-i from a road surface and the lateral force Fsuby_i as the functions using the wheel slip rate κi and the wheel skid angle βi, which indicate the slip state of the i-th wheel 2-i, the ground contact load Fz_i, and the road surface friction coefficient μ as input parameters, as represented by expressions 1-8 and 1-9 given below.

$$Fsubx\_i = func\_fx\_i(\kappa i, \beta i, Fz\_i, \mu) \qquad \text{Expression 1-8}$$

$$Fsuby\_i = func\_fy\_i(\kappa i, \beta i, Fz\_i, \mu) \qquad \text{Expression 1-9}$$

In this case, the function func_fx_i (κi, βi, Fz_i, μ) of the right side of expression 1-8, i.e., a function func_fx_i, which defines the relationship between Fsubx_i and κi, βi, Fz_i, and μ, is represented by expression 1-8a given below in an example of this embodiment.

$$func\_fx\_i(\kappa i, \beta i, Fz\_i, \mu) = \mu * Cslp\_i(\kappa i) * Cattx\_i(\beta i) * Fz\_i \qquad \text{Expression 1-8a}$$

Cslp_i(κi) in this expression 1-8a denotes a coefficient that defines the characteristic of changes in the driving/braking force Fsubx_i caused by a change in the wheel slip rate κi, and Cattx_i(βi) denotes a coefficient that defines the characteristic of changes in the driving/braking force Fsubx_i caused by changes in the wheel skid angle βi (consequently, changes in the lateral force Fsuby_i).

Figure 6A:
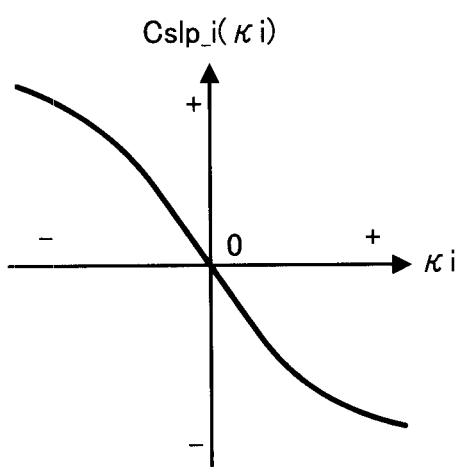
FIGS. 6(*a*) and 6(*b*) are graphs for describing the processing of a wheel slip rate estimator illustrated in FIG. 5.

The relationship between Cslp_i(κi) and κi is set as illustrated in, for example, the graph of FIG. 6(a). In other words, the relationship is set such that the coefficient Cslp_i(κi) becomes a monotonically decreasing function relative to the wheel slip rate κi.

More specifically, the relationship between Cslp_i(κi) and κi is set such that the value of the function_func_fx_i (=driving/braking force Fsubx_i) changes in the negative direction (the direction in which the braking force increases) as the magnitude of the wheel slip rate κi increases in a situation where κi>0 holds (a situation where the vehicle 1 is decelerating), while the value of the function_func_fx_i (=driving/braking force Fsubx_i) changes in the positive direction (the direction in which the driving force increases) as the magnitude of the wheel slip rate κi increases in a situation where κi<0 holds (a situation where the vehicle 1 is accelerating).

According to the relationship illustrated in FIG. 6(a), the coefficient Cslp_i(κi) has a saturation characteristic relative to the wheel slip rate κi. This means that the magnitude of the rate of change in Cslp_i(κi) in response to changes in κi (the value obtained by differentiating Cslp_i(κi) by κi) decreases as the absolute value of κi increases.

Figure 6B:
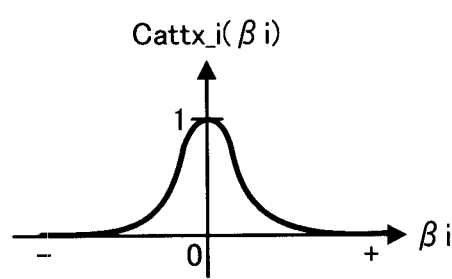

Further, the relationship between the coefficient Cattx_i (βi) and the wheel skid angle βi is set as illustrated in, for example, the graph of FIG. 6(b).

More specifically, the relationship is set such that the value of the coefficient Cattx_i(βi) changes toward 0 from 1 as the absolute value of the wheel skid angle βi increases from zero. In other words, the relationship between Cattx_i(βi) and βi is set such that the magnitude of the value of the function_func_fx_i (=driving/braking force Fsubx_i) decreases as the absolute value of the wheel skid angle βi increases.

This is because, in general, the magnitude of the lateral force Fsuby_i increases and consequently the magnitude of the driving/braking force Fsubx_i decreases as the absolute value of the wheel skid angle βi increases.

Accordingly, the friction characteristic model represented by expressions 1-8 and 1-8a indicates that the driving/braking force Fsubx_i of the i-th wheel 2-i is proportional to the road surface friction coefficient μ and the ground contact load Fz_i and that the Fsubx_i is a monotonically decreasing function relative to the wheel slip rate κi and also represents the relationship in which the magnitude of Fsubx_i decreases as the absolute value of the wheel skid angle βi increases.

Further, the function func_fy_i (κi, βi, Fz_i, μ) of the right side of expression 1-9, i.e., the function func_fy$_{13}$ i defining the relationship between Fsuby_i and κi, βi, Fz_i, μ is represented by expression 1-9a given below in an example of this embodiment.

$$func\_fy\_i(\kappa i, \beta i, Fz\_i, \mu) = \mu * Cbeta\_i(\beta i) * Catty\_i(\kappa i) * Fz\_i \qquad \text{Expression 1-9a}$$

Cbeta_i(βi) in this expression 1-9a denotes a coefficient that defines the characteristic of changes in the lateral force Fsuby_i caused by changes in the wheel skid angle βi, and Catty_i(κi) denotes a coefficient that defines the characteristic of changes in the lateral force Fsuby_i caused by changes in the wheel slip rate κi (i.e., changes in the driving/braking force Fsubx_i).

Figure 7A:
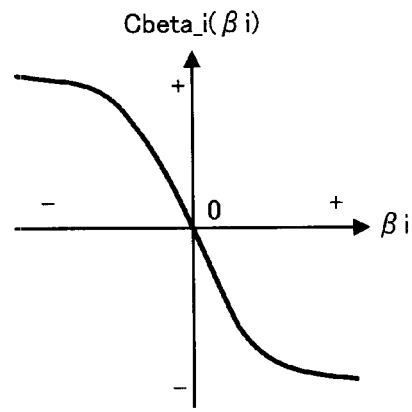
FIGS. 7(*a*) and 7(*b*) are graphs for describing the processing of a wheel skid angle estimator illustrated in FIG. 5.

The relationship between Cbeta_i(βi) and βi is set, for example, as illustrated in the graph of FIG. 7(a). More specifically, the relationship is set such that the coefficient Cbeta_i(βi) becomes a monotonically decreasing function relative to the wheel skid angle βi.

More specifically, the relationship between Cbeta_i(βi) and βi is set such that the value of the function func_fy_i (=lateral force Fsuby_i) increases in the negative direction (the right direction of the i-th wheel 2-i) as the magnitude of the wheel skid angle βi increases in a situation where βi>0 holds (a situation where Vsuby_i>0 holds), while the value of the function func_fy_i (=lateral force Fsuby_i) increases in the positive direction (the left direction of the i-th wheel 2-$i$) in a situation where $\beta i<0$ holds (a situation where Vsuby_i<0 holds).

Figure 7B:
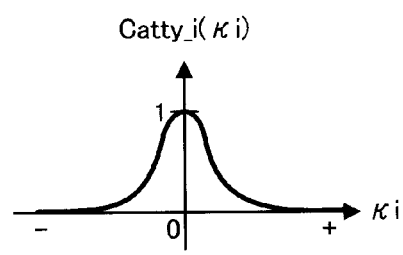

According to the relationship illustrated in FIG. 7($a$), the coefficient Cbeta_i($\beta$i) has a saturation characteristic relative to the wheel skid angle $\beta$i. This means that the magnitude of the rate of change in coefficient Cbeta_i($\beta$i) in response to changes in $\beta$i (the value obtained by differentiating Cbeta_i ($\beta$i) by $\beta$i) decreases as the absolute value of $\beta$i increases.

Further, the relationship between the coefficient Catty_i ($\kappa$i) and the wheel slip rate $\kappa$i is set as illustrated in, for example, the graph of FIG. 7($b$).

More specifically, the relationship is set such that the value of the coefficient Catty_i($\kappa$i) changes toward 0 from 1 as the absolute value of the wheel slip rate $\kappa$i increases from zero. In other words, the relationship between Cattyx_i($\kappa$i) and $\kappa$i is set such that the magnitude of the lateral force Fsuby_i as the value of the function func_fy_i decreases as the absolute value of the wheel slip rate $\kappa$i increases.

This is because, in general, the magnitude of the driving/braking force Fsubx_i increases and consequently the magnitude of the lateral force Fsuby_i decreases as the absolute value of the wheel slip rate $\kappa$i increases.

Accordingly, the friction characteristic model represented by expressions 1-9 and 1-9a indicates that the lateral force Fsuby_i of the i-th wheel 2-$i$ is proportional to the road surface friction coefficient $\mu$ and the ground contact load Fz_i and that the Fsuby_i is a monotonically decreasing function relative to the wheel skid angle $\beta$i and also represents the relationship in which the magnitude of Fsuby_i decreases as the absolute value of the wheel slip rate $\kappa$i increases.

In S110, the wheel friction force estimator 24$b$ finds the wheel two-dimensional road surface reaction force estimated value on the wheel coordinate system ↑Fsub_i of each wheel 2-$i$ by using the friction characteristic model set as described above.

To be more specific, for each wheel 2-$i$, the wheel friction force estimator 24$b$ computes the right side of expression 1-8a and the right side of expression 1-9a by using the wheel slip rate estimated value $\kappa$i_estm calculated in S106, the wheel skid angle estimated value $\beta$i_estm calculated in S108, the ground contact load estimated value Fz_i_estm calculated in S102, and the road surface friction coefficient estimated value $\mu$_estm_p calculated by the processing in S122 (the arithmetic processing by the $\mu$ estimating means 26), which is described later, in the previous arithmetic processing cycle as the values of the input parameters of the function func_fx_i ($\kappa$i, $\beta$, Fz_i, $\mu$) and func_fy_i ($\kappa$i, $\beta$i, Fz_i, $\mu$), respectively.

Then, the wheel friction force estimator 24$b$ sets the value of the function func_fx_i found by the computation of expression 1-8a as the driving/braking force estimated value Fsubx_i_estm, which is the estimated value of the component in the x-axis direction of the estimated value of the wheel two-dimensional road surface reaction force on the wheel coordinate system ↑Fsub_i.

The wheel friction force estimator 24$b$ also sets the value of the function func_fy_i found by the computation of expression 1-9a as the lateral force estimated value Fsuby_i_estm, which is the estimated value of the component in the y-axis direction of the estimated value of the wheel two-dimensional road surface reaction force on the wheel coordinate system ↑Fsub_i. In this case, the value of the coefficient Cslp_i ($\kappa$i) required to compute the right side of expression 1-8a is determined from the wheel slip rate estimated value $\kappa$i_estm on the basis of a map indicating the relationship illustrated in FIG. 6($a$).

Further, the value of the coefficient Catty_i($\beta$i) required to compute the right side of expression 1-8a is determined from the wheel skid angle estimated value $\beta$i_estm on the basis of a map indicating the relationship illustrated in FIG. 6($b$).

The value of Cbeta_i($\beta$i) required to compute the right side of expression 1-9a is determined from the wheel skid angle estimated value $\beta$i_estm on the basis of a map representing the relationship illustrated in FIG. 7($a$).

The value of the coefficient Cattx_i($\kappa$i) required to compute the right side of expression 1-9a is determined from the wheel slip rate estimated value $\kappa$i_estm on the basis of a map representing the relationship illustrated in FIG. 7($b$).

Thus, the driving/braking force estimated value Fsubx_i_estm and the lateral force estimated value Fsuby_i_estm as the estimated values of the road surface reaction force (friction force) dependant upon the road surface friction coefficient $\mu$ out of the road surface reaction force acting on each wheel 2-$i$ are calculated by using a latest value of the road surface friction coefficient estimated value $\mu$_estm (the previous value $\mu$_estm_p) and the friction characteristic model.

Supplementally, in this embodiment, the function func_fx_i has been set such that the driving/braking force Fsubx_i of each wheel 2-$i$ is proportional to the road surface friction coefficient $\mu$. Alternatively, however, the function func_fx_i may be set according to, for example, expression 1-8b given below.

$$\text{func\_}fx\_i(\kappa i, \beta i, Fz\_i, \mu) = Cslp2\_i(\mu, \kappa i) * Cattx\_i(\beta i) * Fz\_i \qquad \text{Expression 1-8b}$$

In expression 1-8b, Cslp2_i($\mu$, $\kappa$i) denotes a coefficient that defines the characteristic of changes in the driving/braking force Fsubx_i caused by changes in the road surface friction coefficient $\mu$ and the wheel slip rate $\kappa$i, and the coefficient Cslp2_i($\mu$, $\kappa$i) is obtained by further generalizing $\mu$*Cslp_i ($\kappa$i) in expression 1-8a described above.

Figure 8:
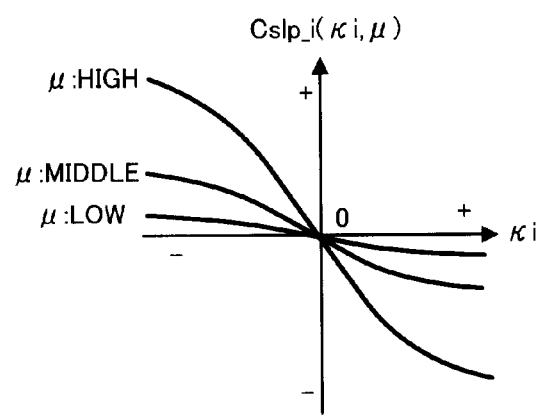
FIG. 8 is a graph for describing the processing of another mode of the wheel slip rate estimator illustrated in FIG. 5.

In this case, the relationship between the coefficient Cslp2_i($\mu$, $\kappa$i) and the road surface friction coefficient $\mu$ and the wheel slip rate $\kappa$i is set as illustrated in the graph of FIG. 8 by, for example, a map. The relationship is set such that the coefficient Cslp2_i($\mu$, $\kappa$i) becomes a monotonically decreasing function relative to the wheel slip rate $\kappa$i and the absolute value thereof becomes a monotonically increasing function relative to the road surface friction coefficient $\mu$.

FIG. 8 representatively illustrates a graph of Cslp2_i($\mu$, $\kappa$i) corresponding to the values of three different types of road surface friction coefficients $\mu$.

Further, according to the relationship illustrated in FIG. 8, the coefficient Cslp2_i($\mu$, $\kappa$i) has a saturation characteristic relative to the wheel slip rate $\kappa$i. This means that, if the absolute value of $\kappa$i increases, the magnitude of the rate of change (the value obtained by partially differentiating Cslp2_i($\mu$, $\kappa$i) by $\kappa$i) in the coefficient Cslp2_i($\mu$, $\kappa$i) in response to an increase in $\kappa$I decreases as the absolute value of $\kappa$i increases.

In the case where the function func_fx_i is set as described above, a non-linear relationship can be set between the driving/braking force Fsubx_i of each wheel 2-$i$ and the road surface friction coefficient $\mu$.

For the function func_fy_i related to the lateral force Fsuby_i of each wheel 2-$i$, a coefficient Cbeta2_i ($\mu$, $\beta$i) that defines the characteristic of changes in the lateral force Fsuby_i caused by changes in the road surface friction coefficient $\mu$ and the wheel skid angle $\beta$i may be used in place of $\mu$*Cbeta_i($\beta$i) in expression 1-9a, as with the case of the function func_fx_i related to the driving force Fsubx_i.

The function func_fy_i related to the lateral force Fsuby_i of each wheel 2-$i$ may be formed with the driving/braking force Fsubx_i as an input parameter in place of the wheel slip rate κi. In this case, as the value of Fsubx_i, the driving/braking force estimated value Fsubx_i_estm found as described above using the function func_fx_i of the aforesaid expression 1-8a or 1-8b may be used. Alternatively, however, for example, the driving/braking force detected value Fsubx_i_sens found as follows may be used as the value of Fsubx_i.

More specifically, in the aforesaid S100, the driving/braking force detected value Fsubx_i_sens is found according to expression 1-8c given below on the basis of the wheel torque detected value Tq_i_sens and the wheel speed detected value Vw_i_sens of each wheel 2-$i$ generated by the quantity-to-be-observed detecting means 22.

$$F\text{sub}x\_i\_sens=Tq\_i\_sens/Rw\_i-V w\text{dot}\_i\_sens*Iw\_i/Rw\_i^2 \quad \text{Expression 1-8c}$$

Vwdot_i_sens of the right side of expression 1-8c denotes the temporal change rate (a differential value) of the wheel speed detected value Vw_i_sens. Predetermined values that have been set in advance are used as the values of the wheel effective radius Rw_i and the wheel inertia moment Iw_i in expression 1-8c.

The second term of the right side of expression 1-8c may be replaced by a term ωwdot_i_sens*Iw_i/Rw_i using ωwdot_i_sens, which is a differential value of the wheel rotational angular velocity detected value ωw_i_sens indicated by an output value of the wheel rotational angular velocity sensor 8-$i$.

Referring back to the description with reference to FIG. 4, subsequently in S112, the resultant force calculator 24c calculates the total road surface reaction force resultant translational force vector estimated value ↑Fg_total_estm and the total road surface reaction force resultant yaw moment estimated value Mgz_total_estm.

In this case, the resultant force calculator 24c calculates the total road surface reaction force resultant translational force vector estimated value ↑Fg_total_estm and the total road surface reaction force resultant yaw moment estimated value Mgz_total_estm on the basis of the ground contact load estimated value Fz_i_estm of each wheel 2-$i$ calculated in S102, the driving/braking force estimated value Fsubx_i_estm and the lateral force estimated value Fsuby_i_estm of each wheel 2-$i$ calculated in S110, and the front wheel rudder angle detected value δf_sens (=δ1_sens=δ2_sens) of the detected values of the quantities to be observed that have been obtained in S100.

To be more specific, the resultant force calculator 24c first coordinate-transforms the estimated value of the two-dimensional road surface reaction force vector on the wheel coordinate system ↑Fsub_i_estm (=(Fsubx_i_estm, Fsuby_i_estm)$^T$) onto the vehicle body coordinate system for each wheel 2-$i$ according to expression 1-10 given below to calculate the two-dimensional road surface reaction force vector estimated value $$\uparrow Fi\_estm=(Fx\_i\_estm, Fy\_i\_estm)^T.$$

$$\uparrow Fi\_estm=\text{Rot}(\delta i\_sens)*\uparrow F\text{sub}\_i\_estm \quad \text{Expression 1-10}$$

In this case, regarding the front wheels 2-1 and 2-2 in expression 1-10, the front wheel rudder angle detected value δf_sens is used as the values for δ1_sens and δ2_sens.

Further, in this embodiment, since the rear wheels 2-3 and 2-4 are non-steering wheels, the values of δ3_sens and δ4_sens in expression 1-10 are assumed to be zero. Hence, the arithmetic processing of expression 1-10 may be omitted for the rear wheels 2-3 and 2-4, because ↑F3_estm=↑Fsub_3_estm and ↑F4_estm=↑Fsub_4_estm hold.

Subsequently, the resultant force calculator 24c calculates the total road surface reaction force resultant translational force vector estimated value ↑Fg_total_estm (=(Fgx_total_estm, Fgy_total_estm, Fgz_total_estm)$^T$) according to expression 1-11 given below, and also calculates the total road surface reaction force resultant yaw moment estimated value Mgz_total_estm according to expression 1-12 given below.

$$\uparrow Fg\_total\_estm=(\Sigma Fx\_i\_estm, \Sigma Fy\_i\_estm, \Sigma Fz\_i\_estm)^T \quad \text{Expression 1-11}$$

$$Mgz\_total\_estm=\Sigma(\uparrow Pi \times \uparrow Fi\_estm) \quad \text{Expression 1-12}$$

The symbol Σ in expressions 1-11 and 1-12 means the total sum on all wheels 2-$i$ (i=1, 2, 3, 4). "↑Pi×↑Fi_estm" in the right side of expression 1-12 denotes the exterior product of the wheel position vector ↑Pi of the i-th wheel 2-$i$ and the two-dimensional road surface reaction force vector estimated value ↑Fi_estm, meaning the moment about the yaw axis generated at the center-of-gravity point of the vehicle 1 by the two-dimensional road surface reaction force vector estimated value ↑Fi_estm of the i-th wheel 2-$i$.

Supplementally, the calculation of the component in the yaw-axis direction Fgz_total_estm of ↑Fg_total_estm may be omitted.

Subsequently, in S114, the vehicle motion estimator 24d calculates the vehicle center-of-gravity longitudinal velocity estimated value Vgx_estm, the vehicle center-of-gravity skid speed estimated value Vgy_estm, the vehicle center-of-gravity skid speed model estimated value Vgy_predict, the yaw rate estimated value γ_estm, and the like, as the vehicle motion state quantity estimated value (including the model estimated value).

Here, the vehicle motion estimator 24d has a vehicle motion model representing the relationship between the resultant force of road surface reaction forces as an external force acting on the vehicle 1 and motions of the vehicle 1. The vehicle motion model in this embodiment is represented by expressions 1-13 to 1-15 given below.

$$Fgx\_total=m*(Vgdot\_x-Vgy*\gamma) \quad \text{Expression 1-13}$$

$$Fgy\_total=m*(Vgdot\_y+Vgx*\gamma) \quad \text{Expression 1-14}$$

$$Mgz\_total=Iz*\gamma\text{dot} \quad \text{Expression 1-15}$$

Expressions 1-13 and 1-14 respectively denote the equations of the dynamics related to the translational motion of the center-of-gravity point of the vehicle 1 in the X-axis direction and the Y-axis direction of the vehicle body coordinate system. Similarly, expression 1-15 denotes the equation of the dynamics related to the rotational motion about the yaw axis of the vehicle 1.

The vehicle motion model in this embodiment is based on the assumption that the road surface on which the vehicle 1 is traveling is a horizontal surface (the road surface bank angle θbank and the road surface slope angle θslope are both zero).

In S114, the vehicle motion estimator 24d calculates the vehicle motion state quantity estimated value by using the vehicle motion models represented by the above expressions 1-13 to 1-15 and the total road surface reaction force resultant translational force vector estimated value ↑Fg_total_estm and the total road surface reaction force resultant yaw moment estimated value Mgz_total_estm, which have been calculated in S112.

In this case, the previous values of some vehicle motion state quantity estimated values are also used for the calculation thereof. Further, some vehicle motion state quantity estimated values are calculated so as to approach the detected values obtained in S100 (so as not to deviate from the detected values).

To be more specific, the vehicle motion estimator 24d calculates the vehicle center-of-gravity longitudinal velocity change rate estimated value Vgdot_x_estm, the vehicle center-of-gravity skid speed change rate estimated value Vgdot_y_estm, and the yaw angular acceleration estimated value γdot_estm, respectively, according to the following expressions 1-13a to 1-15a obtained based on the aforesaid expressions 1-13 to 1-15.

$$Vgdot\_x\_estm = Fgx\_total\_estm/m + Vgy\_predict\_p * \gamma\_estm\_p \quad \text{Expression 1-13a}$$

$$Vgdot\_y\_estm = Fgy\_total\_estm/m - Vgx\_estm\_p * \gamma\_estm\_p \quad \text{Expression 1-14a}$$

$$\gamma dot\_estm = Mgz\_total\_estm/Iz \quad \text{Expression 1-15a}$$

In this case, Fx_total_estm, Fy_total_estm, and Mgz_total_estm in expressions 1-13a to 1-15a respectively denote the values calculated in S112 (the current values), and Vgy_predict_p, Vgx_estm_p, and γ_estm_p respectively denote the values found in S114 (the previous values) in a previous arithmetic processing cycle.

Further, the value of the vehicle mass m in expressions 1-13a and 1-14a and the value of the vehicle yaw inertia moment Iz in expression 1-15a use predetermined values that have been set beforehand.

Supplementally, the yaw rate detected value γ_sens (the previous value or the current value) may be used in place of the yaw rate estimated value (the previous value) γ_estm_p of expression 1-13a and expression 1-14a. In addition, a selected wheel speed detected value Vw_i_sens select (the previous value or the current value) may be used in place of the vehicle center-of-gravity longitudinal velocity estimated value (the previous value) Vgx_estm_p of expression 1-14a.

Subsequently, the vehicle motion estimator 24d calculates the vehicle center-of-gravity longitudinal velocity model estimated value Vgx_predict as the value of the vehicle center-of-gravity longitudinal velocity on the vehicle motion model, the vehicle center-of-gravity skid speed model estimated value Vgy_predict as the value of the vehicle center-of-gravity skid speed on the vehicle motion model, and the yaw rate model estimated value γ_predict as the value of the yaw rate on the vehicle motion model, respectively, according to expressions 1-18, 1-19, and 1-20 given below on the basis of the vehicle center-of-gravity longitudinal velocity change rate estimated value Vgdot_x_estm, the vehicle center-of-gravity skid speed change rate estimated value Vgdot_y_estm, the yaw angular acceleration estimated value γdot_estm, the previous value Vgx_estm_p of the vehicle center-of-gravity longitudinal velocity estimated value, the previous value Vgy_predict_p of the vehicle center-of-gravity skid speed model estimated value, and the previous value γ_estm_p of the yaw rate estimated value, which have been found as described above.

$$Vgx\_predict = Vgx\_estm\_p + Vgdot\_x\_estm * \Delta T \quad \text{Expression 1-18}$$

$$Vgy\_predict = Vgy\_predict\_p + Vgdot\_y\_estm * \Delta T \quad \text{Expression 1-19}$$

$$\gamma\_predict = \gamma\_estm\_p + \gamma dot\_estm * \Delta T \quad \text{Expression 1-20}$$

The symbol ΔT in expressions 1-18 to 1-20 denotes the arithmetic processing cycle of the controller 20. The right sides of these expressions 1-18 to 1-20 correspond to the integral computation of Vgdot_x_estm, the integral computation of Vgdot_y_estm, and the integral computation of γdot_estm, respectively.

Here, in this embodiment, regarding the yaw rate γ of the motion state quantity to be estimated, the vehicle motion estimator 24d determines the yaw rate estimated value γ_estm such that the yaw rate estimated value γ_estm (consequently, the yaw rate model estimated value γ_predict) is brought close to the yaw rate detected value γ_sens (such that the yaw rate estimated value y does not deviate from γ_sens).

Further, also regarding the vehicle center-of-gravity longitudinal velocity Vgx, which means the vehicle speed of the vehicle 1, the vehicle motion estimator 24d determines the vehicle center-of-gravity longitudinal velocity estimated value Vgx_estm (consequently, the vehicle center-of-gravity longitudinal velocity model estimated value Vgx_predict) such that the vehicle center-of-gravity longitudinal velocity estimated value Vgx_estm is brought close to the vehicle center-of-gravity longitudinal velocity recognized from the wheel speed detected value Vw_i_sens (i=1, 2, 3, 4) (so as not to cause the vehicle center-of-gravity longitudinal velocity estimated value Vgx_estm to deviate from the recognized vehicle center-of-gravity longitudinal velocity).

Then, regarding the yaw rate y, the vehicle motion estimator 24d calculates the yaw rate deviation γestm_err, which is a difference between the yaw rate detected value γ_sens obtained in S100 and the yaw rate model estimated value γ_predict calculated by expression 1-20 as described above, according to expression 1-21 given below.

Further, regarding the vehicle center-of-gravity longitudinal velocity Vgx, the vehicle motion estimator 24d calculates the vehicle speed deviation Vgx_estm_err, which is the difference between a selected wheel speed detected value Vw_i_sens select, which is any one of the wheel speed detected values Vw_i_sens (i=1, 2, 3, 4) obtained in S100, and a vehicle longitudinal velocity model estimated value Vgx_predict calculated by expression 1-18 as described above, according to expression 1-22 given below.

The aforesaid selected wheel speed detected value Vw_i_sens select is a value selected from the wheel speed detected value Vw_i_sens (i=1, 2, 3, 4) as the one corresponding to an actual vehicle speed detected value (the detected value of the actual vehicle center-of-gravity longitudinal velocity Vgx_act) based on the wheel speed detected value Vw_i_sens (i=1, 2, 3, 4).

In this case, when the vehicle 1 is accelerated, the slowest wheel speed detected value among the wheel speed detected values Vw_i_sens (i=1, 2, 3, 4) is selected as the selected wheel speed detected value Vw_i_sens select. When the vehicle 1 is decelerated, the fastest wheel speed detected value among the wheel speed detected values Vw_i_sens (i=1, 2, 3, 4) is selected as the selected wheel speed detected value Vw_i_sens select.

$$\gamma estm\_err = \gamma\_sens - \gamma\_predict \quad \text{Expression 1-21}$$

$$Vgx\_estm\_err = Vw\_i\_sens\_select - Vgx\_predict \quad \text{Expression 1-22}$$

Subsequently, the vehicle motion estimator 24d determines the final values of the vehicle center-of-gravity longitudinal velocity estimated value Vgx_estm and the yaw rate estimated value γ_estm in the current arithmetic processing cycle according to expressions 1-23 and 1-24 given below, respectively.

$$Vgx\_estm = Vgx\_predict + Kvx * Vgx\_estm\_err \quad \text{Expression 1-23}$$

$$\gamma\_estm = \gamma\_predict + K\gamma * \gamma estm\_err \quad \text{Expression 1-24}$$

Kvx in expression 1-23 and Kγ in expression 1-24 respectively denote gain coefficients having predetermined values (≤1) that are set beforehand.

In this embodiment, as indicated by these expressions 1-23 and 1-24, the vehicle center-of-gravity longitudinal velocity estimated value Vgx_estm is determined by modifying the vehicle center-of-gravity longitudinal velocity model estimated value Vgx_predict, which has been calculated by the aforesaid expression 1-18 (an estimated value on the vehicle motion model), according to a feedback control law (the proportional law in this case) on the basis of the vehicle speed deviation Vgx_estm_err calculated by the aforesaid expression 1-22 so as to bring the vehicle speed deviation Vgx_estm_err close to zero.

The yaw rate model estimated value γ_predict calculated by the aforesaid expression 1-20 (an estimated value on the vehicle motion model) is modified according to the feedback control law (the proportional law in this case) on the basis of the yaw rate deviation γ_estm_err, which has been calculated by the aforesaid expression 1-21, so as to bring the yaw rate deviation γ_estm_err close to zero.

Thus, according to this embodiment, the vehicle center-of-gravity longitudinal velocity estimated value Vgx_estm as the vehicle speed of the vehicle 1 on the vehicle motion model is determined such that the estimated value Vgx_estm does not deviate from the selected wheel speed detected value Vw_i_sens_select as the detected value of the actual vehicle speed (such that Vgx_estm agrees or substantially agrees with Vw_i_sens_select). Further, the yaw rate estimated value γ_estm as the yaw rate of the vehicle 1 on the vehicle motion model is determined such that the estimated value γ_estm does not deviate from the yaw rate detected value γ_sens as the detected value of the actual yaw rate γ_act (such that γ_estm agrees or substantially agrees with γ_sens).

Moreover, in this embodiment, the vehicle center-of-gravity longitudinal velocity estimated value Vgx_estm and the yaw rate estimated value γ_estm determined as described above are used to calculate the vehicle center-of-gravity longitudinal velocity model estimated value Vgx_predict and the yaw rate model estimated value γ_predict by the computation of the aforesaid expressions 1-18 and 1-20, respectively. As a result, the estimated values Vgx_predict and γ_predict are also determined so as not to deviate from Vw_i_sens_select and γ_sens, respectively.

Therefore, in this embodiment, the values of Vgx_estm, Vgx_predict, γ_estm, and γpredict are determined such that the relationships Vgx_estm≅Vgx_predict≅Vw_i_sens_select and γ_estm≅γpredict≅γ_sens hold.

Figure 9:
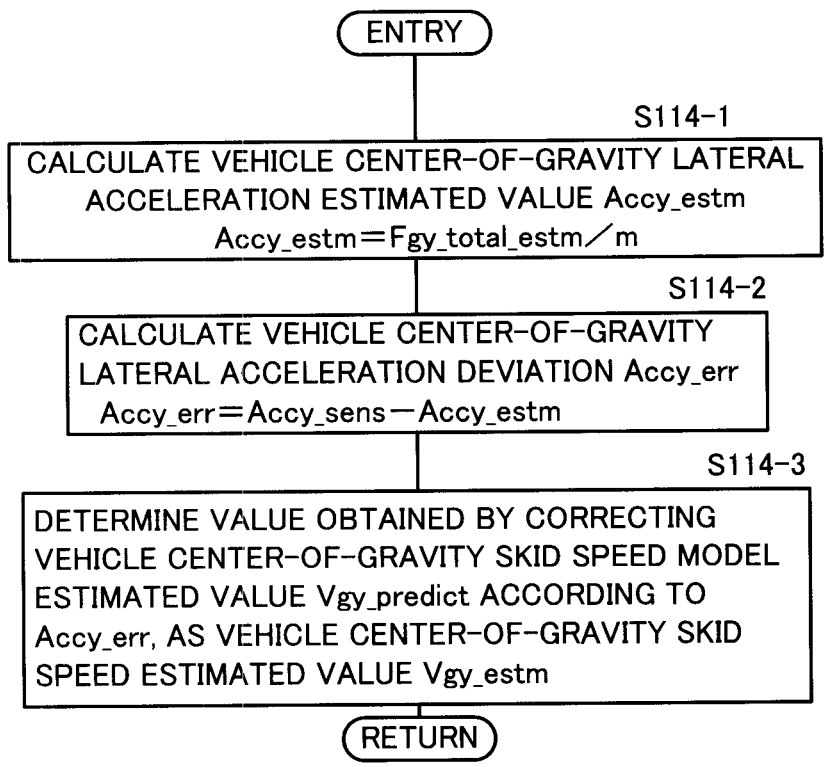
FIG. 9 is a flowchart illustrating the processing for finding the estimated value of the state quantity of the skid motion of the vehicle in the vehicle motion estimator illustrated in FIG. 5.

On the other hand, in this embodiment, the vehicle motion estimator 24d performs the processing illustrated in the flowchart of FIG. 9 to determine the value obtained by correcting the vehicle center-of-gravity skid speed model estimated value Vgy_predict, which has been calculated by the aforesaid expression 1-19, as the vehicle center-of-gravity skid speed estimated value Vgy_estm.

The vehicle model computing means 24 does not use Vgy_estm, but uses Vgy_predict in the arithmetic processing of finding the state quantity of the vehicle 1 by using the value of the vehicle center-of-gravity skid speed Vgy (the arithmetic processing of the aforesaid expressions 1-2, 1-13a, and 1-19).

In other words, the vehicle model computing means 24 performs the arithmetic processing on the assumption that the value of the vehicle center-of-gravity skid speed on the vehicle motion model Vgy always agrees with the vehicle center-of-gravity skid speed model estimated value Vgy_predict.

In the processing illustrated in the flowchart of FIG. 9, the vehicle motion estimator 24d, first in S114-1, finds the vehicle center-of-gravity lateral acceleration estimated value Accy_estm as an acceleration value, which is obtained by dividing the total road surface reaction force resultant lateral force estimated value Fgy_total_estm by the vehicle mass m by the computation of the first term of the right side of the aforesaid expression 1-14a.

Specifically, the vehicle motion estimator 24d calculates Accy_estm by dividing the road surface reaction force resultant lateral force estimated value Fgy_total_estm (the current value) calculated in S112 by the vehicle mass m as represented by expression 1-41a given below.

$$\text{Acc}y\_\text{estm} = Fgy\_\text{total\_estm}/m \qquad \text{Expression 1-41a}$$

In addition, the vehicle center-of-gravity lateral acceleration estimated value Accy_estm may be calculated according to expression 1-41b given below from the vehicle center-of-gravity skid speed change rate estimated value Vgdot_y_estm (the current value), the previous value Vgx_estm_p of the vehicle center-of-gravity longitudinal velocity estimated value, and the previous value γ_estm_p of the yaw rate estimated value, which have been calculated by the aforesaid expression 1-14a.

$$\text{Acc}y\_\text{estm} = Vgdot\_y\_\text{estm} + Vgx\_\text{estm}\_p * \gamma\_\text{estm}\_p \qquad \text{Expression 1-41b}$$

In this case, the yaw rate detected value γ_sens (the previous value or the current value) may be used in place of the yaw rate estimated value (the previous value) γ_estm_p of expression 1-41b. In addition, in place of the vehicle center-of-gravity longitudinal velocity estimated value (the previous value) Vgx_estm_p of expression 1-41b, the selected wheel speed detected value Vw_i_sens_select (the previous value or the current value) may be used as the detected value of the actual vehicle speed based on the wheel speed detected value Vw_i_sens (i=1, 2, 3, 4).

Subsequently, in S114-2, the vehicle motion estimator 24d calculates the vehicle center-of-gravity lateral acceleration deviation Accy_err, which is a difference between the vehicle center-of-gravity lateral acceleration detected value Accy_sens, which is obtained by the processing of S100, and the vehicle center-of-gravity lateral acceleration estimated value Accy_estm, which has been calculated as described above, according to expression 1-42 given below.

$$\text{Acc}y\_\text{err} = \text{Acc}y\_\text{sens} - \text{Acc}y\_\text{estm} \qquad \text{Expression 1-42}$$

Supplementally, if the vehicle 1 is traveling on a horizontal road surface, Accy_sens has a meaning of a detected value of the actual vehicle center-of-gravity lateral acceleration Accy_act (=Vgdot_y_act+Vgx_act*γ_act).

Therefore, if the vehicle 1 is traveling on the horizontal road surface, and in a state where the second term of the right side of the aforesaid expression 1-41b, namely the estimated value of the acceleration component in the lateral direction of the center-of-gravity point of the vehicle 1 caused by a centrifugal force from the turning motion of the vehicle 1 agrees or substantially agrees with the actual value of the acceleration component (=Vgx_act*γ_act), the aforesaid vehicle center-of-gravity lateral acceleration deviation Accy_err means a deviation between the actual vehicle center-of-gravity skid speed change rate Vgdot_y_act and the vehicle center-of-gravity skid speed change rate estimated value Vgdot_y_estm (the estimated value on the vehicle motion model) calculated according to the aforesaid expression 1-14a (=Vgdot_y_act−Vgdot_y_estm).

In other words, the vehicle center-of-gravity lateral acceleration deviation Accy_err corresponds to an error of the vehicle center-of-gravity skid speed change rate estimated value Vgdot_y_estm relative to the actual vehicle center-of-gravity skid speed change rate Vgdot_y_act (=Vgdot_y_act−Vgdot_y_estm).

Subsequently, in S114-3, the vehicle motion estimator 24d determines a value obtained by correcting the vehicle center-of-gravity skid speed model estimated value Vgy_predict, which has been calculated by the aforesaid expression 1-19, according to the vehicle center-of-gravity lateral acceleration deviation Accy_err, which has been calculated as described above, as the vehicle center-of-gravity skid speed estimated value Vgy_estm (the current value).

Figure 10A:
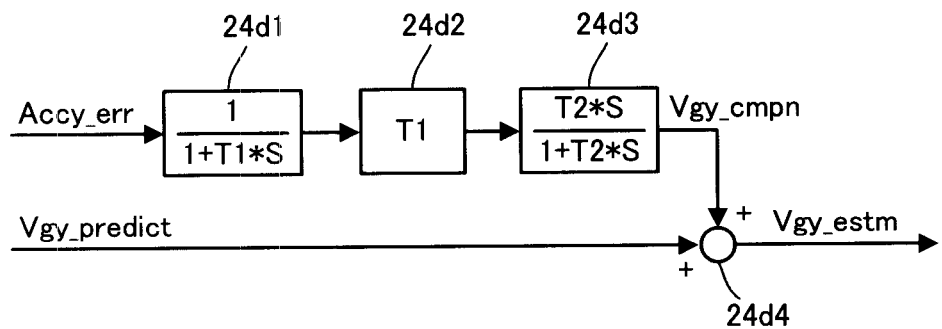
FIGS. 10(*a*) and 10(*b*) are block diagrams illustrating the processing of S114-3 in the flowchart of FIG. 9.

To be more specific, the processing of S114-3 is performed through, for example, the processing illustrated in the block diagram of FIG. 10(a).

Specifically, as illustrated in FIG. 10(a), the vehicle motion estimator 24d finds a correction amount Vgy_cmpn for correcting the vehicle center-of-gravity skid speed model estimated value Vgy_predict (hereinafter referred to as the skid speed correction manipulated variable Vgy_cmpn) by passing the vehicle center-of-gravity lateral acceleration deviation Accy_err through a filter for frequency component adjustment 24d1, a gain multiplier 24d2, which multiplies an input value by a gain T1 having a predetermined value, and a filter for frequency component adjustment 24d3.

In this case, the aforesaid filter 24d1 is a filter having a high-cut characteristic (a characteristic that cuts off high-frequency components of a predetermined frequency or higher) and the filter 24d3 is a filter having a low-cut characteristic (a characteristic that cuts off low-frequency components of a predetermined frequency or lower).

More specifically, in the example illustrated in FIG. 10(a), the filter 24d1 is a high-cut filter having a transfer function represented by 1/(1+T1*S) (a first-order low-pass filter having a time constant T1).

Further, the filter 24d3 is a low-cut filter having a transfer function represented by T2*S/(1+T2*S) (a first-order low-cut filter having a time constant T2).

Further, a gain T1, which is multiplied by the output of the filter 24d1 by the gain multiplier 24d2, is set so as to agree with the time constant T1 of the filter 24d1. In addition, the time constants T1 and T2 are set such that the cutoff frequency of the high-cut filter 24d1 is higher than the cutoff frequency of the low-cut filter 24d3.

Here, the processing of passing the vehicle center-of-gravity lateral acceleration deviation Accy_err through the aforesaid high-cut filter 24d1 and the gain multiplier 24d2 is, in principle, equivalent to the processing of passing the deviation Accy_err through a low-cut filter having a transfer function represented by T1*S/(1+T1*S) (a first-order low-cut filter having the time constant T1) and through an integrator having a transfer function represented by 1/S.

Moreover, the deviation Accy_err corresponds to an error of the vehicle center-of-gravity skid speed change rate estimated value Vgdot_y_estm relative to the actual vehicle center-of-gravity skid speed change rate Vgdot_y_act (=Vgdot_y_act−Vgdot_y_estm) as described above. Therefore, a value obtained by integrating Accy_err is equal to a value obtained by adding a certain integration constant to an error of the vehicle center-of-gravity skid speed provisional estimated value Vgy_predict as the integral value of the vehicle center-of-gravity skid speed change rate estimated value Vgdot_y_estm relative to the actual vehicle center-of-gravity skid speed Vgy_act (=Vgy_act−Vgy_predict).

Therefore, the value obtained by passing Accy_err through the low-cut filter (the first-order low-cut filter having the time constant T1) and the integrating means, and thus the value obtained by passing Accy_err through the aforesaid high-cut filter 24d1 and the gain multiplier 24d2 are basically thought to be converged to an error of the vehicle center-of-gravity skid speed provisional estimated value Vgy_predict relative to the actual vehicle center-of-gravity skid speed Vgy_act (=Vgy_act−Vgy_predict) or to a value close to the error.

In the case where the vehicle center-of-gravity lateral acceleration detected value Accy_sens includes a steady offset component due to a drift or the like of the output from the lateral acceleration sensor 15, however, the value obtained by passing Accy_err through the aforesaid high-cut filter 24d1 and the gain multiplier 24d2 includes a component generated due to the aforesaid offset component. Further, in the case of passing Accy_err through the low-cut filter (the first-order low-cut filter having the time constant T1) and through the integrating means, arithmetic errors are easily accumulated.

Therefore, in this embodiment, the vehicle motion estimator 24d finds the skid speed correction manipulated variable Vgy_cmpn by further passing Accy_err also through the low-cut filter 24d3 in addition to the high-cut filter 24d1 and the gain multiplier 24d2.

Thereby, Vgy_cmpn is able to be appropriately obtained so as to prevent arithmetic errors from being accumulated by the integrating means and Vgy_cmpn from including any component generated due to the steady offset component of Acct_err.

The skid speed correction manipulated variable Vgy_cmpn found as described above is a value approximate to an error of the vehicle center-of-gravity skid speed provisional estimated value Vgy_predict relative to the actual vehicle center-of-gravity skid speed Vgy_act (=Vgy_act−Vgy_predict), particularly when the motion state (the traveling state) of the vehicle 1 shifts from the straight traveling state to the turning state or in the transitional period in which the actual road surface friction coefficient μ_act changes.

Then, the vehicle motion estimator 24d determines a value obtained by adding the value Vgy_cmpn, which has been found as described above, to the vehicle center-of-gravity skid speed provisional estimated value Vgy_predict by the addition operation unit 24d4 as a vehicle center-of-gravity skid speed estimated value Vgy_estm.

More specifically, the vehicle motion estimator 24d determines a value obtained by correcting the vehicle center-of-gravity skid speed model estimated value Vgy_predict, which has been calculated by the aforesaid expression 1-19, by using the aforesaid skid speed correction manipulated variable Vgy_cmpn according to expression 1-43 given below as a vehicle center-of-gravity skid speed estimated value Vgy_estm.

$$Vgy\_estm = Vgy\_predict + Vgy\_cmpn \qquad \text{Expression 1-43}$$

The above is the details of the processing of S114 (processing of the vehicle motion estimator 24d).

Here, the correspondence between this embodiment and the present invention is supplementally described. This embodiment is one embodiment of the aforesaid first aspect of the invention.

In this case, in this embodiment, the position of the center-of-gravity point of the vehicle 1 corresponds to a predetermined position of the vehicle in the present invention.

Moreover, in this embodiment, the vehicle model computing means in the present invention is implemented by the processing of the vehicle model computing means 24 (the processing of S102 to S116 in FIG. 4, except the processing in FIG. 9 performed within the processing of S114).

In this case, in this embodiment, the vehicle model in the present invention is implemented by an arithmetic expression (the arithmetic processing of the aforesaid expressions 1-1 to 1-24), which is performed by the vehicle model computing means 24.

Further, the friction characteristic model represented by the aforesaid expressions 1-8 and 1-8a and the friction characteristic model represented by the aforesaid expressions 1-9 and 1-9a correspond to the friction characteristic models in the present invention.

Moreover, the wheel two-dimensional road surface reaction force estimated value on the wheel coordinate system ↑Fsub_i (=(Fsubx_i_estm, Fsuby_i_estm)$^T$) of each wheel 2-$i$, which is calculated by the processing of S110 (processing by the wheel friction force estimator 24$b$), corresponds to the road surface reaction force model value in the present invention.

Further, the total road surface reaction force resultant translational force vector estimated value ↑Fg_total_estm, which is calculated by the processing of S112 (processing by the resultant force calculator 24$c$), corresponds to the resultant force of the road surface reaction force model value in the present invention.

Moreover, the detected values of the quantities to be observed (δ1_sens, δ2_sens, Vw_i_sens, γ_sens, Accx_sens, Accy_sens, Tq_i_sens), which are input to the vehicle model computing means 24, correspond to the observed values of the predetermined type of quantities to be observed in the present invention. The detected values of the quantities to be observed (δ1_sens, δ2_sens, Vw_i_sens, γ_sens, Accx_sens, Accy_sens, Tq_i_sens) are the detected values of the quantities to be observed that are required to identify the values of the input parameters (κi, βi, Fz_i) other than the road surface friction coefficient μ among the input parameters in the aforesaid friction characteristic model.

Moreover, the vehicle center-of-gravity skid speed model estimated value Vgy_predict, which is calculated by the aforesaid expression 1-19 in the processing of S114 (processing by the vehicle motion estimator 24$d$), corresponds to the skid motion state quantity model value in the present invention.

In this case, a previous value Vgy_predict_p as a past calculated value of the vehicle center-of-gravity skid speed model estimated value Vgy_predict is used to calculate the current value as a new value of the vehicle center-of-gravity skid speed model estimated value Vgy_predict.

Moreover, the predetermined position actual lateral acceleration detecting means in the present invention is implemented by the lateral acceleration sensor 15 and the lateral acceleration detecting means 22$f$ of the quantity-to-be-observed detecting means 22. In this case, the actual sensed-by-sensor lateral acceleration Accy_sensor_act corresponds to the predetermined position actual lateral acceleration in the present invention, and the vehicle center-of-gravity lateral acceleration detected value (sensed-by-sensor lateral acceleration detected value) Accy_sens corresponds to the detected value of the predetermined position actual lateral acceleration in the present invention.

Further, in this embodiment, the lateral acceleration model value computing means, the lateral acceleration deviation computing means, and the skid motion state quantity estimated value determining means in the present invention are implemented by the processing of S112 (the processing by the resultant force calculator 24$c$) and the processing in FIG. 9 performed in the processing of S114 (processing by the vehicle motion estimator 24$d$).

More specifically, the lateral acceleration model value computing means is implemented by the processing of S112 (more specifically, the processing of calculating the total road surface reaction force resultant lateral force Fgy_total_estm in the processing of S112) and the processing of S114-1 in FIG. 9.

Further, the vehicle center-of-gravity lateral acceleration estimated value Accy_estm, which is found by this processing, corresponds to the predetermined position lateral acceleration model value in the present invention.

Moreover, the lateral acceleration deviation computing means is implemented by the processing of S114-2 in FIG. 9. In addition, the vehicle center-of-gravity lateral acceleration deviation Accy_err, which is found by this processing, corresponds to the lateral acceleration deviation in the present invention.

Further, the skid motion state quantity estimated value determining means is implemented by the processing of S114-3 in FIG. 9. In addition, the vehicle center-of-gravity skid speed estimated value Vgy_estm, which is found by this processing, corresponds to the estimated value of the skid motion state quantity in the present invention.

Further, in the processing of S114-3 as the skid motion state quantity estimated value determining means, the filter 24$d$1 functions as a filter in the present invention and the gain multiplier 24$d$2 functions as the gain multiplication means in the present invention. Moreover, the aforesaid skid speed correction manipulated variable Vgy_cmpn corresponds to the correction manipulated variable in the present invention.

Supplementally, the gain multiplier 24$d$2 may be incorporated into the high-cut filter 24$d$1. In other words, the high-cut filter 24$d$1 may be formed as a filter having a transfer function represented by T1/(1+T1*S). In this case, the gain multiplier 24$d$2 is unnecessary.

Moreover, if the vehicle center-of-gravity lateral acceleration detected value Accy_sens includes no steady offset component or if the offset component is sufficiently small, the low-cut filter 24$d$3 may be omitted.

Further, although Accy_err is passed through the filter 24$d$1, the gain multiplier 24$d$2, and the filter 24$d$3 in this order in the processing of the block diagram in FIG. 10($a$), the order may be arbitrarily varied.

For example, after passing Accy_err through the high-cut filter 24$d$1 and the low-cut filter 24$d$3, Accy_err may be passed through the gain multiplier 24$d$2. In this case, the filtering processing with the filters 24$d$1 and 24$d$3 combined is equal to processing of a band-pass filter. Therefore, for example, as illustrated in the block diagram of FIG. 10($b$), the skid speed correction manipulated variable Vgy_cmpn may be found by passing Accy_err through a band-pass filter 24$d$5 having a transfer function represented by T2*S/((1+T1*S)*(1+T2*S)) and the gain multiplier 24$d$2.

In the above case, the band-pass filter 24$d$5 functions as a filter in the present invention. In this case, the gain multiplier 24$d$2 may be incorporated into the band-pass filter 24$d$7 with the gain multiplier 24$d$2 omitted.

Moreover, the vehicle motion estimator 24$d$ in this embodiment has determined the vehicle center-of-gravity longitudinal velocity estimated value Vgx_estm and the yaw rate estimated value γ_estm such that these values do not deviate from the selected wheel speed detected value Vw_i_sens select (the detected value of the actual vehicle speed) and the yaw rate detected value γ_sens, respectively. Alternatively, however, either one or both of Vgx_estm and γ_estm may be arranged to always agree with one or both Vw_i_sens select and γ_sens. In this case, the processing for calculating Vgx_estm or γ_estm is unnecessary.

The vehicle motion estimator 24*d* has determined Vgdot_x_estm, Vgx_estm, Vgx_predict, Vgdot_y_estm, Vgy_estm, Vgy_predict, γ_estm, γ_predict, and Accy_estm as the vehicle motion state quantity estimated values (including model estimated values). Alternatively, however, more vehicle motion state quantity estimated values may be found in addition thereto, as necessary.

For example, in the case where the vehicle motional state quantity estimated values are used to control the vehicle center-of-gravity skid angle βg, the vehicle center-of-gravity skid angle estimated value βg_estm may be calculated as the estimated value of one state quantity of the skid motion of the vehicle 1.

In this case, the vehicle center-of-gravity skid angle estimated value βg_estm can be calculated according to expression 1-26 given below from the vehicle center-of-gravity longitudinal velocity estimated value Vgx_estm and the vehicle center-of-gravity skid speed estimated value Vgy_estm found as described above.

$$\beta g\_estm = \tan^{-1}(Vgy\_estm/Vgx\_estm) \quad \text{Expression 1-26}$$

Alternatively, for example, the model estimated value of the vehicle center-of-gravity skid angle βg may be found by an expression obtained by replacing Vgy_estm of the right side of the aforesaid expression 1-26 by the vehicle center-of-gravity skid speed model estimated value Vgy_predict and then a value obtained by dividing the skid speed correction manipulated variable Vgy_cmpn, which has been found as described above, by the vehicle center-of-gravity longitudinal velocity estimated value Vgx_estm (=Vgy_cmpn/Vgx_estm) may be added to the model estimated value (note that it is assumed here that |Vgy_cmpn| is extremely smaller than |Vgx_estm|) in order to find the vehicle center-of-gravity skid angle estimated value βg_estm.

In the above case, the model estimated value of the vehicle center-of-gravity skid angle βg corresponds to the skid motion state quantity model value in the present invention, and Vgy_cmpn/Vgx_estm corresponds to the correction manipulated variable in the present invention.

In finding βg_estm, the selected wheel speed detected value Vw_i_sens_select may be used as the detected value of the actual vehicle speed based on the wheel speed detected value Vw_i_sens (i=1, 2, 3, 4) in place of the vehicle center-of-gravity longitudinal velocity estimated value Vgx_estm in either case of the aforesaid methods.

Subsequently, in S116 of FIG. 4, the wheel motion estimator 24*f* calculates the wheel speed estimated value Vw_i_estm of each wheel 2-*i*.

Here, the wheel motion estimator 24*f* has a wheel motion model, which represents the relationship between the forces acting on each wheel 2-*i* (the wheel torque Tq_i and the driving/braking force) and the rotational motion of each wheel 2-*i*. The wheel motion model is represented by expression 1-27 given below in this embodiment.

$$Tq\_i - F\text{sub}x\_i * Rw\_i = Iw\_i * (Vw\text{dot}\_i / Rw\_i) \quad \text{Expression 1-27}$$

"Vwdot_i" in expression 1-27 denotes the temporal change rate (a differential value) of the wheel speed Vw_i of an i-th wheel 2-1 and will be hereinafter referred to as the wheel speed change rate. The left side of expression 1-27 means a resultant torque of the wheel torque Tq_i imparted to the i-th wheel 2-*i* from one or both of the driving system and the braking system of the vehicle 1 and the torque imparted to the wheel 2-*I* by the driving/braking force Fsubx_i of the i-th wheel 2-*i*.

Then, the wheel motion estimator 24*f* first calculates the wheel speed change rate estimated value Vwdot i_estm of each wheel 2-*i* according to expression 1-27a given below, which is obtained based on expression 1-27.

$$Vw\text{dot}\_i\_estm = Rw\_i * (Tq\_i\_sens - F\text{sub}x\_i\_estm * Rw\_i) / Iw\_i \quad \text{Expression 1-27a}$$

In this case, Tqi_i_sens of expression 1-27a denotes the detected value (the current value) obtained in S100 on each wheel 2-*i*, and Fsubx_i_estm denotes the value (the current value) determined in S110 on each wheel 2-*i*. Predetermined values set beforehand are used as the values of the effective wheel radius Rw_i and the wheel inertia moment Iw_i of each wheel 2-*i*.

Subsequently, the wheel motion estimator 24*f* calculates the wheel speed provisional estimated value Vw_i_predict as the provisional value of the wheel speed estimated value according to expression 1-28 given below for each wheel 2-*i* on the basis of the wheel speed change rate estimated value Vwdot i_estm found as described above and the previous value of the wheel speed estimated value Vw_i_estm_p.

$$Vw\_i\_predict = Vw\_i\_estm\_p + Vw\text{dot}\_i\_estm * \Delta T \quad \text{Expression 1-28}$$

Expression 1-28 corresponds to the integral computation of Vwdot_i_estm.

Here, in this embodiment, the wheel motion estimator 24*f* determines the wheel speed estimated value Vw_i_estm such that the estimated value Vw_i_estm approaches the wheel speed detected value Vw_i_sens (such that the estimated value Vw_i_estm does not deviate from Vw_i_sens), as with the calculation of the yaw rate estimated value γ_estm by the wheel motion estimator 24*d*.

Then, according to the following expression 1-29, the wheel motion estimator 24*f* calculates, on each wheel 2-*i*, the wheel speed deviation Vw_i_estm_err as a difference between the wheel speed estimated value Vw_i_sens, which has been obtained in S110, and the wheel speed provisional estimated value Vw_i_predict, which has been calculated by expression 1-28 as described above.

$$Vw\_i\_estm\_err = Vw\_i\_sens - Vw\_i\_predict \quad \text{Expression 1-29}$$

Subsequently, the wheel motion estimator 24*f* determines, on each wheel 2-*i*, a final wheel speed estimated value Vw_i_estm in the current arithmetic processing cycle according to the following expression 1-30.

$$Vw\_i\_estm = Vw\_i\_predict + Kvw * Vw\_i\_estm\_err \quad \text{Expression 1-30}$$

"Kvw" in expression 1-30 denotes a gain coefficient of a predetermined value (<1), which has been set beforehand.

Thus, in this embodiment, each wheel speed estimated value Vw_i_estm is determined by modifying each wheel speed provisional estimated value Vw_i_predict (an estimated value on the vehicle motion model), which has been calculated by the aforesaid expression 1-28, according to a feedback control law (the proportional law in this case) on the basis of the wheel speed deviation Vw_i_estm_err calculated by the aforesaid expression 1-29 such that the wheel speed deviation Vw_i_estm_err approaches zero.

The processing of S102 to S116 described above is the detail of the processing of the vehicle model computing means 24.

Subsequently, the controller 20 performs the processing by the μ estimating means 26 in S118.

Before describing the processing in detail, the principle for estimating the road surface friction coefficient μ in this embodiment will be first described.

In this case, for the convenience of description, it is assumed that the dynamics of the actual vehicle 1 is approximately represented by the following expression 4-1.

Expression 4-1

$$\frac{d}{dt}\begin{bmatrix} Vgy\_act \\ \gamma\_act \end{bmatrix} = \frac{1}{Vgx\_act} * \begin{bmatrix} A11 & -Vgx\_act^2 + A12s \\ A21 & A22 \end{bmatrix} * \begin{bmatrix} Vgy\_act \\ \gamma\_act \end{bmatrix} + \begin{bmatrix} B1 \\ B2 \end{bmatrix} * \delta f\_act - \begin{bmatrix} g \\ 0 \end{bmatrix} * \sin(\theta bank\_act) \quad [\text{Eq. 1}]$$

where:
A11=−2*(CPf+CPr)/m
A12s=−2*(Lf*CPf−Lr*CPr)/m
A21=−2*(LP*CPf−Lr*CPr)/Iz
A22=−2*(Lf$^2$*CPf+Lr$^2$*CPr)/Iz
B1=2*CPf/m
B2=2*Lf*CPf/Iz
CPf: Cornering power of the front wheel of the 2-wheel model
CPr: Cornering power of the rear wheel of the 2-wheel model More specifically, this expression 4-1 denotes a dynamic model that is a so-called two-wheeled model (a linear two-wheeled model), which approximately represents a skid motion and a rotational motion about the yaw axis of the actual vehicle 1 as dynamic behaviors of a model vehicle having one front wheel serving as a steering wheel and one rear wheel serving as a non-steering wheel.

The cornering power CPf of the front wheel in this two-wheeled model corresponds to the cornering power per wheel of the front wheels 2-1 and 2-2 of the actual vehicle 1 (a 4-wheel vehicle). The cornering power CPr of the rear wheel in the two-wheeled model corresponds to the cornering power per wheel of the rear wheels 2-3 and 2-4 of the actual vehicle 1 (the 4-wheel vehicle).

Here, the cornering power CPf per wheel of the front wheels 2-1 and 2-2 on a reference road surface on which the value of the actual road surface friction coefficient μ_act is 1 is denoted by CPf0, and the cornering power CPr per wheel of the rear wheels 2-3 and 2-4 on the reference road surface is denoted by CPr0.

Then, a proportional relationship approximately holds between each of the cornering powers CPf and CPr on a road surface having the actual road surface friction coefficient μ_act of an arbitrary value and the actual road surface friction coefficient μ_act, as represented by expressions 4-2a and 4-2b given below.

$CPf=CPf0*\mu\_act$   Expression 4-2a $CPr=Cpr0*\mu\_act$   Expression 4-2b

Applying these expressions 4-2a and 4-2b to the aforesaid expression 4-1 rewrites expression 4-1 to expression 4-3 given below.

Expression 4-3

$$\frac{d}{dt}\begin{bmatrix} Vgy\_act \\ \gamma\_act \end{bmatrix} = \frac{1}{Vgx\_act} * \begin{bmatrix} \mu\_act*a11 & -Vgx\_act^2+\mu\_act*a12s \\ \mu\_act*a21 & \mu\_act*a22 \end{bmatrix} * \begin{bmatrix} Vgy\_act \\ \gamma\_act \end{bmatrix} + \begin{bmatrix} \mu\_act*b1 \\ \mu\_act*b2 \end{bmatrix} * \delta f\_act - \begin{bmatrix} g \\ 0 \end{bmatrix} * \sin(\theta bank\_act) \quad [\text{Eq. 2}]$$

where:
a11=−2*(CPf0+CPr0)/m
a12s=−2*(Lf*CPf0−Lr*CPr0)/m
a21=−2*(Lf*CPf0−Lr*CPr0)/Iz
a22=−2*(Lf$^2$*CPf0+Lr$^2$*CPr0)/Iz
b1=2*CPf0/m
b2=2*Lf*CPf0/Iz Based on this expression 4-3 (the expression representing a linear two-wheeled model), the following describes a method for estimating the road surface friction coefficient μ by using a moment about the yaw axis (i.e., the aforesaid NSP yaw moment Mnsp) generated at the neutral steer point (NSP) of the vehicle 1.

First, description will be made on the technological meaning of the actual NSP yaw moment Mnsp_act related to the estimation of the road surface friction coefficient μ and a method for identifying (estimating) the value of the actual NSP yaw moment Mnsp_act from the observed value of the state quantity of a motion of the vehicle 1 related thereto.

The left side of the first line of expression 4-3 means the differential value of the actual vehicle center-of-gravity skid speed Vgy_act (temporal change rate), i.e., the actual vehicle center-of-gravity skid speed change rate Vgdot_y_act. Therefore, the first line of expression 4-3 can be rewritten to the following expression 4-4.

$Vgdot\_y\_act+Vgx\_act*\gamma\_act+g*\sin(\theta bank\_act) = \mu\_act*a11*Vgy\_act/Vgx\_act+\mu\_act*a12s*\gamma\_act/Vgx\_act+\mu\_act*b1*\delta f\_act$   Expression 4-4

Meanwhile, as apparent from the definition of the aforesaid vehicle center-of-gravity lateral acceleration Accy (Accy=Vgdot_y+Vgx*γ) and the description of the sensed-by-sensor lateral acceleration Accy_sensor, the left side of expression 4-4 agrees with the actual sensed-by-sensor lateral acceleration Accy_sensor_act (the acceleration actually sensed by the lateral acceleration sensor 15). Thus, expression 4-5 given below is obtained.

$Accy\_sensor\_act=Vgdot\_y\_act+Vgx\_act*\gamma\_act+g*\sin(\theta bank\_act)$   Expression 4-5

This expression 4-5 indicates that the left side of expression 4-4 agrees with the actual sensed-by-sensor lateral acceleration Accy_sensor_act. Thus, the following expression 4-6 is derived from expressions 4-4 and 4-5.

$Accy\_sensor\_act=\mu\_act*a11*Vgy\_act/Vgx\_act+\mu\_act*a12s*\gamma\_act/Vgx\_act+\mu\_act*b1*\delta f\_act$   Expression 4-6

The right side of this expression 4-6 corresponds to the value obtained by dividing a component in the lateral direction of the vehicle body 1B in the translational force vector acting on the center-of-gravity point of the vehicle 1 due to the resultant force of the actual road surface reaction forces acting on each wheel 2-i from a road surface (i.e., a component in the X-axis direction Fgy_total act of the actual total road surface reaction force resultant translational force vector ↑Fg_total act) by the vehicle mass m. Hence, expression 4-6 represents a relationship in which Accy_sensor_act (=Accy_act+g*sin(θbank_act)) agrees with Fgy_total act/m.

The left side of the expression of the second line of expression 4-3 means the differential value (the temporal change rate) of the actual yaw rate γ_act, that is, the actual yaw angular acceleration γdot_act, and therefore the expression of the second line of expression 4-3 can be rewritten to expression 4-7 given below.

$\gamma dot\_act=\mu\_act*a21*Vgy\_act/Vgx\_act+\mu\_act*a22*\gamma\_act/Vgx\_act+\mu\_act*b2*\delta f\_act$   Expression 4-7

The right side of this expression 4-7 corresponds to the value obtained by dividing a moment about the yaw axis acting on the center-of-gravity point of the vehicle 1 due to the resultant force of the actual road surface reaction forces acting on each wheel 2-$i$ from a road surface (i.e., an actual total road surface reaction force resultant yaw moment Mgz_act) by a vehicle yaw inertia moment Iz. Hence, expression 4-7 represents a relationship in which γdot_act agrees with Mgz_act/Iz.

Taking the above expressions 4-6 and 4-7 as simultaneous equations, eliminating Vgy_act results in the following expression 4-8.

$$\gamma\text{dot\_act} - (a21/a11)*\text{Acc}y\_\text{sensor\_act} = \mu\_\text{act}*((a22-(a21/a11)*a12s)*\gamma\_\text{act}/Vx\_\text{act} + (b2-(a21/a11)*b1)*\delta f\_\text{act})$$  Expression 4-8

Here, as described above, NSP means the load application point (the working point) of the resultant force of the lateral forces Fsuby_i (i=1, 2, 3, 4) acting on all the wheels 2-$i$ (i=1, 2, 3, 4) when the vehicle center-of-gravity skid angle βg occurs while the vehicle 1 is traveling in the situation where δ1=δ2=0 holds.

Therefore, in the dynamic model of the vehicle 1 represented by the aforesaid expression 4-3, the relationship represented by expression 4-9 given below holds between the distance Lnsp between the vehicle center of gravity and NSP, which is the distance between the center-of-gravity point of the vehicle 1 and NSP, and the cornering powers CPf0 and CPr0 of the aforesaid reference road surface.

$$Lnsp = -(Lf*CPf0 - Lr*CPr0)/(CPf0 + CPr0)$$  Expression 4-9

Further, expression 4-10 given below is derived from the above expression 4-9 and the definitions of a11 and a21 given in the note of the aforesaid expression 4-2.

$$a21/a11 = -Lnsp*m/Iz$$  Expression 4-10

Then, applying this expression 4-10 to the left side of the aforesaid expression 4-8 rewrites expression 4-8 to the following expression 4-11.

$$Iz*\gamma\text{dot\_act} + Lnsp*m*\text{Acc}y\_\text{sensor\_act} = \mu\_\text{act}*p(\gamma\_\text{act},\delta f\_\text{act},Vx\_\text{act})$$  Expression 4-11 where $$p(\gamma\_\text{act},\delta f\_\text{act},Vx\_\text{act}) = Iz*((a22-(a21/a11)*a12s)*\gamma\_\text{act}/Vx\_\text{act} + (b2-(a21/a11)*b1)*\delta f\_\text{act})$$  Expression 4-12

Both sides of expression 4-11 mean an actual moment about the yaw axis at NSP (an actual NSP yaw moment Mnsp_act). More specifically, the actual NSP yaw moment Mnsp_act agrees with the left side and the right side of expression 4-11, as represented by expressions 4-13a and 4-13b given below.

$$Mnsp\_\text{act} = Iz*\gamma\text{dot\_act} + Lnsp*m*\text{Acc}y\_\text{sensor\_act}$$  Expression 4-13a $$Mnsp\_\text{act} = \mu\_\text{act}*p(\gamma\_\text{act},\delta f\_\text{act},Vx\_\text{act})$$  Expression 4-13b Expression 4-13a represents the actual NSP yaw moment Mnsp_act as an external force moment (a moment with a sign reversed from the sign of an actual inertial force moment) balancing out the actual inertial force moment about the yaw axis generated at NSP by a motion of the vehicle 1 (a moment component of an actual inertial force).

The first term of the right side of expression 4-13a corresponds to an external force moment (i.e., the actual total road surface reaction force resultant yaw moment Mgz_total act) balancing out the actual inertial force moment about the yaw axis generated at the center-of-gravity point of the vehicle 1 by a motion of the vehicle 1.

The second term of the right side of expression 4-13b corresponds to a moment (=Lnsp*Fgy_total_act) generated about the yaw axis at NSP by a translational external force (i.e., the component in the Y-axis direction of the vehicle body coordinate system Fgy_total act of the actual total road surface reaction force resultant translational force vector ↑Fg_total_act) balancing out an actual translational inertial force (a translational force component of an actual inertial force) in the Y-axis direction of the vehicle body coordinate system generated at the center-of-gravity point of the vehicle 1 by a motion of the vehicle 1.

Expression 4-13b represents the actual NSP yaw moment Mnsp_act as the actual moment about the yaw axis acting on NSP due to the resultant force of actual road surface reaction forces acting on each wheel 2-$i$ from a road surface, depending on the actual road surface friction coefficient μ_act.

As apparent from the aforesaid expression 4-13b, p (γ_act, δf_act, Vgx_act) defined by expression 4-12 means the ratio of an incremental amount of Mnsp_act relative to an incremental amount of μ_act (a differential value of Mnsp_act based on μ_act), in other words, the sensitivity of Mnsp_act to a change in μ_act (hereinafter referred to as the μ sensitivity).

Further, in other words, p (γ_act, δf_act, Vgx_act) denotes the actual NSP yaw moment Mnsp_act in the case where μ_act=1 holds in the case where μ_act is 1 (in the case where the actual road surface frictional coefficient μ_act agrees with the friction coefficient of the reference road surface).

Here, the right sides of both expressions 4-13a and 4-13b do not include the actual vehicle center-of-gravity skid speed Vgy_act and the actual road surface bank angle θbank_act.

It is therefore understood that the value of the actual NSP yaw moment Mnsp_act is defined without depending directly on the values of the actual vehicle center-of-gravity skid speed Vgy_act and the actual road surface bank angle θbank_act.

More specifically, when the actual vehicle center-of-gravity skid speed Vgy_act changes or the actual road surface bank angle θbank_act changes, the moment component of the first term and the moment component of the second term of the right side of the aforesaid expression 4-13a change due to the above changes; however, the moment components basically change in opposite directions from each other.

Thus, the changes in the moment components of the first term and the second term, respectively, of expression 4-13a caused by a change in Vgy_act or a change in θbank_act take place such that the changes cancel each other. As a result, the actual NSP yaw moment Mnsp_act is hardly influenced by a change in Vgy_act or a change in θbank_act.

Further, as apparent from expression 4-13b, it is understood that the actual NSP yaw moment Mnsp_act changes depending on the actual road surface friction coefficient μ_act and the μ sensitivity p without depending directly on the value of Vgy_act or θbank_act in a situation where the μ sensitivity p (γ_act, δf_act, Vx_act) is not zero (p≠0).

When attention is focused on expression 4-13a out of the aforesaid expressions 4-13a and 4-13b, it is understood that observing the actual yaw angular acceleration γdot_act as the state quantity of the motion of the vehicle 1 and the actual sensed-by-sensor lateral acceleration Accy_sensor_act makes it possible to identify the value of the actual NSP yaw moment Mnsp_act generated by the resultant force of actual road surface reaction forces (which depends on the actual road surface friction coefficient μ_act) acting on each wheel 2-$i$ from a road surface on the basis of the observed values.

In this case, the right side of expression 4-13a does not include the actual road surface friction coefficient μ_act and further does not include the actual vehicle center-of-gravity lateral acceleration Vgy_act and the actual road surface bank angle θbank_act.

Thus, the observed value of the actual NSP yaw moment Mnsp_act can be obtained from the observed values of the actual yaw angular acceleration γdot_act and the actual sensed-by-sensor lateral acceleration Accy_sensor_act without the need for the observed values of the actual road surface friction coefficient μ_act, the actual vehicle center-of-gravity lateral acceleration Vgy_act, and the actual road surface bank angle θbank_act.

Here, the aforesaid yaw angular acceleration detected value γdot_sens means the observed value of the actual yaw angular acceleration γdot_act, while the aforesaid vehicle center-of-gravity lateral acceleration detected value Accy_sens means the observed value of the actual sensed-by-sensor lateral acceleration Accy_sensor_act.

Hence, the values calculated by an expression, in which γdot_act and Accy_sensor_act of the right side of expression 4-13a have been replaced by γdot_sens and Accy_sens, which are the observed values thereof, will be hereinafter referred to as the NSP yaw moment detected value Mnsp_sens. This Mnsp_sens is defined by expression 4-14 given below.

$$Mnsp\_sens = Iz*\gamma dot\_sens + Lnsp*m*Accy\_sens \quad \text{Expression 4-14}$$

In this case, if it is assumed that the yaw angular acceleration detected value γdot_sens and the vehicle center-of-gravity lateral acceleration detected value Accy_sens accurately agree with the actual yaw angular acceleration detected value γdot_act and the actual sensed-by-sensor lateral acceleration Accy_sensor_act, respectively, then Mnsp_act equals Mnsp_sens.

Accordingly, from the yaw angular acceleration detected value γdot_sens and the vehicle center-of-gravity lateral acceleration detected value Accy_sens, the NSP yaw moment detected value Mnsp_sens as the observed value of the actual NSP yaw moment Mnsp_act can be calculated by expression 4-14.

The NSP yaw moment detected value Mnsp_sens calculated as described above carries a meaning as the value (detected value) of Mnsp estimated on the basis of the observed value of the state quantity of the motion of the vehicle 1 without the need for the value of the actual external force (actual road surface reaction force) acting on the vehicle 1 or the value of the actual road surface friction coefficient μ_act.

Subsequently, the description will now be given of the processing of estimating the road surface reaction forces acting on a wheel of the vehicle 1 on an appropriate dynamic model of the vehicle 1 on the basis thereof, in addition to the aforesaid NSP yaw moment detected value Mnsp_sens, by using the estimated value of the road surface friction coefficient μ and then estimating the value of the NSP yaw moment Mnsp generated by the resultant force of the estimated road surface reaction forces.

Here, in this embodiment, the road surface reaction force estimated value is actually calculated by the vehicle model computing means 24 as described above by using a friction characteristic model or a vehicle motion model. Then, the value of the NSP yaw moment Mnsp can be estimated from the estimated value of the road surface reaction force, as described later.

However, in the description herein, for the convenience of describing the principle of estimating the road surface friction coefficient μ, it is assumed that a vehicle model computing means, which is different from the vehicle model computing means 24, (hereinafter referred to as the vehicle model computing means for the description) sequentially carries out the arithmetic processing for estimating the motion state quantity of the vehicle 1 or the road surface reaction force at a predetermined arithmetic processing cycle by using the dynamic model of the vehicle 1 represented by the aforesaid expression 4-3.

In this case, at each arithmetic processing cycle, it is assumed that the vehicle model computing means for the description receives inputs of the latest values (the previous values or the current values) of the vehicle center-of-gravity longitudinal velocity estimated value Vgx_estm, the road surface friction coefficient estimated value μ_estm, and the road surface bank angle estimated value θbank_estm, which serve as the observed values of the front wheel rudder angle detected value δf_sens, the yaw rate detected value γ_sens, and the vehicle speed, as the observed values of δf_act, γ_act, Vgx_act, μ_act, and θbank_act of the right side of expression 4-3, respectively.

Incidentally, Vgx_estm, μ_estm, and θbank_estm mean the observed values obtained by an arbitrary appropriate method. The values of parameters a11, a12s, a21, a22, b1, and b2 in the aforesaid expression 4-3 are to be preset.

Then, the vehicle model computing means for the description carries out the following estimation arithmetic processing. More specifically, the vehicle model computing means for the description calculates the vehicle center-of-gravity skid speed change rate estimated value Vgdot_y_estm, which is the estimated value of the temporal change rate (differential value) of the vehicle center-of-gravity skid speed Vgy, according to the following expression 5-1, in which the actual value of γ_act or the like in the expression of the first line of the aforesaid expression 4-3 has been replaced by an estimated value or a detected value.

$$Vgdot\_y\_estm = \mu\_estm*a11*Vgy\_estm\_p/Vgx\_estm + \mu\_estm*a12s*\gamma\_sens/Vgx\_estm + \mu\_estm*b1* \\ \delta f\_sens - Vgx\_estm*\gamma\_sens - g*\sin(\theta bank\_estm) \quad \text{Expression 5-1}$$

The vehicle center-of-gravity skid speed estimated value Vgy_estm_p required for the computation of the first term of the right side of expression 5-1 is the previous value as the latest value of Vgy_estm, which has already been calculated by the vehicle model computing means for the description.

In this case, the result obtained by removing the fourth term and the fifth term from the right side of expression 5-1 carries a meaning as a value obtained by dividing the estimated value of a lateral component of the vehicle body 1B of the translational force vector acting on the center-of-gravity point of the vehicle 1 due to the resultant force of the road surface reaction forces of each wheel 2-i (i.e., the estimated value Fgy_total_estm of a component in the Y-axis direction of the total road surface reaction force resultant translational force vector ↑Fg_total) by the vehicle mass m.

The fourth term of the right side means the estimated value of the acceleration generated at the center-of-gravity point of the vehicle 1 due to a centrifugal force from a turning motion of the vehicle 1, and the fifth term means the estimated value of the lateral acceleration component of the vehicle body 1B of the gravitational acceleration.

Accordingly, expression 5-1 denotes the processing of calculating the vehicle center-of-gravity skid speed change rate estimated value Vgdot_y_estm by calculating Fgy_total_estm/m on the basis of μ_estm, Vgy_estm_p, Vgx_estm, γ_sens, and δf_sens, and then by subtracting the estimated value of the acceleration of the centrifugal force acting on the center-of-gravity point of the vehicle 1 (=Vgx_estm*γ_sens) and the estimated value of an acceleration component in the lateral direction of the vehicle body 1B out of the gravitational acceleration (=g*sin(θbank_estm)) from the calculated value of Fgy_total_estm/m.

Then, the vehicle model computing means for the description calculates a new vehicle center-of-gravity skid speed estimated value Vgy_estm (the current value) according to the following expression 5-2 representing the integral computation of Vgdot_y_estm on the basis of the vehicle center-of-gravity skid speed change rate estimated value Vgdot_y_estm determined as described above and the previous value of the vehicle center-of-gravity skid speed estimated value Vgy_estm_p. In expression 5-2, $\Delta T$ denotes the arithmetic processing cycle of the vehicle model computing means for the description.

$$Vgy\_estm=Vgy\_estm\_p+Vgdot\_y\_estm*\Delta T \qquad \text{Expression 5-2}$$

The value of Vgy_estm calculated as described above is used to calculate the new vehicle center-of-gravity skid speed change rate Vgdot_y_estm at the next arithmetic processing cycle.

The value Vgy_estm calculated by the vehicle model computing means for the description corresponds to the vehicle center-of-gravity skid speed model estimated value Vgy_predict calculated by the vehicle motion estimator 24d of the aforesaid vehicle model computing means 24.

Further, the vehicle model computing means for the description calculates a sensed-by-sensor lateral acceleration estimated value Accy_sensor_estm, which is the estimated value of the actual acceleration sensed by the lateral acceleration sensor 15 of the vehicle 1 (i.e., the actual sensed-by-sensor lateral acceleration Accy_sensor_act) according to expression 5-3 given below (in other words, by the computation of the first to the third terms of the right side of expression 5-1).

$$Accy\_sensor\_estm=\mu\_estm*a11*Vgy\_estm\_p/Vgx\_estm+\mu\_estm*a12s*\gamma\_sens/Vgx\_estm+\mu\_estm*b1*\delta f\_sens \qquad \text{Expression 5-3}$$

Supplementally, regarding this expression 5-3, the following expression 5-4 holds, as is obvious from the aforesaid expression 4-5.

$$Accy\_sensor\_estm=Vgdot\_y\_estm+Vgx\_estm*\gamma\_sens+g*\sin(\theta bank\_estm) \qquad \text{Expression 5-4}$$

Further, as is obvious from this expression 5-4 and the aforesaid expression 5-1, the right side of expression 5-4 agrees with the sum of the first to the third terms of the right side of expression 5-1. Hence, the sensed-by-sensor lateral acceleration estimated value Accy_sensor_estm can be calculated according to the aforesaid expression 5-3.

The right side of expression 5-3 means the value obtained by dividing the estimated value of a component in the lateral direction of the vehicle body 1B of the translational force vector acting on the center-of-gravity point of the vehicle 1 due to the resultant force of the road surface reaction force of each wheel 2-$i$ (i.e., the estimated value of a component in the Y-axis direction Fgy_total_estm of the total road surface reaction force resultant translational force vector ↑Fg_total) by the vehicle mass m.

Therefore, expression 5-3 denotes the processing of calculating Fgy_total_estm/m on the basis of $\mu$_estm, Vgy_estm_p, Vgx_estm, $\gamma$_sens, and $\delta f$_sens, and then obtaining the calculated Fgy_total_estm/m as Accy_sensor_estm.

Further, the vehicle model computing means for the description calculates the yaw angular acceleration estimated value $\gamma$dot_estm, which is the estimated value of the temporal change rate (a differential value) of the yaw angular acceleration $\gamma$dot, according to the following expression 5-5 obtained by replacing the actual value of $\gamma$_act or the like in the expression on the second line of the aforesaid expression 4-3 by an estimated value or a detected value.

$$\gamma dot\_estm=\mu\_estm*a21*Vgy\_estm\_p/Vgx\_estm+\mu\_estm*a22*\gamma\_sens/Vgx\_estm+\mu\_estm*b2*\delta f\_sens \qquad \text{Expression 5-5}$$

The right side of this expression 5-5 means the arithmetic processing of finding the value obtained by dividing the estimated value of a moment about the yaw axis acting on the center-of-gravity point of the vehicle 1 due to the resultant force of the road surface reaction forces of each wheel 2-$i$ (i.e., the total road surface reaction force resultant yaw moment estimated value Mgz_estm) by a vehicle yaw inertia moment Iz.

Therefore, expression 5-5 denotes the processing of calculating Mgz_estm/Iz on the basis of $\mu$_estm, Vgy_estm_p, Vgx_estm, $\gamma$_sens, and $\delta f$_sens, and then obtaining the calculated value of Mgz_estm/Iz as the yaw angular acceleration estimated value $\gamma$dot_estm.

Here, Vgy_estm is eliminated with the above expressions 5-3 and 5-5 as simultaneous equations and further the aforesaid expression 4-10 is applied, by which expression 5-6 given below is obtained.

$$Iz*\gamma dot\_estm+Lnsp*m*Accy\_sensor\_estm=\mu\_estm*p(\gamma\_sens,\delta f\_sens,Vgx\_estm) \qquad \text{Expression 5-6}$$

where:

$$p(\gamma\_sens,\delta f\_sens,Vgx\_estm)=Iz*((a22-(a21/a11)*a12s)*\gamma\_sens/Vgx\_estm+(b2-(a21/a11)*b1)*\delta f\_sens) \qquad \text{Expression 5-7}$$

Incidentally, p($\gamma$_sens, $\delta f$_sens, Vgx_estm) defined by expression 5-7 means the value of the $\mu$ sensitivity calculated from $\gamma$_sens, $\delta f$_sens, and Vgx_estm, which are the observed values of $\gamma$, $\delta f$, and Vgx.

In the following description, the $\mu$ sensitivity p is assumed to mean p($\gamma$_sens, $\delta f$_sens, Vgx_estm) defined by the above expression 5-7 unless otherwise specified.

More generally, the $\mu$ sensitivity p defined by expression 5-7 denotes the value of the $\mu$ sensitivity calculated by linearly combining $\gamma$_sens and $\delta f$_sens. In this case, if the coefficients by which $\gamma$_sens and $\delta f$_sens are multiplied are denoted by A1 and A2, respectively (if p=A1*$\gamma$_sens+A2*$\delta f$_sens), then A1=Iz*((a22−(a21/a11)*a12s)/Vgx_estm and A2=(b2−(a21/a11)*b1) hold.

Therefore, the coefficients A1 and A2 may be said to be the coefficients that are set such that A1 and A2 change according to Vgx_estm as the observed value of the vehicle speed of the vehicle 1 (such that A2/A1 changes in proportion to Vgx_estm).

In other words, the linear combination of $\gamma$_sens and $\delta f$_sens by expression 5-7 may be said to be the linear combination formed such that the value of the $\mu$ sensitivity p calculated by the linear combination is proportional to the value of the actual NSP yaw moment Mnsp_act identified using the observed values (the detected values) $\gamma$_sens, $\delta f$_sens, and Vgx_estm as the values of $\gamma$_act, $\delta f$_act, and Vgx_act in the case where it is assumed that the road surface friction coefficient $\mu$_act takes a constant value in the linear two-wheeled vehicle model denoted by the aforesaid expression 4-3.

Supplementally, in this embodiment, the yaw rate estimated value $\gamma$_estm is determined so as to agree or substantially agree with the yaw rate detected value $\gamma$_sens, as described above. Hence, an expression, in which $\gamma$_sens in the right side of the aforesaid expression 5-7 has been replaced by $\gamma$_estm, may be used as a definitional expression for finding the value of the $\mu$ sensitivity p.

Both sides of the above expression 5-6 mean an NSP yaw moment estimated value Mnsp_estm, which is the estimated value of a moment about the yaw axis at NSP (the value of a moment on a model based on the aforesaid expression 4-3). In other words, the NSP yaw moment estimated value Mnsp- _estm agrees with the left side and the right side of expression 5-6, as represented by expressions 5-8a and 5-8b given below.

$$Mnsp\_estm = Iz * \gamma dot\_estm + Lnsp * m * Accy\_sensor\_estm \quad \text{Expression 5-8a}$$

$$Mnsp\_estm = \mu\_estm * p(\gamma\_sens, \delta f\_sens, Vgx\_estm) \quad \text{Expression 5-8b}$$

Expression 5-8a represents the NSP yaw moment estimated value Mnsp_estm as the estimated value of a moment balancing out an inertial force moment (a moment with a sign reversed from the sign of the inertial force moment) generated about the yaw axis at NSP by a motion of the vehicle 1 on the model.

Expression 5-8b represents the NSP yaw moment estimated value Mnsp_estm as the estimated value of a moment about the yaw axis generated at NSP due to the resultant force of the road surface reaction forces of each wheel 2-i, which depends on u estm (the resultant force of road surface reaction forces on the model).

In this case, the NSP yaw moment estimated value Mnsp_estm calculated by expression 5-8b out of expressions 5-8a and 5-8b is calculated depending on the road surface friction coefficient estimated value μ_estm, and therefore the Mnsp_estm reflects an influence of an error of the road surface friction coefficient estimated value μ_estm.

The right side of expression 5-8b does not directly include the vehicle center-of-gravity lateral acceleration estimated value Vgy_estm or the road surface bank angle estimated value θbank_estm.

For this reason, the NSP yaw moment estimated value Mnsp_estm calculated by expression 5-8b is not directly subjected to the influence of an error of the vehicle center-of-gravity lateral acceleration estimated value Vgy_estm or the road surface bank angle estimated value θbank_estm in the same manner as for the description on the actual NSP yaw moment Mnsp_act.

Accordingly, the vehicle model computing means for the description calculates the NSP yaw moment estimated value Mnsp_estm by expression 5-8b. Further generalizing the NSP yaw moment estimated value Mnsp_estm thus calculated, the estimated value Mnsp_estm carries a meaning as the estimated value of Mnsp_act calculated depending on μ_estm on the basis of a dynamic model of the vehicle 1 (more specifically, the estimated value of Mnsp_act calculated on the assumption that μ_estm is accurate).

The above has described the processing by the vehicle model computing means for the description. Supplementally, for the convenience of description of the principle for estimating the road surface friction coefficient μ, the vehicle model computing means for the description is assumed to calculate the vehicle center-of-gravity skid speed change rate estimated value Vgdot_y_estm, the vehicle center-of-gravity skid speed estimated value Vgy_estm, the yaw angular acceleration estimated value γdot_estm, and the sensed-by-sensor lateral acceleration estimated value Accy_sensor_estm.

However, if the NSP yaw moment estimated value Mnsp_estm is calculated according to the aforesaid expression 5-8b on the basis of the dynamic model (the linear two-wheeled vehicle model) represented by the aforesaid expression 4-3, then Vgdot_y_estm, Vgy_estm, γdot_estm, and Accy_sensor_estm are not required, as is obvious from the aforesaid expressions 5-7 and 5-8b.

If the dynamic model represented by the aforesaid expression 4-3 is used, then the value of the computation result of the right side of the aforesaid expression 5-8a is the same as the value of the computation result of the right side of the aforesaid expression 5-8b. Therefore, Mnsp_estm may alternatively be calculated by expression 5-8a.

A method for estimating the road surface friction coefficient μ will now be discussed on the basis of the NSP yaw moment detected value Mnsp_sens obtained by the aforesaid expression 4-14 and the NSP yaw moment estimated value Mnsp_estm calculated by the aforesaid expression 5-8b.

As described above, Mnsp_sens carries a meaning as the observed value (detected value) of Mnsp_act obtained on the basis of the observed value of the state quantity of a motion of the vehicle 1 (γdot_sens, Accy_sens) without the need for the value of a road surface reaction force acting on the vehicle 1 as an external force or the value of the road surface friction coefficient μ. Further, Mnsp_estm carries a meaning as the observed value (estimated value) of Mnsp_act calculated using μ_estm on the basis of the dynamic model of the vehicle 1. Hence, the deviation between Mnsp_sens and Mnsp_estm is considered to have correlation with the error of μ_estm relative to μ_act.

Here, it is assumed that the yaw rate detected value γ_sens, the yaw angular acceleration detected value γdot_sens, the front wheel rudder angle detected value δf_sens, the vehicle center-of-gravity longitudinal velocity estimated value Vgx_estm (the estimated value of a vehicle speed), and the vehicle center-of-gravity lateral acceleration detected value Accy_sens accurately coincide with the actual yaw rate γ_act, the actual yaw angular acceleration γdot_act, the actual front wheel rudder angle detected value δf_act, the actual vehicle center-of-gravity longitudinal velocity Vgx_act, and the actual sensed-by-sensor lateral acceleration Accy_sensor_act, respectively. At this time, expression 6-1 given below is derived from the aforesaid expression 4-11.

$$Iz * \gamma dot\_sens + Lnsp * m * Accy\_sens = \mu\_act * p(\gamma\_sens, \delta f\_sens, Vgx\_estm) \quad \text{Expression 6-1}$$

Further, expression 6-2 given blow is derived from this expression 6-1 and the aforesaid expressions 4-14, 5-6, and 5-8b.

Expression 6-2

$$\begin{aligned} Mnsp\_sens - Mnsp\_estm &= (Iz * \gamma dot\_sens + Lnsp * m * Accy\_sens) - \\ &\quad (Iz * \gamma dot\_estm + Lnsp * m * Accy\_sensor\_estm) \\ &= (\mu\_act - \mu\_estm) * p\left(\begin{array}{c} \gamma\_sens, \\ \delta f\_sens, Vgx\_estm \end{array}\right) \end{aligned}$$

Based on this expression 6-2, the road surface friction coefficient estimated value μ_estm may be determined such that Mnsp_estm agrees with Mnsp_sens in order to cause the value of μ_estm to coincide with the actual road surface friction coefficient μ_act in a situation where p(γ_sens, δf_sens, and Vgx_estm) is not zero (≠0).

More generally, this means that the road surface friction coefficient estimated value μ_estm to be applied to the dynamic model may be determined such that the estimated value of the actual NSP yaw moment Mnsp_act (the NSP yaw moment estimated value Mnsp_estm) calculated using a dynamic model including the friction characteristic of each wheel 2-i of the vehicle 1 (a dynamic model dependant upon the road surface friction coefficient estimated value μ_estm) agrees with the estimated value of the actual NSP yaw moment Mnsp_act (NSP yaw moment detected value Mnsp_sens) calculated from the yaw angular acceleration detected value γdot_sens as the observed value of a motion state quantity of the vehicle 1 and the vehicle center-ofgravity lateral acceleration detected value Accy_sens (=the detected value of the sensed-by-sensor lateral acceleration Accy_sensor).

In this case, p(γ_sens, δf_sens, Vgx_estm) of the right side of expression 6-2 does not include the vehicle center-of-gravity skid speed estimated value Vgy_estm or the road surface bank angle estimated value θbank_estm, as is obvious from the aforesaid expression 5-7.

Therefore, in the situation where p(γ_sens, δf_sens, Vgx_estm) is not zero (4), the value of the difference between Mnsp_sens and Mnsp_estm (the left side of expression 6-2) is considered to have high correlation with the deviation between μ_act and μ_estm (i.e., the error of μ_estm). In other words, in the situation where p(γ_sens, δf_sens, Vgx_estm) is not zero (≠0), the deviation between Mnsp_sens and Mnsp_estm is considered primarily due to the error of μ_estm.

Accordingly, it is considered that determining the road surface friction coefficient estimated value μ_estm on the basis of expression 6-2 makes it possible to estimate the actual road surface friction coefficient μ_act while restraining the influence of the error of the vehicle center-of-gravity skid speed estimated value Vgy_estm or the road surface bank angle estimated value θbank_estm.

Thus, the μ estimating means 26 in this embodiment calculates the road surface friction coefficient estimated value μ_estm on the basis of the aforesaid expression 6-2.

To determine the road surface friction coefficient estimated value μ_estm on the basis of expression 6-2 as described above such that Mnsp_estm agrees with Mnsp_sens in the situation where p(γ_sens, δf_sens, Vgx_estm) is not zero (≠0), it is conceivable to determine the road surface friction coefficient estimated value μ_estm such that, for example, the following expression 6-3 is satisfied.

$$Mnsp\_sens = \mu\_estm * p(\gamma\_sens, \delta f\_sens, Vgx\_estm) \qquad \text{Expression 6-3}$$

In this case, however, the road surface friction coefficient estimated value μ_estm tends to fluctuate excessively due to errors of Mnsp_sens, γ_sens, δf_sens, and Vgx_sens. Especially when the value of p(γ_sens, δf_sens, Vgx_estm) is close to zero, it is difficult to secure the reliability and stability of the road surface friction coefficient estimated value μ_estm, which is found on the basis of expression 6-3.

Hence, the μ estimating means 26 in this embodiment carries out feedback arithmetic processing based on the deviation between the NSP yaw moment detected value Mnsp_sens found from the observed value of a motion state quantity of the vehicle 1 and the NSP yaw moment estimated value Mnsp_estm found on the basis of a road surface reaction force, which is estimated depending on the road surface friction coefficient estimated value μ_estm, so as to sequentially determine the increasing/decreasing manipulated variable of μ_estm such that the deviation converges to zero (such that Mnsp_estm converges to Mnsp_sens) and then to update the value of μ_estm according to the increasing/decreasing manipulated variable.

Thus, the road surface friction coefficient estimated value μ_estm is sequentially calculated so as to converge to the actual road surface friction coefficient μ_act (steadily so as to agree with μ_act). Hereinafter, the deviation between Mnsp_sens and Mnsp_estm (=Mnsp_sens−Mnsp_estm) will be referred to as the NSP yaw moment estimation error Mnsp_err.

In this case, as is obvious from the aforesaid expression 6-2, the NSP yaw moment estimation error Mnsp_err is proportional to the μ sensitivity p. As the μ sensitivity p approaches zero, the sensitivity of Mnsp_err to the error of μ_estm (the magnitude of the rate of change in Mnsp_err with respect to a change in the error of μ_estm) decreases.

In this embodiment, therefore, the gain value, which indicates the rate of change in the increasing/decreasing manipulated variable of μ_estm with respect to the change in Mnsp_err (i.e., the feedback gain of the feedback arithmetic processing for converging Mnsp_err to zero), is changed according to the μ sensitivity p in order to secure the reliability and stability of μ_estm.

The above has described the basic principle for estimating the road surface friction coefficient μ in this embodiment.

Based on the basic principle for estimating the road surface friction coefficient μ described above, the processing by the μ estimating means 26 in this embodiment will be described with reference to FIG. 11 and FIG. 12.

Figure 11:
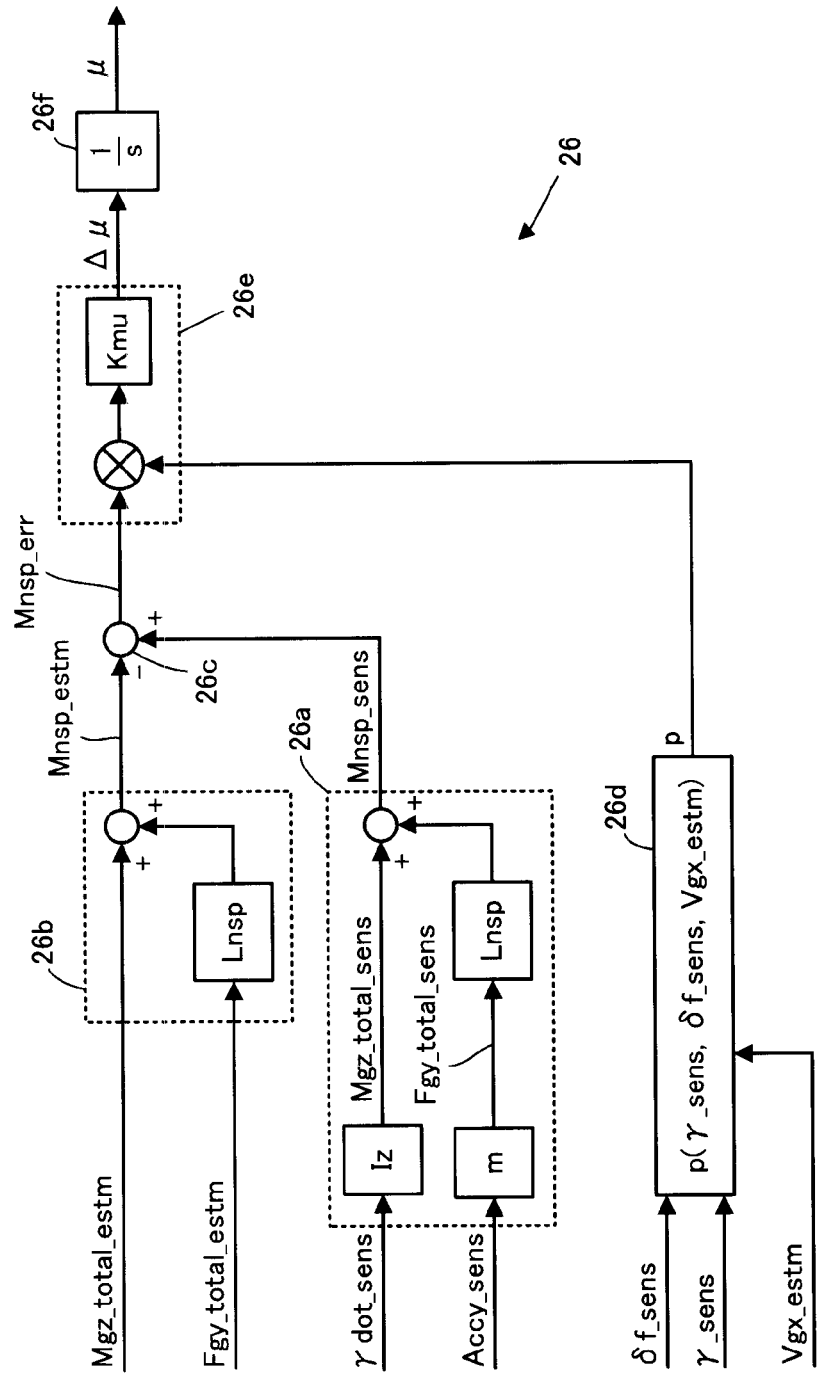
FIG. 11 is a block diagram illustrating the functions of a μ estimating means illustrated in FIG. 3.

As illustrated in the block diagram of FIG. 11, the μ estimating means 26 includes, as its functions, an Mnsp_sens calculator 26a, which calculates the NSP yaw moment detected value Mnsp_sens, an Mnsp_estm calculator 26b, which calculates an NSP yaw moment estimated value Mnsp_estm, an Mnsp_err calculator 26c, which calculates the NSP yaw moment estimation error Mnsp_err, a μ sensitivity calculator 26d, which calculates the μ sensitivity p(γ_sens, δf_sens, Vgx_estm), a friction coefficient increasing/decreasing manipulated variable determiner 26e, which determines the increasing/decreasing manipulated variable Δμ of the road surface friction coefficient μ according to the NSP yaw moment estimation error Mnsp_err and the μ sensitivity p(γ_sens, δf_sens, Vgx_estm), and a friction coefficient estimated value updater 26f, which updates the road surface friction coefficient estimated value μ_estm according to the increasing/decreasing manipulated variable Δμ.

Figure 12:
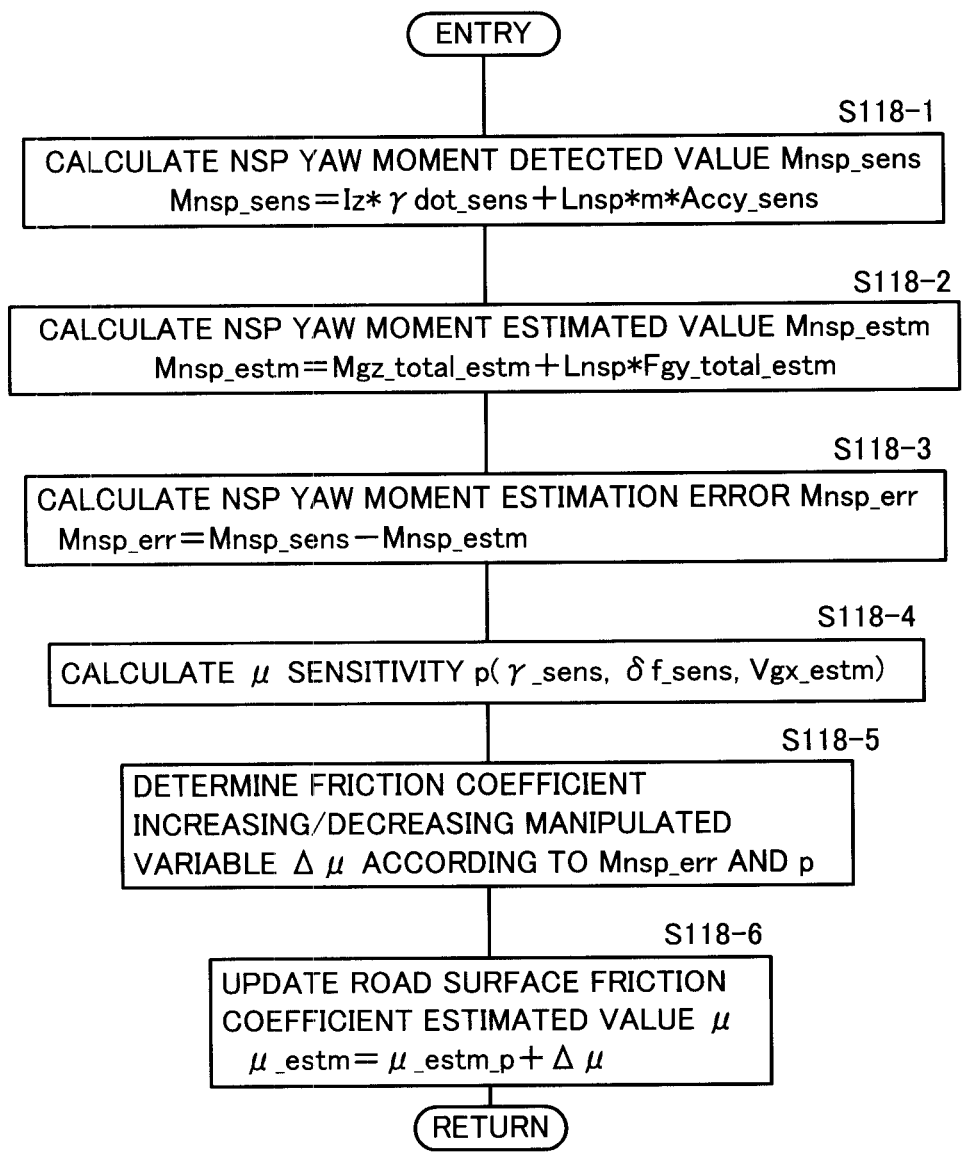
FIG. 12 is a flowchart illustrating the processing of the μ estimating means illustrated in FIG. 3.

The μ estimating means 26 performs the processing of the flowchart in FIG. 12, thereby sequentially determining the road surface friction coefficient estimated value μ_estm.

More specifically, the μ estimating means 26 performs the processing of an Mnsp_sens calculator 26a in S118-1 to calculate the NSP yaw moment detected value Mnsp_sens.

To be more specific, the Mnsp_sens calculator 26a calculates Mnsp_sens by computing the right side of the aforesaid expression 4-14 using the yaw angular acceleration detected value γdot_sens as the observed value of a motion state quantity of the vehicle 1 associated with an inertial force moment balancing out the NSP yaw moment Mnsp and the vehicle center-of-gravity lateral acceleration detected value Accy_sens (the sensed-by-sensor lateral acceleration detected value) out of the quantity-to-be-observed detected values generated by the quantity-to-be-observed detecting means 22 in the aforesaid S100.

In this case, predetermined values set in advance are used as the value of the vehicle yaw inertia moment Iz, the value of the vehicle mass m, and the distance Lnsp between the vehicle center of gravity and the NSP, which are necessary to compute expression 4-14. The first term of the right side of expression 4-14 corresponds to a total road surface reaction force resultant yaw moment detected value Mgz_total_sens, and m*Accy_sens in the second term corresponds to the total road surface reaction force resultant lateral force detected value Fgy_total_sens.

Further, the μ estimating means 26 performs the processing of an Mnsp_estm calculator 26b in S118-2 to calculate the NSP yaw moment estimated value Mnsp_estm.

To be more specific, the Mnsp_estm calculator 26b calculates Mnsp_estm according to expression 7-1 given below on the basis of the total road surface reaction force resultant lateral force estimated value Fgy_total_estm (a component in the Y-axis direction of the total road surface reaction force resultant translational force vector estimated value ↑Fg_total_estm) and the total road surface reaction force resultant yaw moment estimated value Mgz_total_estm, which have been calculated by the vehicle model computing means 24 in the aforesaid S112.

$$Mnsp\_estm = Mgz\_total\_estm + Lnsp * Fgy\_total\_estm \quad \text{Expression 7-1}$$

Subsequently, the μ estimating means 26 performs the processing of the Mnsp_err calculator 26c in S118-3 to calculate the NSP yaw moment estimation error Mnsp_err.

To be more specific, the Mnsp_err calculator 26c calculates Mnsp_err by subtracting the NSP yaw moment estimated value Mnsp_estm calculated in S118-2 from the NSP yaw moment detected value Mnsp_sens calculated in S118-1.

Further, the μ estimating means 26 calculates the μ sensitivity p by performing the processing of the μ sensitivity calculator 26d in S118-4.

To be more specific, the μ sensitivity calculator 26d calculates the μ sensitivity p(γ_sens, δf_sens, Vgx_estm) by computing the right side of the aforesaid expression 5-7 from the yaw rate detected value γ_sens and the front wheel rudder angle detected value δf_sens, which have been generated by the quantity-to-be-observed detecting means 22 in the aforesaid S100, and the vehicle center-of-gravity longitudinal velocity estimated value Vgx_estm found by the vehicle model computing means 24 in the aforesaid S114.

In this case, predetermined values that are set beforehand are used as the value of the vehicle inertia yaw moment Iz and the values of the parameters a11, a12s, a21, a22, b1 and b2, which are necessary for the computation of expression 5-7.

In this case, as is obvious from expression 5-7, the μ sensitivity p is found by linearly combining γ_sens and δf_sens. In this linear combination, the ratio between a coefficient by which γ_sens is multiplied and a coefficient by which δf_sens is multiplied changes according to Vgx_estm.

Subsequently, the μ estimating means 26 performs the processing of the friction coefficient increasing/decreasing manipulated variable determiner 26e in S118-5 to determine a friction coefficient increasing/decreasing manipulated variable Δt according to the NSP yaw moment estimation error Mnsp_err calculated in S118-3 and the μ sensitivity p calculated in S118-4.

In this processing, the friction coefficient increasing/decreasing manipulated variable Δμ is determined according to the feedback control law such that Mnsp_err is converged to zero (i.e., such that Mnsp_estm is converged to Mnsp_sens).

In this case, the proportional law is used as the feedback control law, and the value of Δμ is calculated by multiplying Mnsp_err by a certain gain value Gmu. In this case, Δμ is determined to be proportional to the product of Mnsp_err and the aforesaid μ sensitivity p. Thus, the gain value Gmu indicative of the rate of change in Δμ with respect to a change in Mnsp_err (hereinafter, Gmu is referred to as the friction coefficient operation gain) is determined such that the gain value Gmu changes according to the μ sensitivity p.

To be more specific, in this embodiment, the friction coefficient increasing/decreasing manipulated variable determiner 26e calculates Δμ according to expression 7-2 given below. Incidentally, Kmu in expression 7-2 takes a predetermined positive value that has been set beforehand.

Expression 7-2

$$\Delta\mu = Mnsp\_err * Gmu$$
$$= Mnsp\_err * (p(\gamma\_sens, \delta f\_sens, Vgx\_estm) * Kmu)$$

The frictional coefficient increasing/decreasing manipulated variable determiner 26e defines the result obtained by multiplying the μ sensitivity p, which has been calculated in S118-4, by the basic gain Kmu taking a predetermined positive value set beforehand (=Kmu*p) as the friction coefficient operation gain Gmu, and then the NSP yaw moment estimation error Mnsp_err calculated in S118-3 is multiplied by the friction coefficient operation gain Gmu so as to determine the friction coefficient increasing/decreasing manipulated variable Δμ.

In this case, the friction coefficient operation gain Gmu has the same polarity as that of the μ sensitivity p and Gmu is determined such that the magnitude (the absolute value) of Gmu decreases as the magnitude (the absolute value) of the μ sensitivity p decreases.

Subsequently, the u estimating means 26 performs the processing of the friction coefficient estimated value updater 26f in S118-6 to update the road surface friction coefficient estimated value μ_estm.

To be more specific, the friction coefficient estimated value updater 26f adds the friction coefficient increasing/decreasing manipulated variable Δμ calculated in S118-5 to the previous value of the road surface friction coefficient estimated value μ_estm_p so as to update the road surface friction coefficient estimated value μ_estm from the previous value μ_estm_p, thereby finding a new road surface friction coefficient estimated value μ_estm (the current value of μ_estm). In other words, this processing is carried out to find the road surface friction coefficient estimated value μ_estm by integrating Δμ.

The above has described the details of the processing of the μ estimating means 26 in this embodiment.

In the embodiment described above, particularly when the vehicle center-of-gravity skid speed estimated value Vgy_estm is calculated, the skid speed correction manipulated variable Vgy_cmpn is determined according to the vehicle center-of-gravity lateral acceleration deviation Accy_err.

Then, the value obtained by correcting the vehicle center-of-gravity skid speed model estimated value Vgy_predict as a value of the state quantity of the skid motion of the vehicle 1, which is generated by the external force of the total road surface reaction force resultant lateral force estimated value Fgy_total_estm by using Vgy_cmpn on the vehicle model is determined as the vehicle center-of-gravity skid speed estimated value Vgy_estm.

This enables an increase in the vehicle center-of-gravity skid speed estimated value Vgy_estm in the transitional period in a situation where the skid motion of the vehicle 1 changes due to a change in the actual road surface friction coefficient μ_act so that the accuracy is higher than that of the vehicle center-of-gravity skid speed model estimated value Vgy_predict.

Moreover, the vehicle center-of-gravity skid speed estimated value Vgy_estm, which is obtained by correcting the vehicle center-of-gravity skid speed provisional estimated value Vgy_predict by using Vgy_cmpn, is not used for the processing of calculating the vehicle center-of-gravity skid speed model estimated value Vgy_predict and the processing of calculating the road surface friction coefficient estimated value μ_estm (not fed back to these calculations).

This prevents the frequency characteristics of the transfer functions of the arithmetic processing system, which ranges from the output of the lateral acceleration sensor 15 to the skid speed correction manipulated variable Vgy_cmpn, from being affected by a change in the actual vehicle center-of-gravity longitudinal velocity gx_act (actual vehicle speed) and a change in the actual road surface friction coefficient μ_act. As a result, the convergence response of the vehicle center-of-gravity skid speed estimated value Vgy_estm to the change in the actual vehicle center-of-gravity skid speed Vgy_act is able to be maintained constant independently of the change in the actual vehicle center-of-gravity longitudinal velocity gx_act (actual vehicle speed) and the change in the actual road surface friction coefficient μ_act.

[Second Embodiment]

A second embodiment of the present invention will now be described with reference to FIG. 13 to FIG. 15. This embodiment differs from the first embodiment only in a part of the processing of the controller 20 (more specifically, a part of the processing of the vehicle model computing means 24). Therefore, in the description of this embodiment, the matters different from those of the first embodiment will be mainly described and the description of the same matters as those of the first embodiment will be omitted.

Figure 13:
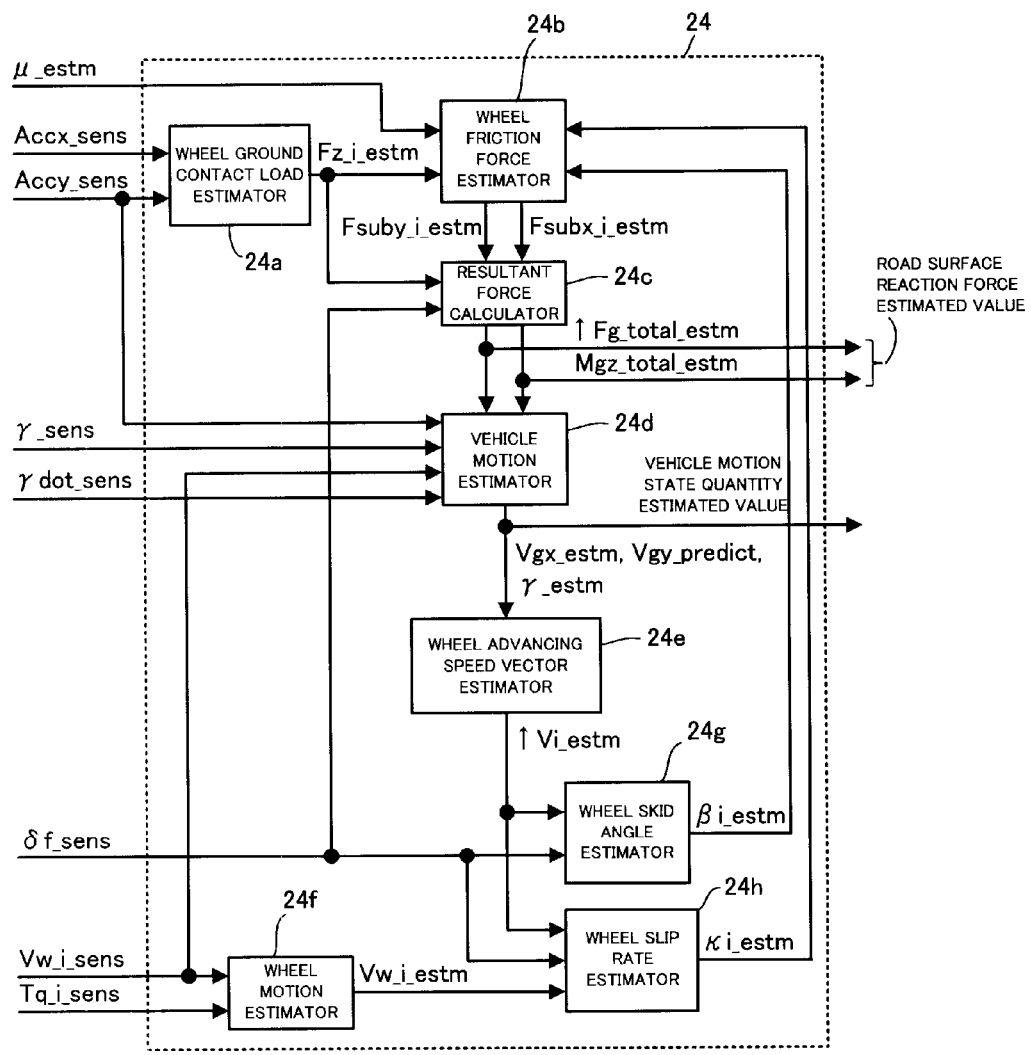
FIG. 13 is a block diagram illustrating the functions of a vehicle model computing means in a second embodiment.

As illustrated in the block diagram of FIG. 13, in this embodiment, the detected values of the quantities to be observed, which will be input to the vehicle model computing means 24, include γdot_sens in addition to δ1_sens, δ2_sens, Vw_i_sens, γ_sens, Accx_sens, Accy_sens, and Tq_i_sens. In this case, γdot_sens is input to the vehicle motion estimator 24d.

Figure 14:
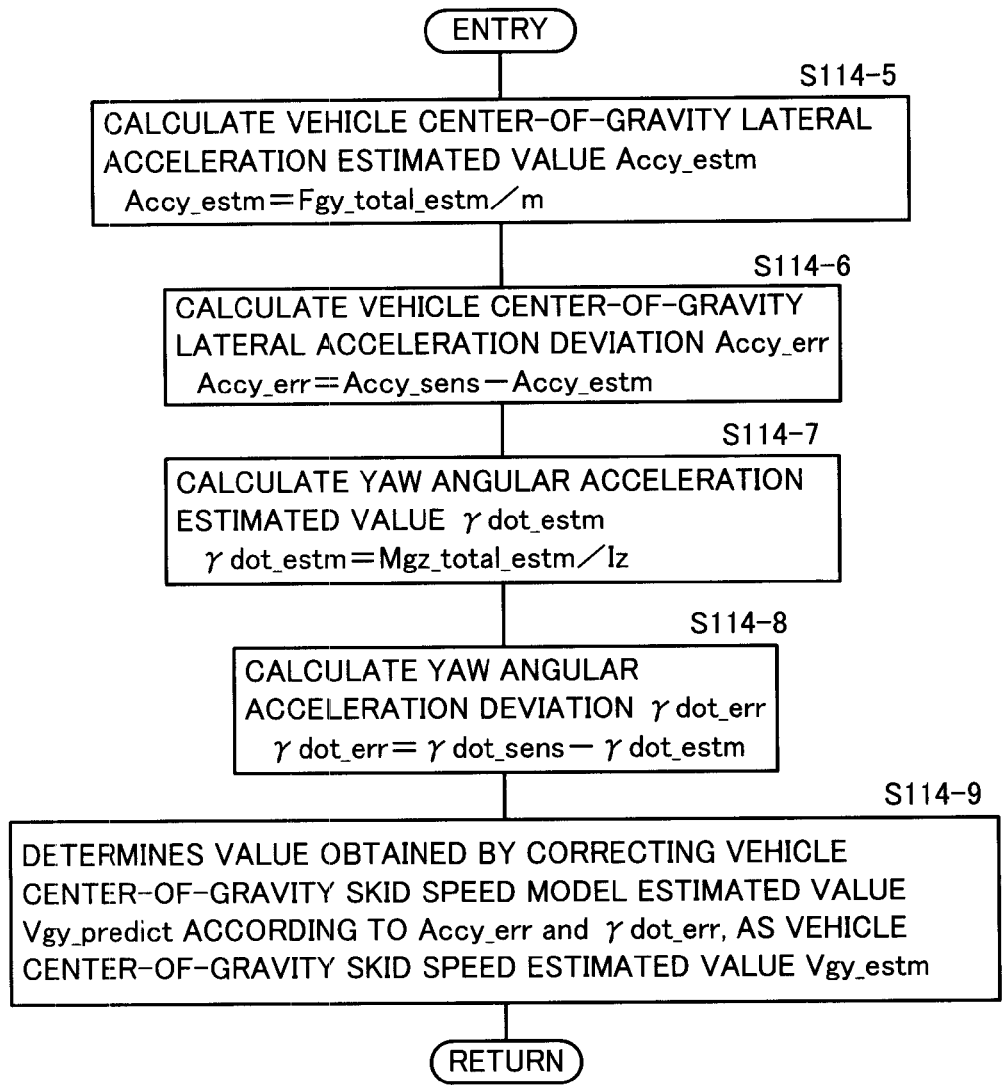
FIG. 14 is a flowchart illustrating processing for finding the estimated value of the state quantity of the skid motion of the vehicle in the vehicle motion estimator illustrated in FIG. 13.

Further, in this embodiment, the vehicle motion estimator 24d performs the processing illustrated in the flowchart of FIG. 14 by using the input value γdot_sens to determine the value obtained by correcting the vehicle center-of-gravity skid speed model estimated value Vgy_predict, which has been calculated according to the aforesaid expression 1-19, as the vehicle center-of-gravity skid speed estimated value Vgy_estm. This embodiment differs from the first embodiment only in this determination processing of the vehicle center-of-gravity skid speed estimated value Vgy_estm.

Describing this hereinbelow, in the processing illustrated in the flowchart of FIG. 14, the vehicle motion estimator 24d, first in S114-5, performs the same processing as the aforesaid S114-1 to calculate the vehicle center-of-gravity lateral acceleration estimated value Accy_estm according to the aforesaid expressions 1-41a or 1-41b.

Subsequently, in S114-6, the vehicle motion estimator 24d performs the same processing as the aforesaid S114-2 to calculate the vehicle center-of-gravity lateral acceleration deviation Accy_err according to the aforesaid expression 1-42.

Further, in S114-7, the vehicle motion estimator 24d calculates the yaw angular acceleration estimated value γdot_estm as a value of the yaw angular acceleration γdot, which is generated in the vehicle 1 on the vehicle model due to the external force moment of the total road surface reaction force resultant yaw moment estimated value Mgz_total_estm, according to the aforesaid expression 1-15a.

Specifically, the vehicle motion estimator 24d calculates γdot_estm by dividing Mgz_total_estm by the vehicle yaw inertia moment Iz. Note that, however, in the case where γdot_estm has already been calculated according to expression 1-15a in order to find the yaw rate provisional estimated value γ_predict according to the aforesaid expression 1-20 in each arithmetic processing cycle, there is no need to calculate γdot_estm again in S114-7.

Subsequently, in S114-8, the vehicle motion estimator 24d calculates the yaw angular acceleration deviation γdot_err by subtracting the yaw angular acceleration estimated value γdot_estm, which has been calculated according to the aforesaid expression 1-15 a, from the yaw angular acceleration detected value γdot_sens obtained in the aforesaid S100. In other words, the vehicle motion estimator 24d calculates γdot_err according to expression 1-44 given below.

$$\gamma\text{dot\_err} = \gamma\text{dot\_sens} - \gamma\text{dot\_estm} \qquad \text{Expression 1-44}$$

Subsequently, in S114-9, the vehicle motion estimator 24d determines a value obtained by correcting the vehicle center-of-gravity skid speed model estimated value Vgy_predict, which has been calculated according to the aforesaid expression 1-19, on the basis of the vehicle center-of-gravity lateral acceleration deviation Accy_err and the yaw angular acceleration deviation γdot_err, which have been found as described above, as the vehicle center-of-gravity skid speed estimated value Vgy_estm (the current value).

Figure 15:
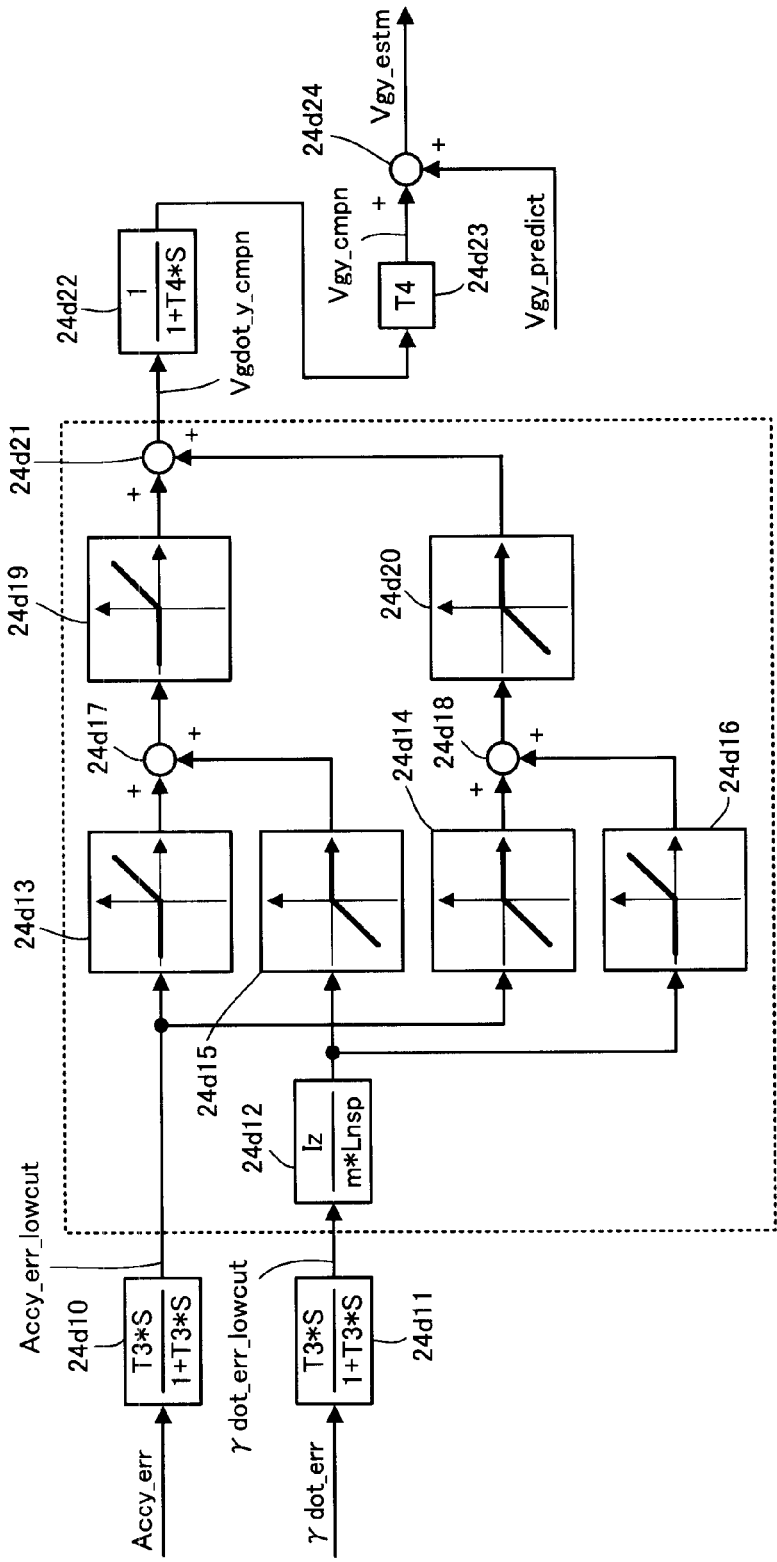
FIG. 15 is a block diagram illustrating the processing of S114-9 in the flowchart of FIG. 14.

The processing in S114-9 is carried out by, for example, the processing illustrated in the block diagram of FIG. 15.

First, the outline of this processing will be described below. The vehicle motion estimator 24d, first, passes the vehicle center-of-gravity lateral acceleration deviation Accy_err and the yaw angular acceleration deviation γdot_err through filters for frequency component adjustment 24d10 and 24d11, respectively, which have a low-cut characteristic (a characteristic that cuts off low-frequency components of a predetermined frequency or lower). Thereby, in the case where the vehicle center-of-gravity lateral acceleration deviation Accy_err includes a steady offset component due to a drift or the like in an output of the lateral acceleration sensor 15, a vehicle center-of-gravity lateral acceleration deviation filtering value Accy_err_lowcut, which is obtained by removing the offset component, is output from the filter 24d10. Similarly, in the case where the yaw angular acceleration deviation γdot_err includes a steady offset component due to a drift or the like in an output of the yaw rate sensor 13, a yaw angular acceleration deviation filtering value γdot_err_lowcut, which is obtained by removing the offset component, is output from the filter 24d11. Accy_err_lowcut and γdot_err_lowcut are, in other words, a high-frequency component of the vehicle center-of-gravity lateral acceleration deviation Accy_err and a high-frequency component of the yaw angular acceleration deviation γdot_err, respectively.

In this embodiment, the aforesaid filters 24d10 and 24d11 are both first-order low-cut filters each having a transfer function represented by T3*S/(1+T3*S), and their time constants T3 are set to the same value.

Subsequently, the vehicle motion estimator 24d finds the basic value Vgdot_y_cmpn of the correction manipulated variable for correcting the vehicle center-of-gravity skid speed model estimated value Vgy_predict on the basis of the aforesaid vehicle center-of-gravity lateral acceleration deviation filtering value Accy_err_lowcut and the yaw angular acceleration deviation filtering value γdot_err_lowcut by the processing within the frame line illustrated in FIG. 10 (the details are described later). The basic value Vgdot_y_cmpn carries a meaning as an error of the vehicle center-of-gravity skid speed change rate estimated value Vgdot_y_estm as the temporal change rate (differential value) of the vehicle center-of-gravity skid speed model estimated value Vgy_predict relative to the actual vehicle center-of-gravity skid speed change rate Vgdot_y_act. Hereinafter, the basic value Vgdot_y_cmpn is referred to as the skid speed change rate required correction amount Vgdot_y_cmpn.

Further, the vehicle motion estimator 24d finds a skid speed correction manipulated variable Vgy_cmpn as a correction manipulated variable for use in an actual correction of the vehicle center-of-gravity skid speed model estimated value Vgy_predict by passing the skid speed change rate required correction amount Vgdot_y_cmpn through the filter for frequency component adjustment 24d22 having a high-cut characteristic and a gain multiplier 24d23, which multiplies an input value by a gain T4 having a predetermined value.

In this case, the above filter 24d22 having the high-cut characteristic is a high-cut filter (a first-order low-pass filter having a time constant T4) having a transfer function represented by 1/(1+T4*S). Moreover, the gain T4, by which the gain multiplier 24d23 multiplies the output of the filter 24d22, is set so as to agree with the time constant T4 of the filer 24d22. The time constant T4 of the transfer function of the high-cut filter 24d22 is set such that the cutoff frequency of the high-cut filter 24d22 defined by the time constant T4 is higher than the cutoff frequency defined by the time constant T3 of the transfer function of the aforesaid low-cut filters 24d10 and 24d11.

Then, the vehicle motion estimator 24d determines a value, which is obtained by adding the aforesaid skid speed correction manipulated variable Vgy_cmpn to the vehicle center-of-gravity skid speed model estimated value Vgy_predict in the addition operation unit 24d24, as a vehicle center-of-gravity skid speed estimated value Vgy_estm. In other words, the vehicle motion estimator 24d determines a value, which is obtained by correcting the vehicle center-of-gravity skid speed model estimated value Vgy_predict calculated according to the aforesaid expression 1-19 by using the aforesaid skid speed correction manipulated variable Vgy_cmpn according to the aforesaid expression 1-43, as the vehicle center-of-gravity skid speed estimated value Vgy_estm.

The above has described the outline of the processing of S114-9.

Here, the principle for determining the skid speed correction manipulated variable Vgy_cmpn in this embodiment will be described before describing the processing within the dashed-line frame of FIG. 15 and the like in detail.

First, the skid speed change rate required correction amount Vgdot_y_cmpn determined by the processing within the dashed-line frame in FIG. 15 is determined so as to agree with Accy_err_lowcut in the case where a change in the vehicle center-of-gravity lateral acceleration deviation filtering value Accy_err_lowcut is likely to occur due to a change in an actual skid motion of the vehicle 1 as described later.

Further, in this case, the skid speed correction manipulated variable Vgy_cmpn is determined by passing Accy_err_lowcut through the filter 24d22 having a high-cut characteristic and the gain multiplier 24d23.

In this case, the processing of passing the vehicle center-of-gravity lateral acceleration deviation filtering value Accy_err_lowcut (or Accy_err) through the filter 24d22 having the high-cut characteristic and the gain multiplier 24d23 is, in principle, equivalent to the processing of passing the value Accy_err_lowcut (or Accy_err) through the low-cut filter (a first-order low-cut filter having the time constant T4) having a transfer function represented by T4*S/(1+T4*S) and an integrator having a transfer function represented by 1/S.

Further, as described above, Accy_err corresponds to an error of the vehicle center-of-gravity skid speed change rate estimated value Vgdot_y_estm relative to the actual vehicle center-of-gravity skid speed change rate Vgdot_y_act (=Vgdot_y_act −Vgdot_y_estm). Therefore, a value obtained by integrating Accy_err is equal to a value obtained by adding a certain integration constant to an error of the vehicle center-of-gravity skid speed model estimated value Vgy_predict as an integral value of the vehicle center-of-gravity skid speed change rate estimated value Vgdot_y_estm relative to the actual vehicle center-of-gravity skid speed Vgy_act (=Vgy_act−Vgy_predict).

Therefore, the value obtained by passing Accy_err_lowcut (or Accy_err) through the low-cut filter (the first-order low-cut filter having the time constant T4) and the integrator and further the value obtained by passing Accy_err_lowcut (or Accy_err) through the high-cut filter 24d22 and the gain multiplier 24d23 is basically considered to converge to the error of the vehicle center-of-gravity skid speed model estimated value Vgy_predict relative to the actual vehicle center-of-gravity skid speed Vgy_act (=Vgy_act−Vgy_predict) or a value close thereto.

Therefore, basically, a value obtained by adding the value obtained by passing Accy_err_lowcut (or Accy_err) through the high-cut filter 24d22 and the gain multiplier 24d23 to the vehicle center-of-gravity skid speed model estimated value Vgy_predict is considered to come closer to the actual vehicle center-of-gravity skid speed Vgy_act than to Vgy_predict.

The vehicle center-of-gravity lateral acceleration detected value Accy_sens (=the sensed-by-sensor lateral acceleration detected value Accy_sensor_sens) based on the output of the lateral acceleration sensor 15, however, changes according to not only a change in the skid motion state quantity of the vehicle 1, but also the actual road surface bank angle θbank_act, and therefore the vehicle center-of-gravity lateral acceleration deviation Accy_err also changes according to the actual road surface bank angle θbank_act.

Therefore, particularly, during the transitional period in which the actual road surface bank angle θbank_act changes, the skid speed correction manipulated variable Vgy_cmpn changes even if the actual vehicle center-of-gravity skid speed Vgy_act is constant. Consequently, the vehicle center-of-gravity skid speed estimated value Vgy_estm, which is finally determined, is susceptible to Vgy_act.

Therefore, in this embodiment, the vehicle motion estimator 24d determines the skid speed change rate required correction amount Vgdot_y_cmpn as a value obtained by removing the influence of the change in the actual road surface bank angle θbank_act from Accy_err_lowcut by the processing within the dashed-line frame of FIG. 15 on the basis of the vehicle center-of-gravity lateral acceleration deviation filtering value Accy_err_lowcut and the yaw angular acceleration deviation filtering value γdot_err_lowcut in order to suppress the fluctuation of the vehicle center-of-gravity skid speed estimated value Vgy_estm caused by a change in the actual road surface bank angle θbank_act. Then, the vehicle motion estimator 24d determines Vgdot_y_cmpn and thereafter determines the skid speed correction manipulated variable Vgy_cmpn through the high-cut filter 24d22 and the gain multiplier 24d23 on the basis of the skid speed change rate required correction amount Vgdot_y_estm.

In this case, the processing within the dashed-line frame (the processing of determining Vgdot_y_estm) in FIG. 15 is structured on the basis of the phenomenon described below.

It is supposed that, for example, while the vehicle 1 is carrying out a steady turning travel in the clockwise direction (the direction satisfying γ_act<0) on a horizontal road surface having a certain actual road surface friction coefficient μ_act, the actual road surface bank angle θbank_act changes from zero to a positive value.

In this case, the absolute value of Accy_sens (<0) decreases due to the effect of the component in the lateral direction of the vehicle 1 out of the gravitational acceleration immediately after the change in the actual road surface bank angle θbank_act. As a result, the vehicle center-of-gravity lateral acceleration deviation Accy_err changes to the positive side.

On the other hand, during a turning travel in the clockwise direction of the vehicle 1 on the road surface satisfying θbank_act>0, in the vehicle 1 in which the NSP lies on the rear side beyond the center-of-gravity point of the vehicle 1 (the vehicle 1 satisfying Lnsp>0), the absolute value of the actual yaw rate γ_act (<0) of the vehicle 1 tends to increase. Therefore, the yaw angular acceleration deviation γdot_err changes to the negative side.

Moreover, in the vehicle 1 in which the NSP lies on the front side beyond the center-of-gravity point of the vehicle 1 (the vehicle 1 satisfying Lnsp<0), the absolute value of the actual yaw rate γ_act (<0) of the vehicle 1 tends to decrease. Therefore, γdot_err changes to the positive side.

Therefore, when attention is focused on a value α2*γdot_err obtained by multiplying γdot_err by an appropriate coefficient having the same polarity as that of the distance Lnsp between the vehicle center of gravity and the NSP (hereinafter referred to as Lnsp same polarity coefficient α2), the value α2*γdot_err changes to the negative side, which is the polarity side different from that of Accy_err.

Moreover, it is supposed that, for example, while the vehicle 1 is carrying out a steady turning travel in the clockwise direction (the direction satisfying γ_act<0) on a horizontal road surface having a certain actual road surface friction coefficient μ_act, the actual road surface bank angle θbank_act changes from zero to a negative value.

In this case, the absolute value of Accy_sens (<0) increases due to the effect of the component in the lateral direction of the vehicle 1 out of the gravitational acceleration immediately after the change in the actual road surface bank angle θbank_act. As a result, the vehicle center-of-gravity lateral acceleration deviation Accy_err changes to the negative side.

On the other hand, during a turning travel in the clockwise direction of the vehicle 1 on the road surface satisfying θbank_act<0, in the vehicle 1 in which the NSP lies on the rear side beyond the center-of-gravity point of the vehicle 1 (the vehicle 1 satisfying Lnsp>0), the absolute value of the actual yaw rate γ_act (<0) of the vehicle 1 tends to decrease. Therefore, the yaw angular acceleration deviation γdot_err changes to the positive side.

Moreover, in the vehicle 1 in which the NSP lies on the front side beyond the center-of-gravity point of the vehicle 1 (the vehicle 1 satisfying Lnsp<0), the absolute value of the actual yaw rate γ_act (<0) of the vehicle 1 tends to increase. Therefore, γdot_err changes to the negative side. Therefore, the aforesaid α2*γdot_err changes to the positive side, which is the polarity side different from that of Accy_err.

Further, it is supposed that, for example, while the vehicle 1 is carrying out a steady turning travel in the counterclockwise direction (the direction satisfying γ_act>0) on a horizontal road surface having a certain actual road surface friction coefficient μ_act, the actual road surface bank angle θbank_act changes from zero to a positive value.

In this case, the absolute value of Accy_sens (>0) increases due to the effect of the component in the lateral direction of the vehicle 1 out of the gravitational acceleration immediately after the change in the actual road surface bank angle θbank_act. As a result, the vehicle center-of-gravity lateral acceleration deviation Accy_err changes to the positive side.

On the other hand, during a turning travel in the counterclockwise direction of the vehicle 1 on the road surface satisfying θbank_act>0, in the vehicle 1 in which the NSP lies on the rear side beyond the center-of-gravity point of the vehicle 1 (the vehicle 1 satisfying Lnsp>0), the absolute value of the actual yaw rate γ_act (>0) of the vehicle 1 tends to decrease. Therefore, the yaw angular acceleration deviation γdot_err changes to the negative side.

Moreover, in the vehicle 1 in which the NSP lies on the front side beyond the center-of-gravity point of the vehicle 1 (the vehicle 1 satisfying Lnsp<0), the absolute value of the actual yaw rate γ_act (>0) of the vehicle 1 tends to increase. Therefore, γdot_err changes to the positive side. Therefore, the aforesaid α2*γdot_err changes to the negative side, which is the polarity side different from that of Accy_err.

Still further, it is supposed that, for example, while the vehicle 1 is carrying out a steady turning travel in the counterclockwise direction (the direction satisfying γ_act>0) on a horizontal road surface having a certain actual road surface friction coefficient μ_act, the actual road surface bank angle θbank_act changes from zero to a negative value.

In this case, the absolute value of Accy_sens (>0) decreases due to the effect of the component in the lateral direction of the vehicle 1 out of the gravitational acceleration immediately after the change in the actual road surface bank angle θbank_act. As a result, the vehicle center-of-gravity lateral acceleration deviation Accy_err changes to the negative side.

On the other hand, during a turning travel in the counterclockwise direction of the vehicle 1 on the road surface satisfying θbank_act<0, in the vehicle 1 in which the NSP lies on the rear side beyond the center-of-gravity point of the vehicle 1 (the vehicle 1 satisfying Lnsp>0), the absolute value of the actual yaw rate γ_act (>0) of the vehicle 1 tends to increase. Therefore, the yaw angular acceleration deviation γdot_err changes to the positive side.

Moreover, in the vehicle 1 in which the NSP lies on the front side beyond the center-of-gravity point of the vehicle 1 (the vehicle 1 satisfying Lnsp<0), the absolute value of the actual yaw rate γ_act (>0) of the vehicle 1 tends to decrease. Therefore, γdot_err changes to the negative side. Therefore, the aforesaid α2*γdot_err changes to the positive side, which is the polarity side different from that of Accy_err.

As described above, the product α2*γdot_err of the yaw angular acceleration deviation γdot_err and the Lnsp same polarity coefficient α2 basically changes to the polarity side different from that of the vehicle center-of-gravity lateral acceleration deviation Accy_err (the reverse polarity side) in the transitional period immediately after the change in the actual road surface bank angle θbank_act.

Consequently, a value α2*γdot_errr_lowcut (a high-frequency component of α2*γdot_err), which is obtained by multiplying the yaw angular acceleration deviation filtering value γdot_err_lowcut by the Lnsp same polarity coefficient α2, changes to the polarity side different from that of the vehicle center-of-gravity lateral acceleration deviation filtering value Accy_err_lowcut (the reverse polarity side) if the actual road surface bank angle θbank_act changes.

On the other hand, it is supposed that, for example, the vehicle 1 skids due to a decrease change in the actual road surface friction coefficient μ_act while the vehicle 1 is carrying out a steady turning travel in the clockwise direction (the direction satisfying γ_act<0) on a horizontal road surface, by which the actual vehicle center-of-gravity skid speed change rate Vgdot_y_act changes to the positive side.

In this case, the absolute value of Accy_sens (<0) decreases immediately after the change in the actual road surface friction coefficient μ_act. As a result, the vehicle center-of-gravity lateral acceleration deviation Accy_err changes to the positive side.

On the other hand, if the vehicle 1 skids due to the decrease change in the actual road surface friction coefficient μ_act, the absolute value of the actual yaw rate γ_act (<0) of the vehicle 1 tends to decrease in the vehicle 1 in which the NSP lies on the rear side beyond the center-of-gravity point of the vehicle 1 (the vehicle 1 satisfying Lnsp>0). Therefore, the yaw angular acceleration deviation γdot_err changes to the positive side.

Moreover, in the vehicle 1 in which the NSP lies on the front side beyond the center-of-gravity point of the vehicle 1 (the vehicle 1 satisfying Lnsp<0), the absolute value of the actual yaw rate γ_act (<0) of the vehicle 1 tends to increase. Therefore, γdot_err changes to the negative side. Accordingly, the aforesaid $\alpha 2*\dot{\gamma}\_err$ changes to the positive side, which is the same polarity side as that of Accy_err.

Further, it is supposed that, for example, the vehicle 1 skids due to a decrease change in the actual road surface friction coefficient $\mu\_act$ while the vehicle 1 is carrying out a steady turning travel in the counterclockwise direction (the direction satisfying $\gamma\_act > 0$) on a horizontal road surface, by which the actual vehicle center-of-gravity skid speed change rate Vgdot_y_act changes to the negative side.

In this case, the absolute value of Accy_sens (>0) decreases immediately after the change in the actual road surface friction coefficient $\mu\_act$. As a result, the vehicle center-of-gravity lateral acceleration deviation Accy_err changes to the negative side.

On the other hand, if the vehicle 1 skids due to the decrease change in the actual road surface friction coefficient $\mu\_act$, the absolute value of the actual yaw rate $\gamma\_act(>0)$ of the vehicle 1 tends to decrease in the vehicle 1 in which the NSP lies on the rear side beyond the center-of-gravity point of the vehicle 1 (the vehicle 1 satisfying Lnsp>0). Therefore, the yaw angular acceleration deviation $\dot{\gamma}\_err$ changes to the negative side.

Moreover, in the vehicle 1 in which the NSP lies on the front side beyond the center-of-gravity point of the vehicle 1 (the vehicle 1 satisfying Lnsp<0), the absolute value of the actual yaw rate $\gamma\_act$ (>0) of the vehicle 1 tends to increase. Therefore, $\dot{\gamma}\_err$ changes to the positive side. Accordingly, the aforesaid $\alpha 2*\dot{\gamma}\_err$ changes to the negative side, which is the same polarity side as that of Accy_err.

As described above, the product $\alpha 2*\dot{\gamma}\_err$ of the yaw angular acceleration deviation $\dot{\gamma}\_err$ and the Lnsp same polarity coefficient $\alpha 2$ basically changes to the same polarity side as that of the vehicle center-of-gravity lateral acceleration deviation Accy_err in the transitional period immediately after the change in the actual vehicle center-of-gravity skid speed change rate Vgdot_y_act in either case of whether the change rate Vgdot_y_act changes to the positive side or to the negative side.

Consequently, a value $\alpha 2*\dot{\gamma}\_err\_lowcut$ (a high-frequency component of $\alpha 2*\dot{\gamma}\_err$), which is obtained by multiplying the yaw angular acceleration deviation filtering value $\dot{\gamma}\_err\_lowcut$ by the Lnsp same polarity coefficient $\alpha 2$, changes to the same polarity side as that of the vehicle center-of-gravity lateral acceleration deviation filtering value Accy_err_lowcut in either case of whether the actual vehicle center-of-gravity skid speed change rate Vgdot_y_act changes to the positive side or to the negative side.

Accy_err_lowcut and $\dot{\gamma}\_err\_lowcut$ are obtained by passing Accy_err and $\dot{\gamma}\_err$ through the filters 24d6 and 24d7 each having a low-cut characteristic, respectively. Therefore, the above characteristic related to the polarity of Accy_err_lowcut and $\dot{\gamma}\_err\_lowcut$ is not easily affected by a steady offset of Accy_err and $\dot{\gamma}\_err$ caused by a drift or the like of the output from the lateral acceleration sensor 15 or the yaw rate sensor 13. Accordingly, the changes in the polarity of Accy_err_lowcut and $\dot{\gamma}\_err\_lowcut$ are symmetrical between the positive and negative polarity sides.

For these reasons, it is conceivable that the change in Accy_err_lowcut is likely to have been caused by a change in the actual skid motion of the vehicle 1 (a translational motion in the lateral direction of the vehicle 1) in a situation where the product $\alpha 2*\dot{\gamma}\_err\_lowcut$ of the yaw angular acceleration deviation filtering value $\dot{\gamma}\_err\_lowcut$ and the Lnsp same polarity coefficient $\alpha 2$ changes to the same polarity side as that of Accy_err_lowcut in the case where the vehicle center-of-gravity lateral acceleration deviation filtering value Accy_err_lowcut changes to the positive or negative side.

On the other hand, in a situation where the product $\alpha 2*\dot{\gamma}\_err\_lowcut$ changes to the reverse polarity side to that of Accy_err_lowcut, it is conceivable that the change in Accy_err_lowcut is likely to have been caused by a change in the actual road surface bank angle $\theta bank\_act$.

Further, attention is focused on the sum of, for example, Accy_err_lowcut and the aforesaid product $\alpha 2*\dot{\gamma}\_err\_lowcut$, i.e., a linear-combined value (=Accy_err_lowcut+$\alpha 2*\dot{\gamma}\_err\_lowcut$: hereinafter this is referred to as the linear-combined value SUM), which is obtained by the linearly combining Accy_err_lowcut and $\dot{\gamma}\_err\_lowcut$ with the weighting factors applied to Accy_err_lowcut and $\dot{\gamma}\_err\_lowcut$, respectively, $\alpha 1$ and $\alpha 2$.

In this case, the linear-combined value SUM has a different polarity from that of Accy_err_lowcut as a first term (=1*Accy_err_lowcut) in a situation where Accy_err_lowcut has a different polarity from that of $\alpha 2*\dot{\gamma}\_err\_lowcut$ as a second term of SUM and further the absolute value of $\alpha 2*\dot{\gamma}\_err\_lowcut$ (the second term of SUM) is greater than the absolute value of Accy_err_lowcut (the first term of SUM). Therefore, it is conceivable that a large effect of the change in the bank angle of the road surface exists in the above situation.

Moreover, the linear-combined value SUM has the same polarity as that of Accy_err_lowcut (the first term of SUM) in one of the situations: where Accy_err_lowcut (the first term of SUM) has the same polarity as that of $\alpha 2*\dot{\gamma}\_err\_lowcut$ (the second term of SUM) and where Accy_err_lowcut (the first term of SUM) has a different polarity from that of $\alpha 2*\dot{\gamma}\_err\_lowcut$ (the second term of SUM) and further the absolute value of Accy_err_lowcut (the first term of SUM) is greater than the absolute value of $\alpha 2*\dot{\gamma}\_err\_lowcut$ (the second term of SUM).

Therefore, it is conceivable that the bank angle of the road surface is constant or the effect of a change thereof is small and the large effect of a change in the friction coefficient of the road surface or the motion state of the vehicle exists in this situation.

If, for example, the value of the Lnsp same polarity coefficient $\alpha 2$ as the weighting factor by which $\dot{\gamma}\_err\_lowcut$ is multiplied is set to a value, which is obtained by dividing the vehicle yaw inertia moment Iz by the product of the vehicle mass m and the distance Lnsp between the vehicle center of gravity and the NSP (=Iz/(m*Lnsp)), the linear-combined value (=Accy_err+$\alpha 2*\dot{\gamma}\_err$), which is obtained by linearly combining the values Accy_err and $\dot{\gamma}\_err$ with the weighting factors, by which the values Accy_err and $\dot{\gamma}\_err$ are multiplied, as 1 and $\alpha 2$, corresponds to a value obtained by dividing the NSP yaw moment error Mnsp_err described later by (m*Lnsp) and is proportional to the value Mnsp_err.

Therefore, the linear-combined value SUM is proportional to (the high-frequency component of Mnsp_err), which is obtained by passing the NSP yaw moment error Mnsp_err through a filter having a low-cut characteristic. Further, with the characteristic of Mnsp_err described later, the linear-combined value SUM is maintained at zero or a value close zero even in the case where the actual road surface bank angle $\theta bank\_act$ changes in a state where the error of the road surface friction coefficient estimated value $\mu\_estm$ is small.

In the processing within the dashed-line frame in FIG. 15 in this embodiment, the skid speed change rate required correction amount Vgdot_y_cmpn as the basic value of the skid speed correction manipulated variable Vgy_cmpn is determined from the vehicle center-of-gravity lateral acceleration deviation filtering value Accy_err_lowcut and the yaw angular acceleration deviation filtering value $\dot{\gamma}\_err\_lowcut$ as described below on the basis of the above description.

In other words, the vehicle motion estimator 24*d* inputs the yaw angular acceleration deviation filtering value γdot_err_lowcut into a coefficient multiplier 24*d*12, so that the coefficient multiplier 24*d*12 calculates the product α2*γdot_err_lowcut, which is obtained by multiplying γdot_err_lowcut by Lnsp same polarity coefficient α2.

In this case, α2 is set to a predetermined value Iz/(m*Lnsp) in this embodiment. In addition, predetermined values set beforehand are used for the value of the vehicle yaw inertia moment Iz necessary to set the value of α2, the value of the vehicle mass m, and the value of the distance Lnsp between the vehicle center of gravity and the NSP.

Then, the vehicle motion estimator 24*d* inputs the vehicle center-of-gravity lateral acceleration deviation filtering value Accy_err_lowcut into processors 24*d*13 and 24*d*14 and inputs the aforesaid product α2*γdot_err_lowcut into processors 24*d*15 and 24*d*16.

Both of the processors 24*d*13 and 24*d*16 directly output the input value if the input value≥0 holds, but perform processing of outputting zero independently of the input value if the input value<0 holds. In other words, the processors 24*d*13 and 24*d*16 output max (input value, 0).

Moreover, both of the processors 24*d*14 and 24*d*15 directly output the input value if the input value≤0 holds, but perform processing of outputting zero independently of the input value if the input value≥0 holds. In other words, the processors 24*d*14 and 24*d*15 output min (input value, 0).

Furthermore, the vehicle motion estimator 24*d* adds the output (≥0) of the processor 24*d*13 to the output (≤0) of the processor 24*d*15 by using an addition operation unit 24*d*17. Moreover, the vehicle motion estimator 24*d* adds the output (≤0) of the processor 24*d*14 to the output (≥0) of the processor 24*d*16 by using an addition operation unit 24*d*18.

Subsequently, the vehicle motion estimator 24*d* inputs the outputs of the addition operation units 24*d*17 and 24*d*18 into the processors 24*d*19 and 24*d*20, respectively, and then adds the outputs of the processors 24*d*19 and 24*d*20 to each other by using the addition operation unit 24*d*21 to calculate the skid speed change rate required correction amount Vgdot_y_cmpn.

In this case, the processor 24*d*19 has the same function as the processors 24*d*13 and 24*d*16 and outputs max(input value, 0). In addition, the processor 24*d*20 has the same function as the processors 24*d*14 and 24*d*15 and outputs min(input value, 0).

The above has described the details of the processing within the dashed-line frame in FIG. 15 in this embodiment.

According to the processing of the block diagram in FIG. 15 (the processing of S114-9 in FIG. 14) described above, in the case where the values Accy_err_lowcut and α2*γdot_err_lowcut (α2=Iz/(m*Lnsp)) have mutually the same polarity, in other words, in the case where it is conceivable that the change in Accy_err_lowcut is likely to have been caused by a change in an actual skid motion of the vehicle 1, one of the outputs of the processors 24*d*15 and 24*d*16 coincides with Accy_err_lowcut and the other of the outputs is equal to zero.

Therefore, in this case, the skid speed change rate required correction amount Vgdot_y_cmpn, which is the output of the addition operation unit 24*d*21, coincides with Accy_err_lowcut. Therefore, the skid speed correction manipulated variable Vgy_cmpn in this case is eventually determined as a value that has been passed through the high-cut filter 24*d*22 and the gain multiplier 24*d*23 directly.

On the other hand, in the case where the Accy_err_lowcut and α2*γdot_err_lowcut (α2=Iz/(m*Lnsp)) have polarities different from each other, in other words, in the case where it is conceivable that a change in Accy_err_lowcut is likely to have been caused by a change in the actual road surface bank angle θbank_act, one of the outputs of the processors 24*d*19 and 24*d*20 is equal to zero and the other of the outputs is equal to the aforesaid linear-combined value SUM (if SUM has the same polarity as that of Accy_err_lowcut) or is equal to zero (if SUM has the reverse polarity to Accy_err_lowcut).

Therefore, in this case, the skid speed change rate required correction amount Vgdot_y_cmpn, which is the output of the addition operation unit 24*d*21, has the same polarity as that of Accy_err_lowcut and has a value closer to zero than Accy_err_lowcut or equal to zero. Therefore, the skid speed correction manipulated variable Vgy_cmpn in this instance is eventually determined to be a value closer to zero than a value obtained by passing Accy_err_lowcut through the high-cut filter 24*d*22 and the gain multiplier 24*d*23 or determined to be zero.

In other words, if the linear-combined value SUM has a different polarity from that of Accy_err_lowcut (the first term of SUM), i.e., α2*γdot_err_lowcut (the second term of SUM) has a different polarity from that of Accy_err_lowcut (the first term of SUM) and further the absolute value of α2*γdot_err_lowcut (the second term of SUM) is greater than the absolute value of Accy_err_lowcut (the first term of SUM) as a result of the processing of FIG. 15 in this embodiment (the processing of S114-9 in FIG. 14), the skid speed correction manipulated variable Vgy_cmpn is always set to zero.

Moreover, if the linear-combined value SUM has the same polarity as that of Accy_err_lowcut (the first term of SUM), which means that α2*γdot_err_lowcut (the second term of SUM) has the same polarity as that of Accy_err_lowcut (the first term of SUM) or the absolute value of α2*γdot_err_lowcut (the second term of SUM) is smaller than the absolute value of Accy_err_lowcut (the first term of SUM), a value closer to zero out of SUM and Accy_err_lowcut is set as the skid speed correction manipulated variable Vgy_cmpn.

More specifically, if α2*γdot_err_lowcut has the same polarity as that of Accy_err_lowcut (in this instance, |SUM|>|Accy_err_lowcut| holds), Accy_err_lowcut is set as Vgy_cmpn. If α2*γdot_err_lowcut has a different polarity from that of Accy_err_lowcut (in this instance, |SUM|<|Accy_err_lowcut| holds), SUM is set as Vgy_cmpn.

Then, a value obtained by adding the skid speed correction manipulated variable Vgy_cmpn determined as described above to the vehicle center-of-gravity skid speed model estimated value Vgy_predict is determined as the vehicle center-of-gravity skid speed estimated value Vgy_estm.

The above has described the details of the processing for determining the vehicle center-of-gravity skid speed estimated value Vgy_estm in the processing of S114 in this embodiment (the processing of the vehicle motion estimator 24*d*).

This embodiment is the same as the first embodiment except the above-described matters.

The correspondence between this embodiment and the present invention will be additionally described here. This invention corresponds to one embodiment of the sixth aspect of the invention (more specifically, the eighth aspect of the invention).

In this case, in this embodiment, the position of the center-of-gravity point of the vehicle 1 corresponds to the predetermined position of the vehicle in the present invention.

Further, in this embodiment, the vehicle model computing means of the present invention is implemented by the processing of the vehicle model computing means 24 (the processing of S102 to S116 in FIG. 4, except the processing of FIG. 14 performed within the processing of S114).

In this case, in this embodiment, the vehicle model in the present invention is implemented by an arithmetic expression (arithmetic processing of the aforesaid expressions 1-1 to 1-24) executed by the vehicle model computing means 24. In addition, the friction characteristic model represented by expressions 1-8 and 1-8a and the friction characteristic model represented by the expression 1-9 and 1-9a correspond to the friction characteristic model in the present invention.

Further, the wheel two-dimensional road surface reaction force estimated value on the wheel coordinate system ↑Fsub_i of each wheel 2-$i$ (=(Fsubx_i_estm, Fsuby_i_estm)$^T$), which is calculated in the processing in S110 (the processing of the wheel friction force estimator 24$b$), corresponds to the road surface reaction force model value in the present invention.

Further, the total road surface reaction force resultant translational force vector estimated value ↑Fg_total_estm, which is calculated in the processing of S112 (the processing of the resultant force calculator 24$c$), corresponds to the resultant force of the road surface reaction force model values in the present invention. Moreover, the detected values of the quantities to be observed (δ1_sens, δ2_sens, Vw_i_sens, γ_sens, Accx_sens, Accy_sens, Tq_i_sens) input to vehicle model computing means 24 correspond to the observed values of the predetermined types of quantities to be observed in the present invention.

The detected values of the quantities to be observed (δ1_sens, δ2_sens, Vw_i_sens, γ_sens, Accx_sens, Accy_sens, Tq_i_sens) are the detected values of the quantities to be observed that are necessary for identifying the values of input parameters (κi, βi, Fz_i) other than the road surface friction coefficient μ among the input parameters in the aforesaid friction characteristic model.

Moreover, the vehicle center-of-gravity skid speed model estimated value Vgy_predict, which is calculated according to the aforesaid expression 1-19 in the processing of S114 (the processing of the vehicle motion estimator 24$d$), corresponds to the skid motion state quantity model value in the present invention.

In this case, a previous value Vgy_predict_p as a past calculated value of the vehicle center-of-gravity skid speed model estimated value Vgy_predict is used to calculate the current value as a new value of the vehicle center-of-gravity skid speed model estimated value Vgy_predict.

Further, the predetermined position actual lateral acceleration detecting means in the present invention is implemented by the lateral acceleration sensor 14 and the lateral acceleration detecting means 22$f$ of the quantity-to-be-observed detecting means 22.

In this case, the actual sensed-by-sensor lateral acceleration Accy_sensor_act corresponds to the predetermined position actual lateral acceleration in the present invention, and the vehicle center-of-gravity lateral acceleration detected value (sensed-by-sensor lateral acceleration detected value) Accy_sens corresponds to the detected value of predetermined position actual lateral acceleration in the present invention.

Further, the yaw angular acceleration detecting means in the present invention is implemented by the yaw rate sensor 13 and the yaw angular acceleration detecting means 22$d$ of the quantity-to-be-observed detecting means 22. In this case, the yaw axis passing through the center-of-gravity point of the vehicle 1 corresponds to the predetermined yaw axis in the present invention and the yaw angular acceleration detected value γdot_sens corresponds to the detected value of the angular acceleration in the present invention.

Moreover, the processing of S112 (the processing of the resultant force calculator 24$c$) and the processing in FIG. 14, which is performed in the processing of S114 (the processing of the vehicle motion estimator 24$d$), in this embodiment implement the lateral acceleration model value computing means, the lateral acceleration deviation computing means, the yaw angular acceleration model value computing means, the yaw angular acceleration deviation computing means, and the skid motion state quantity estimated value determining means in the present invention.

More specifically, the lateral acceleration model value computing means is implemented by the processing of S112 (more specifically, the processing of calculating the total road surface reaction force resultant lateral force Fgy_total_estm in the processing) and the processing of S114-5 in FIG. 14. In addition, the vehicle center-of-gravity lateral acceleration estimated value Accy_estm, which is found by this processing, corresponds to the lateral acceleration model value in the present invention.

Further, the lateral acceleration deviation computing means is implemented by the processing of S114-6 in FIG. 14. In addition, the vehicle center-of-gravity lateral acceleration deviation Accy_err, which is found by this processing, corresponds to the lateral acceleration deviation in the present invention.

Moreover, the yaw angular acceleration model value computing means is implemented by the processing of S112 (more specifically, the processing of calculating the total road surface reaction force resultant yaw moment Mgz_total_estm in the processing) and the processing of S114-7 in FIG. 14. In addition, the yaw angular acceleration estimated value γdot_estm, which is found by this processing, corresponds to the yaw angular acceleration model value in the present invention.

Further, the yaw angular acceleration deviation computing means is implemented by the processing of S114-8 in FIG. 14. In addition, the yaw angular acceleration deviation γdot_err, which is found by this processing, corresponds to the yaw angular acceleration deviation in the present invention.

Further, the skid motion state quantity estimated value determining means is implemented by the processing of S114-9 in FIG. 14 (the processing of the block diagram in FIG. 15). In addition, the vehicle center-of-gravity skid speed estimated value Vgy_estm, which is found by this processing, corresponds to the estimated value of the skid motion state quantity in the present invention.

Further, in the processing of S114-9 as the skid motion state quantity estimated value determining means (the processing of the block diagram in FIG. 15), the aforesaid filters 24$d$10 and 24$d$11 function as the second filter and the third filter in the present invention. In addition, the vehicle center-of-gravity lateral acceleration deviation filtering value Accy_err_lowcut and the yaw angular acceleration deviation filtering value γdot_err_lowcut correspond to the second filtering value and the third filtering value in the present invention, respectively.

Further, the correction basic value determining means in the present invention is implemented by the processing within the dashed-line frame of the block diagram in FIG. 15, and the correction computing means in the present invention is implemented by the processing of the filter 24$d$22, the gain multiplier 24$d$23, and the addition operation unit 24$d$24.

In this case, the skid speed change rate required correction amount Vgdot_y_cmpn corresponds to the basic value in the present invention, and the skid speed correction manipulated variable Vgy_cmpn corresponds to the correction manipulated variable in the present invention. In addition, the filter 24d22 functions as the first filter in the present invention and the gain multiplier 24d23 functions as the gain multiplication means in the present invention.

Moreover, the linear-combined value SUM (=Accy_err_lowcut+α2*γdot_err_lowcut) corresponds to the linear-combined value in the present invention.

In this case, the addition operation units 24d17 and 24d18 function as the means which calculate the linear-combined value SUM in the case where Accy_err_lowcut and α2*γdot_err_lowcut have polarities different from each other (the reverse polarities).

Further, in this embodiment, assuming that α1 is the weighting factor applied to the vehicle center-of-gravity lateral acceleration deviation Accy_err in the linear-combined value SUM, a1 is set to 1 and therefore a weighting factor α2 applied to γdot_err_lowcut is set to Iz/(m*Lnsp).

Accordingly, these weighting factors α1 and α2 are set so as to have polarities different from each other if the distance Lnsp between the vehicle center of gravity and the NSP is positive (if the NSP lies on the rear side beyond the center-of-gravity point of the vehicle 1) and if the distance Lnsp is negative (if the NSP lies on the front side beyond the center-of-gravity point of the vehicle 1).

In addition, since α1=1 holds in this embodiment, the polarity of α1*Accy_err_lowcut is the same as the polarity of Accy_err_lowcut.

Therefore, the mutual relationship between the polarity of the linear-combined value SUM and the polarity of α1*Accy_err_lowcut coincides with the mutual relationship between the polarity of SUM and the polarity of Accy_err_lowcut. Moreover, α1=1 and α2=Iz/(m*Lnsp) hold in this embodiment and therefore α1 and α2 are set such that the ratio between α1 and α2, i.e., α2/α1 coincides with Iz/(m*Lnsp).

In this embodiment described above, in a situation where a change in the vehicle center-of-gravity lateral acceleration deviation filtering value Accy_err_lowcut is likely to have been caused by a change in an actual skid motion of the vehicle 1 (in a situation where Accy_err_lowcut and α2*γdot_err_lowcut have mutually the same polarity) particularly when the vehicle center-of-gravity skid speed estimated value Vgy_estm is calculated, the skid speed correction manipulated variable Vgy_cmpn is determined by passing the skid speed change rate required correction amount Vgdot_y_cmpn conformed to Accy_err_lowcut through the high-cut filter 24d22 and the gain multiplier 24.

Then, a value obtained by correcting the vehicle center-of-gravity skid speed model estimated value Vgy_predict as a value of the state quantity of the skid motion of the vehicle 1, which is generated by an external force of the total road surface reaction force resultant lateral force estimated value Fgy_total_estm, by using Vgy_cmpn on the vehicle model is determined as the vehicle center-of-gravity skid speed estimated value Vgy_estm.

This enables an increase in the accuracy of the vehicle center-of-gravity skid speed estimated value Vgy_estm in the transitional period in a situation where the skid motion of the vehicle 1 changes due to a change in the actual road surface friction coefficient μ_act or the like so that the accuracy is higher than that of the vehicle center-of-gravity skid speed model estimated value Vgy_predict.

On the other hand, in a situation where it is conceivable that a change in the vehicle center-of-gravity lateral acceleration deviation filtering value Accy_err_lowcut is likely to have been caused by a change in the actual road surface bank angle θbank_act (in a situation where Accy_err_lowcut and α2*γdot_err_lowcut have polarities different from each other), the skid speed change rate required correction amount Vgdot_y_cmpn has the same polarity as that of Accy_err_lowcut and is closer to zero than Accy_err_lowcut or equal to zero.

For this reason, the skid speed correction manipulated variable Vgy_cmpn in this case is eventually determined to be a value closer to zero than the value obtained by passing Accy_err_lowcut through the high-cut filter 24d22 and the gain multiplier 24d23 or to be zero.

Therefore, in the case where Accy_err_lowcut changes due to an effect of a change in the actual road surface bank angle θbank_act, it is possible to prevent an inappropriate vehicle center-of-gravity skid speed estimated value Vgy_estm from being calculated by suppressing the correction of the vehicle center-of-gravity skid speed model estimated value Vgy_predict. Consequently, the reliability and stability of the vehicle center-of-gravity skid speed estimated value Vgy_estm are able to be increased.

Moreover, the vehicle center-of-gravity skid speed estimated value Vgy_estm obtained by correcting the vehicle center-of-gravity skid speed model estimated value Vgy_predict by Vgy_cmpn is not used for the processing of calculating the vehicle center-of-gravity skid speed model estimated value Vgy_predict and for the processing of calculating the road surface friction coefficient estimated value μ_estm (not fed back to these calculations).

This prevents the frequency characteristics of the transfer functions of the arithmetic processing system from the output of the lateral acceleration sensor 15 to the skid speed correction manipulated variable Vgy_cmpn from being affected by a change in the actual vehicle center-of-gravity longitudinal speed Vgx_act (actual vehicle speed) or the actual road surface friction coefficient μ_act.

As a result, the convergence response of the vehicle center-of-gravity skid speed estimated value Vgy_estm to a change in the actual vehicle center-of-gravity skid speed Vgy_act is able to be kept constant independently of a change in the actual vehicle center-of-gravity longitudinal speed Vgx_act (actual vehicle speed) or the actual road surface friction coefficient μ_act.

This embodiment corresponds to the eighth aspect of the invention and Vgy_cmpn has been found by using Accy_err_lowcut and γdot_err_lowcut. Note that, however, in the case where a steady offset component is not included or the offset component is sufficiently small in the vehicle center-of-gravity lateral acceleration detected value Accy_sens or the yaw angular acceleration detected value γdot_sens, the filters 24d10 and 24d11 may be omitted and Accy_err and γdot_err may be used in place of Accy_err_lowcut and γdot_err_lowcut to find Vgy_cmpn in the same manner as the above description. Thereby, the embodiment of the seventh aspect of the invention is configured.

Further, the gain multiplier 24d23 may be incorporated into the high-cut filter 24d22. In other words, the high-cut filter 24d22 may be configured as a filter having a transfer function represented by T4/(1+T4*S). In this case, the gain multiplier 24d23 is not needed.

Moreover, the filter 24d22 may be a filter having a band-pass characteristic that has a low-cut characteristic in addition to a high-cut characteristic. Similarly, the filter 24d10 and the filter 24d11 may be band-pass filters having a high-cut characteristic in addition to a low-cut characteristic.

Further, the processing of passing the skid speed change rate required correction amount Vgdot_y_cmpn through the high-cut filter 24d22 and the gain multiplier 24d23 is equivalent to the processing of passing Vgdot_y_cmpn through a low-cut filter (a first-order low-cut filter of time constant T4) and an integrator. Therefore, the low-cut filter and the integrator may be provided in place of the high-cut filter 24d22 and the gain multiplier 24d23.

In this case, however, arithmetic errors from integral computations are easily accumulated in the integrator. On the other hand, if the skid speed change rate required correction amount Vgdot_y_cmpn is passed through the high-cut filter 24d22 and the gain multiplier 24d23 as described in the aforesaid embodiment, the skid speed correction manipulated variable Vgy_cmpn is able to be found without accumulation of the arithmetic errors in the integrator.

Moreover, the weighting factors $\alpha 1$ and $\alpha 2$ in the linear-combined value (=$\alpha 1$*Accy_err_lowcut+$\alpha 2$*γdot_err_lowcut) of Accy_err_lowcut and γdot_err_lowcut may be set to values different from those in this embodiment. For example, the Lnsp same polarity coefficient $\alpha 2$ may be set to a value closer to zero than Iz/(m*Lnsp). Furthermore, for example, values obtained by multiplying both of the values ("1," Iz/(m*Lnsp)) of the weighting factors $\alpha 1$ and $\alpha 2$ in this embodiment by an arbitrary constant value other than zero may be used as the values of weighting factors $\alpha 1$ and $\alpha 2$ anew.

Moreover, in this embodiment, if Accy_err_lowcut and $\alpha 2$*γdot_err_lowcut have polarities different from each other, $\alpha 2$*γdot_err_lowcut has a different polarity from that of Accy_err_lowcut, and the absolute value of $\alpha 2$*γdot_err_lowcut is smaller than the absolute value of Accy_err_lowcut, the linear-combined value SUM is set as the skid speed change rate required correction amount Vgy_cmpn. Note that, however, if Accy_err_lowcut and $\alpha 2$*γdot_err_lowcut have polarities different from each other, Vgy_cmpn may be always set to zero.

Figure 16:
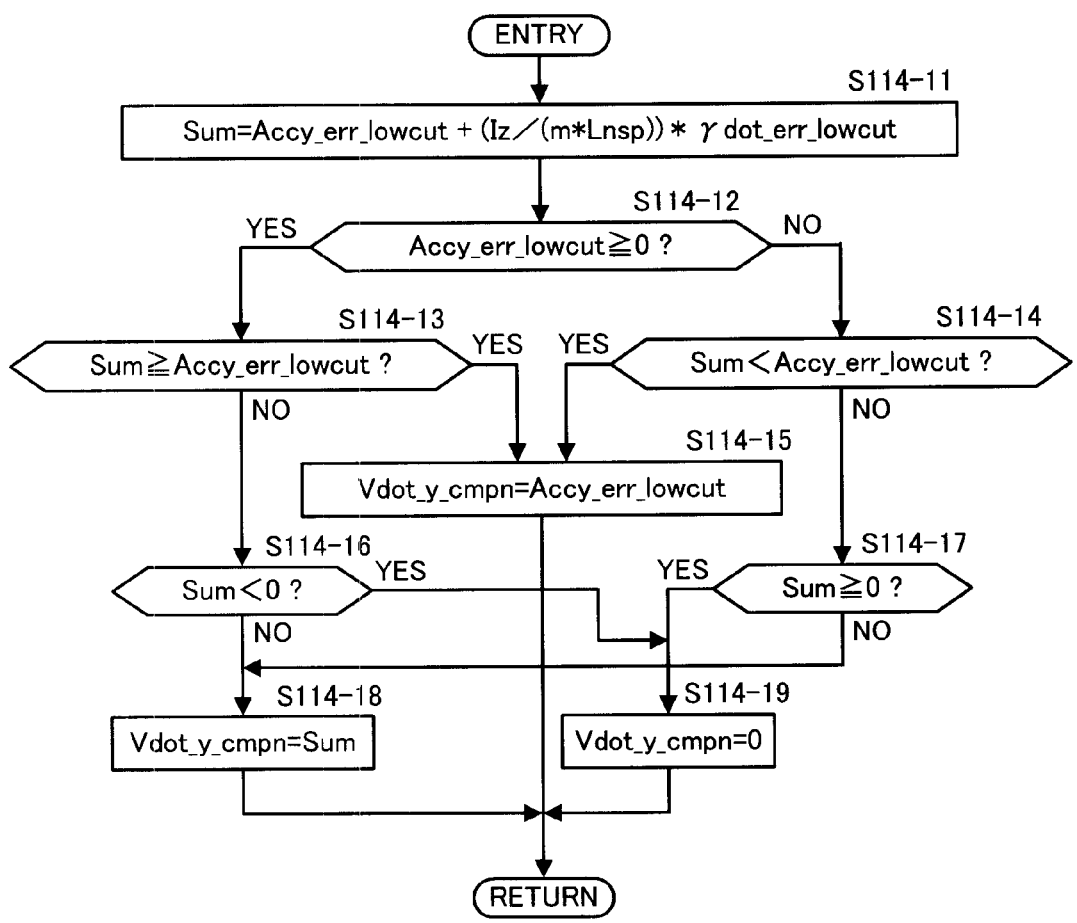
FIG. 16 is a flowchart illustrating an example of processing performed instead of the processing enclosed by a dashed line in the block diagram of FIG. 14.

Further, the processing, for example, illustrated in the flowchart of FIG. 16 may be performed in place of the processing within the dashed-line frame of the block diagram in FIG. 15 to find the skid speed change rate required correction amount Vgdot_y_cmpn In this processing, the vehicle motion estimator 24d, first in S114-11, calculates the linear-combined value SUM (=$\alpha 1$*Accy_err_lowcut+$\alpha 2$*γdot_err_lowcut) of the vehicle center-of-gravity lateral acceleration deviation filtering value Accy_err_lowcut and the yaw angular acceleration deviation filtering value γdot_err_lowcut. In this example, $\alpha 1$=1 and $\alpha 2$=Iz/(m*Lnsp) hold.

Subsequently, the vehicle motion estimator 24d determines whether Accy_err_lowcut≥0 holds in S114-12.

At this time, if the determination result of S114-12 is affirmative, i.e., if Accy_err_lowcut has the positive polarity or is equal to zero, the vehicle motion estimator 24d further determines whether the linear-combined value SUM found in S114-11 satisfies SUM≥Accy_err_lowcut in S114-13.

Here, the affirmative determination result of S114-13 means that $\alpha 2$*γdot_err_lowcut has the same polarity as that of Accy_err_lowcut (≥0) or is equal to zero.

Further, if the determination result of S114-12 is negative, i.e., if Accy_err_lowcut has the negative polarity, the vehicle motion estimator 24d further determines whether the value SUM found in S114-11 satisfies SUM<Accy_err_lowcut in S114-14.

Here, the affirmative determination result of S114-14 means that $\alpha 2$*γdot_err_lowcut has the same polarity as that of Accy_err_lowcut (<0).

Further, if the determination result of S114-13 or S114-14 is affirmative, the vehicle motion estimator 24d sets the value of the skid speed change rate required correction amount Vgdot_y_cmpn to Accy_err_lowcut in S114-15.

On the other hand, if the determination result of S114-13 is negative, the vehicle motion estimator 24d further determines whether SUM<0 holds in S114-16. Similarly, if the determination result of S114-14 is negative, the vehicle motion estimator 24d further determines whether SUM≥0 holds in S114-17.

Here, the affirmative determination result of S114-16 or the negative determination result of S114-17 mean that the polarity of the linear-combined value SUM is not the same as that of Accy_err_lowcut (includes the case where SUM=0 or Accy_err_lowcut=0 holds). In this case, $\alpha 2$*γdot_err_lowcut has the polarity reverse to that of Accy_err_lowcut except the case where Accy_err_lowcut=0 holds.

In addition, if the determination result of S114-16 or S114-17 is affirmative, the vehicle motion estimator 24d sets the skid speed change rate required correction amount Vgdot_y_cmpn to zero as the value thereof in S114-19.

Moreover, if the determination result of S114-16 or S114-17 is negative, the vehicle motion estimator 24d sets the skid speed change rate required correction amount Vgdot_y_cmpn to SUM as the value thereof in S114-18.

If $\alpha 2$*γdot_err_lowcut has the same polarity as that of Accy_err_lowcut or if γdot_err_lowcut is equal to zero as a result of the processing of the flowchart in FIG. 16 described above, Accy_err_lowcut is directly set as the value of Vgdot_y_cmpn.

Moreover, if $\alpha 2$*γdot_err_lowcut has reverse polarity to that of the Accy_err_lowcut or if Accy_err_lowcut is zero, Vgdot_y_cmpn is set to zero or to the linear-combined value SUM as the value thereof.

As described above, the same Vgdot_y_cmpn as that of the case of performing the processing illustrated in the block diagram in FIG. 15 is found by the processing of the flowchart in FIG. 16 as a result. In other words, the processing of the flowchart in FIG. 16 is equivalent to the processing within the dashed-line frame of the block diagram in FIG. 15.

Supplementally, if the processing of the flowchart in FIG. 16 is performed, the correction basic value determining means in the present invention is implemented by the processing of the flowchart. In this case, the linear-combined value calculating means in the present invention is implemented by the processing of S114-11 in FIG. 16.

Further, the vehicle motion estimator 24d has found Vgdot_x_estm, Vgx_estm, Vgx_predict, Vgdot_y_estm, Vgy_estm, Vgy_predict, γ_estm, γ_predict, and Accy_estm as the vehicle motion state quantity estimated values (including model estimated values). The vehicle motion state quantity estimated values other than those may be further found, if necessary.

For example, in the case of controlling the vehicle center-of-gravity skid angle βg by using the vehicle motion state quantity estimated value, a vehicle center-of-gravity skid angle estimated value βg_estm may be calculated as an estimated value of one state quantity of the skid motion of the vehicle 1.

In this case, the vehicle center-of-gravity skid angle estimated value βg_estm is able to be calculated according to expression 1-26 given below on the basis of the vehicle center-of-gravity longitudinal speed estimated value Vgx_estm and the vehicle center-of-gravity skid speed estimated value Vgy_estm, which have been found as described above.

$$\beta g\_estm = \tan^{-1}(Vgy\_estm/Vgx\_estm) \qquad \text{Expression 1-26}$$

Alternatively, the vehicle center-of-gravity skid angle estimated value βg_estm may be found by, for example, finding the model estimated value of the vehicle center-of-gravity skid angle βg according to the expression, in which Vgy_estm of the right side of the aforesaid expression 1-26 is replaced with the vehicle center-of-gravity skid speed model estimated value Vgy_predict, and adding a value, which is obtained by dividing the skid speed correction manipulated variable Vgy_cmpn found as described above by the vehicle center-of-gravity longitudinal speed estimated value Vgx_estm (=Vgy_ cmpn/Vgx_estm), to the model estimated value (note that, however, |Vgy_cmpn| is assumed to be extremely small in comparison with |Vgx_estm|).

In this case, the model estimated value of the vehicle center-of-gravity skid angle βg corresponds to the skid motion state quantity model value in the present invention and Vgy_cmpn/Vgx_estm corresponds to the correction manipulated variable in the present invention.

To find βg_estm, the selected wheel speed detected value Vw_i_sens select may be used as the detected value of the actual vehicle speed based on the wheel speed detected value Vw_i_sens (i=1, 2, 3, 4) in place of the vehicle center-of-gravity longitudinal speed estimated value Vgx_estm in either of the above methods.

[Third Embodiment]

Subsequently, a third embodiment of the present invention will be described with reference to FIG. 17 and the like. This embodiment differs from the second embodiment only in a part of the processing of the vehicle model computing means 24 (more specifically, the processing of the vehicle motion estimator 24d (the processing of S114 in FIG. 4) and the processing of the wheel advancing speed vector estimator 24e (the processing of S104 in FIG. 4). Therefore, in the description of this embodiment, the matters different from those of the second embodiment will be mainly described and the description of the same matters as those of the second embodiment will be omitted.

In the second embodiment, when the vehicle model computing means 24 calculates the wheel advancing speed vector estimated value ↑Vi_estm (i=1, 2, 3, 4) or the current value of the vehicle center-of-gravity skid speed model estimated value Vgy_predict in each arithmetic processing cycle of the controller 20, the past calculated value (the previous value or the like) of the vehicle center-of-gravity skid speed estimated value Vgy_estm is not used, but the past calculated value (the previous value) of the vehicle center-of-gravity skid speed model estimated value Vgy_predict is used.

On the other hand, in this embodiment, the past calculated value (the previous value) of the vehicle center-of-gravity skid speed estimated value Vgy_estm is fed back to the processing of the vehicle motion estimator 24d and the processing of the wheel advancing speed vector estimator 24e and the previous value Vgy_estm_p of the vehicle center-of-gravity skid speed estimated value is used in the processing of calculating the current value of ↑Vi_estm (i=1, 2, 3, 4) or Vgy_predict.

Specifically, in this embodiment, the wheel advancing speed vector estimator 24e calculates each wheel advancing speed vector estimated value ↑Vi_estm (=(Vx_i_estm, Vy_i_estm)$^T$) according to expression 1-2a given below, which is obtained by replacing Vgy_predict_p in the right side of the aforesaid expression 1-2 by the previous value Vgy_estm_p of the vehicle center-of-gravity skid speed estimated value in S104 of FIG. 4.

Expression 1-2a

↑Vi_estm = (Vx_i_estm, Vy_i_estm)$^T$

= (Vgx_estm_p, Vgy_estmt_p)$^T$ +

(−Py_i∗γestm_p, Px_i∗γestm_p)$^T$

The use of Vgy_estm_p for finding ↑Vi_estm as described above means that the past calculated value of the vehicle center-of-gravity skid speed estimated value Vgy_estm is used as one of the motion state quantities of the vehicle 1 for identifying the slip of each wheels 2-i.

Further, in this embodiment, in the calculation processing of the vehicle center-of-gravity longitudinal speed change rate estimated value Vgdot_x_estm of the processing of S114 in FIG. 4, the vehicle motion estimator 24d calculates the current value of the vehicle center-of-gravity skid speed model estimated value Vgy_predict according to expression 1-13aa given below, which is obtained by replacing Vgy_predict_p in the right side of the aforesaid expression 1-13a by the previous value Vgy_estm_p of the vehicle center-of-gravity skid speed estimated value.

Specifically, the vehicle motion estimator 24d calculates the current value of the vehicle center-of-gravity longitudinal speed change rate estimated value Vgdpt_x_estm on the assumption that the previous value Vgy_predict of the vehicle center-of-gravity skid speed model estimated value as the previous value of the vehicle center-of-gravity skid speed Vgy on the vehicle motion model agrees with the previous value Vgy_estm_p of the vehicle center-of-gravity skid speed estimated value, which is calculated as described below.

$$Vgdot\_x\_estm = Fgx\_total\_estm/m + Vgy\_estm\_p * \gamma\_estm\_p \qquad \text{Expression 1-13aa}$$

Further, in the calculation processing of the vehicle center-of-gravity skid speed model estimated value Vgy_predict of the processing of S114 in FIG. 4, the vehicle motion estimator 24d calculates the current value of the vehicle center-of-gravity skid speed model estimated value Vgy_predict according to expression 1-19a given below, which is obtained by replacing Vgy_predict_p in the right side of the aforesaid expression 1-19 by the previous value Vgy_estm_p of the vehicle center-of-gravity skid speed estimated value.

Specifically, the vehicle motion estimator 24d calculates the current value of the vehicle center-of-gravity skid speed model estimated value Vgy_predict on the assumption that the previous value Vgy_predict of the vehicle center-of-gravity skid speed model estimated value as the previous value of the vehicle center-of-gravity skid speed Vgy on the vehicle motion model agrees with the previous value Vgy_estm_p of the vehicle center-of-gravity skid speed estimated value, which is calculated as described later.

$$Vgy\_predict = Vgy\_estm\_p + Vgdot\_y\_estm * \Delta T \qquad \text{Expression 1-19a}$$

Further, in this embodiment, the vehicle motion estimator 24d calculates the current value of the vehicle center-of-gravity skid speed estimated value Vgy_estm as a value obtained by correcting the vehicle center-of-gravity skid speed model estimated value Vgy_predict, which has been calculated according to the aforesaid expression 1-19a, by performing the processing illustrated in the flowchart of FIG. 14 in each arithmetic processing cycle of the controller 20 in the same manner as the second embodiment.

In this embodiment, however, the processing of S114-5 to S114-8 in FIG. 14 is the same as that of the second embodiment. On the other hand, a part of the processing of S114-9 differs from that of the second embodiment. Specifically, in this embodiment, the processing of S114-9 is performed, for example, through the processing illustrated in the block diagram of FIG. 17. In FIG. 17, the same processors as those of the block diagram in FIG. 15 are denoted by the same reference characters.

Figure 17:
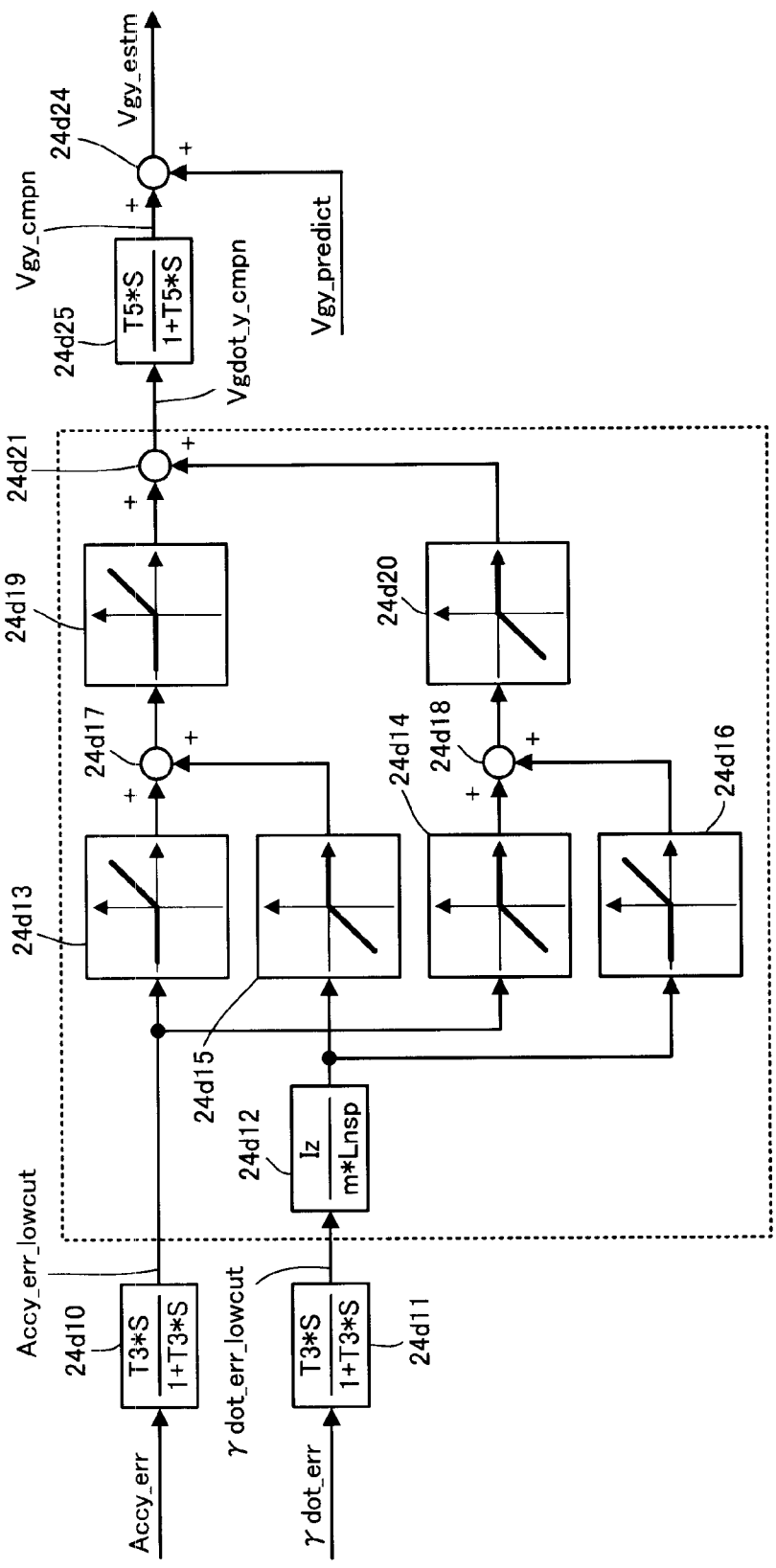
FIG. 17 is a block diagram illustrating the processing of S114-9 in the flowchart of FIG. 14 in a third embodiment.

In the processing of the block diagram in FIG. 17, the processing performed with the low-cut filters 24d10 and 24d11 combined with the processing within the dashed-line frame (the processing of finding the skid speed change rate required correction amount Vgdot_y_cmpn according to Accy_err and γdot_err) is the same as that of the second embodiment.

On the other hand, in this embodiment, the vehicle motion estimator 24d finds a value, which is obtained by passing the skid speed change rate required correction amount Vgdot_y_cmpn through the filter having a low-cut characteristic 24d25, as the skid speed correction manipulated variable Vgy_cmpn. This embodiment differs from the second embodiment in this processing. In this embodiment, the filter 24d5 is a low-cut filter having a transfer function represented by T5*S/(1+T5*S) (a first-order low-cut filter of time constant T5).

Further, the vehicle motion estimator 24d determines a value, which is obtained by adding the skid speed correction manipulated variable Vgy_cmpn to the vehicle center-of-gravity skid speed model estimated value Vgy_predict (the current value) in the addition operation unit 24d24 in the same manner as the second embodiment, as the vehicle center-of-gravity skid speed estimated value Vgy_estm (the current value).

Here, as described in the second embodiment, the value, which is obtained by passing the vehicle center-of-gravity lateral acceleration deviation filtering value Accy_err_lowcut (or the vehicle center-of-gravity lateral acceleration deviation Accy_err) as a value corresponding to an error (=Vgdot_y_act−Vgdot_y_estm) relative to the actual vehicle center-of-gravity skid speed change rate Vgdot_y_act of the vehicle center-of-gravity skid speed change rate estimated value Vgdot_y_estm through the low-cut filter and the integrator is basically assumed to converge to an error of the vehicle center-of-gravity skid speed model estimated value Vgy_predict relative to the actual vehicle center-of-gravity skid speed Vgy_act (=Vgy_act−Vgy_predict) or to a value close to the error.

On the other hand, in this embodiment, the previous value Vgy_estm_p of the vehicle center-of-gravity skid speed estimated value is used as a value obtained by adding the previous value Vgy_cmpn_p of the skid speed correction manipulated variable to the previous value Vgy_estm_p of the vehicle center-of-gravity skid speed model estimated value in order to calculate the current value of the vehicle center-of-gravity skid speed model estimated value Vgy_predict according to the aforesaid expression 1-19a. Therefore, the value Vgy_cmpn is integrated in the calculation processing of the vehicle center-of-gravity skid speed model estimated value Vgy_predict.

Therefore, the processing of calculating the current value of the vehicle center-of-gravity skid speed model estimated value Vgy_predict according to the aforesaid expression 1-19a substantially includes the processing of integrating Accy_err_lowcut (or Accy_err).

So in this embodiment, the vehicle motion estimator 24d determines a value obtained by passing the skid speed change rate required correction amount Vgdot_y_cmpn, which is determined so as to agree with Accy_err_lowcut in a situation where the change in the vehicle center-of-gravity lateral acceleration deviation filtering value Accy_err_lowcut is likely to be caused by a change in an actual skid motion of the vehicle 1, through the low-cut filter 24d25 as a skid speed correction manipulated variable Vgy_cmpn.

Then, the vehicle motion estimator 24d determines a value obtained by correcting the vehicle center-of-gravity skid speed model estimated value Vgy_predict by the above value Vgy_cmpn as a vehicle center-of-gravity skid speed estimated value Vgy_estm.

This embodiment is the same as the second embodiment except the matters described above.

Here, the correspondence between this embodiment and the present invention is additionally described. In this embodiment, the position of the center-of-gravity point of the vehicle corresponds to the predetermined position of the vehicle in the same manner as in the second embodiment.

Further, in this embodiment, the vehicle model computing means in the present invention is implemented by the processing of the vehicle model computing means 24 (the processing of S102 to S116 in FIG. 4, except the processing in FIG. 15 performed within the processing of S114) in the same manner as in the second embodiment.

In this case, the counterparts of the friction characteristic model, the vehicle lateral force model value, the observed value of the predetermined type of quantity to be observed, and the skid motion state quantity model value in the present invention are the same as those in the second embodiment. Note that, however, the vehicle model in the present invention is implemented by the arithmetic processing, in which expressions 1-2, 1-13 a, and 1-19 in the arithmetic processing of expressions 1-1 to 1-24 in the second embodiment are replaced by the aforesaid expressions 1-2a, 1-13aa, and 1-19a, in this embodiment.

Further, in this embodiment, the previous value (the past calculated value) Vgy_estm_p of the vehicle center-of-gravity skid speed estimated value Vgy_estm, which corresponds to the estimated value of the skid motion state quantity in the present invention is used to calculate a new value (the current value) of the vehicle center-of-gravity skid speed model estimated value Vgy_predict, which corresponds to the skid motion state quantity model value in the present invention.

Moreover, similarly to the second embodiment, the predetermined position actual lateral acceleration detecting means in the present invention is implemented by the lateral acceleration sensor 14 and the lateral acceleration detecting means 22f of the quantity-to-be-observed detecting means 22.

Further, similarly to the second embodiment, the yaw angular acceleration detecting means in the present invention is implemented by the yaw rate sensor 13 and the yaw angular acceleration detecting means 22d of the quantity-to-be-observed detecting means 22.

Still further, in this embodiment, similarly to the second embodiment, the lateral acceleration model value computing means, the lateral acceleration deviation computing means, the yaw angular acceleration model value computing means, the yaw angular acceleration deviation computing means, and the skid motion state quantity estimated value determining means in the present invention are implemented by the processing of S112 (the processing of the resultant force calculator 24c) and the processing in FIG. 14 performed in the processing of S114 (the processing of the vehicle motion estimator 24d).

Further, in the processing of S114-9 by the skid motion state quantity estimated value determining means (the processing of the block diagram in FIG. 17), the aforesaid filters 24d10 and 24d11 function as the fifth filter and the sixth filter in the present invention, respectively.

In addition, the vehicle center-of-gravity lateral acceleration deviation filtering value Accy_err_lowcut and the yaw angular acceleration deviation filtering value γdot_err_lowcut correspond to the fifth filtering value and the sixth filtering value in the present invention, respectively.

Moreover, the correction basic value determining means in the present invention is implemented by the processing within the dashed-line frame of the block diagram in FIG. 17 and the correction computing means in the present invention is implemented by the processing of the filter 24d25 and the addition operation unit 24d24.

In this case, the skid speed change rate required correction amount Vgdot_y_cmpn corresponds to the basic value in the present invention, and the skid speed correction manipulated variable Vgy_cmpn corresponds to the correction manipulated variable in the present invention. Moreover, the filter 24d25 functions as the fourth filter in the present invention.

Further, similarly to the second embodiment, the linear-combined value SUM (=Accy_err_lowcut+ α2*γdot_err_lowcut) corresponds to the linear-combined value in the present invention, and the addition operation units 24d17 and 24d18 function as means which calculate the linear-combined value SUM. In this case, the setting modes for the weighting factors α1 and α2 in the linear-combined value SUM are the same as those in the second embodiment.

According to the embodiment described hereinabove, when the vehicle center-of-gravity skid speed estimated value Vgy_estm is calculated, the skid speed correction manipulated variable Vgy_cmpn is determined by passing the skid speed change rate required correction amount Vgdot_y_cmpn agreed with Accy_err_lowcut through the low-cut filter 24d25 in a situation where a change in the vehicle center-of-gravity lateral acceleration deviation filtering value Accy_err_lowcut is likely to be caused by a change in an actual skid motion of the vehicle 1 (a situation where Accy_err_lowcut and α2*γdot_err_lowcut have mutually the same polarity).

Further, the vehicle center-of-gravity skid speed estimated value Vgy_estm (the current value) as a new value of the state quantity of the skid motion of the vehicle 1, which is generated due to an external force of the total road surface reaction force resultant lateral force estimated value Fgy_total_estm on the vehicle model is determined as a value obtained by correcting the vehicle center-of-gravity skid speed model estimated value Vgy_predict, which is calculated by using the past calculated value (the previous value) of the vehicle center-of-gravity skid speed estimated value Vgy_estm, by Vgy_cmpn.

This enables an increase in the accuracy of the vehicle center-of-gravity skid speed estimated value Vgy_estm in the transitional period in a situation where the skid motion of the vehicle 1 changes due to a change in the actual road surface friction coefficient μ_act or the like so that the accuracy is higher than that of the vehicle center-of-gravity skid speed model estimated value Vgy_predict.

Moreover, in a situation where it is conceivable that a change in the vehicle center-of-gravity lateral acceleration deviation filtering value Accy_err_lowcut is likely to have been caused by a change in the actual road surface bank angle θbank_act (in a situation where Accy_err_lowcut and α2*γdot_err_lowcut have polarities different from each other), the skid speed change rate required correction amount Vgdot_y_cmpn has the same polarity as that of Accy_err_lowcut and is closer to zero than Accy_err_lowcut or equal to zero.

For this reason, the skid speed correction manipulated variable Vgy_cmpn in this case is determined to be a value closer to zero than the value obtained by passing Accy_err_lowcut through the low-cut filter 24d25 or to be zero.

Therefore, in the case where Accy_err_lowcut changes due to an effect of a change in the actual road surface bank angle θbank_act, it is possible to prevent an inappropriate vehicle center-of-gravity skid speed estimated value Vgy_estm from being calculated by suppressing the correction of the vehicle center-of-gravity skid speed model estimated value Vgy_predict. Consequently, the reliability and stability of the vehicle center-of-gravity skid speed estimated value Vgy_estm are able to be increased.

In this embodiment, the past calculated value (the previous value) of the vehicle center-of-gravity skid speed estimated value Vgy_estm obtained by correcting the vehicle center-of-gravity skid speed model estimated value Vgy_predict by Vgy_cmpn is used for the processing of calculating the vehicle center-of-gravity skid speed model estimated value Vgy_predict (the current value).

This causes the frequency characteristics of the transfer functions of the arithmetic processing system from the output of the lateral acceleration sensor 15 to the skid speed correction manipulated variable Vgy_cmpn to be affected by a change in the actual vehicle center-of-gravity longitudinal speed Vgx_act (actual vehicle speed) or the actual road surface friction coefficient μ_act.

In this embodiment, however, the low-cut filters 24d10, 24d11, and 24d25 are provided. Therefore, even in a situation where the actual road surface friction coefficient μ_act or the like changes, it is possible to prevent the time constant of the convergence of the vehicle center-of-gravity skid speed estimated value Vgy_estm to the actual vehicle center-of-gravity skid speed Vgy_act from being too long.

Supplementally, this embodiment corresponds to the tenth aspect of the invention and Vgy_cmpn has been found by using Accy_err_lowcut and γdot_err_lowcut. Note that, however, in the case where a steady offset component is not included or the offset component is sufficiently small in the vehicle center-of-gravity lateral acceleration detected value Accy_sens or the yaw angular acceleration detected value γdot_sens, the filters 24d10 and 24d11 may be omitted and Accy_err and γdot_err may be used in place of Accy_err_lowcut and γdot_err_lowcut to find Vgy_cmpn in the same manner as the above description. Thereby, the embodiment of the ninth aspect of the invention is configured.

Moreover, in this embodiment, the filter 24d25 into which the skid speed change rate required correction amount Vgdot_y_cmpn is input has been provided. The filter 24d25, however, may be omitted and Vgdot_y_cmpn may be directly used as the skid speed correction manipulated variable Vgy_cmpn.

Particularly, in the case where a steady offset component is not included or the offset component is sufficiently small in the vehicle center-of-gravity lateral acceleration detected value Accy_sens or the yaw angular acceleration detected value γdot_sens, both of the filters 24d10, 24d11 and the filter 24d25 may be omitted.

Moreover, in this embodiment, there are provided the filters 24d10 and 24d11, into which Accy_sens and γdot_sens are input, respectively, and the filter 24d25, into which Vgdot_y_cmpn is input, as filters having a low-cut characteristic. In the case where, however, a steady offset component is not included or the offset component is sufficiently small in the vehicle center-of-gravity lateral acceleration detected value Accy_sens or the yaw angular acceleration detected value γdot_sens, any one or both of the filters 24d10, 24d11 and the filter 24d25 may be omitted.

If, however, a steady offset component is included in Accy_sens or γdot_sens, preferably the filter 24d25 among the filters 24d10, 24d11 and the filter 24d25 is omitted so that the changes in the polarity of Accy_err_lowcut and γdot_err_lowcut are symmetrical between the positive polarity side and the negative polarity side.

Further, each of the filters 24d10, 24d11, and 24d25 may be a band-pass filter having a low-cut characteristic in addition to the high-cut characteristic.

Moreover, the weighting factors α1 and α2 in the linear-combined value of Accy_err_lowcut and γdot_err_lowcut (=α1*Accy_err_lowcut+α2*γdot_err_lowcut) may be set to values other than 1 and Iz/(m*Lnsp), respectively, in the same manner as for the description on the second embodiment.

Further, if Accy_err_lowcut and α2*γdot_err_lowcut have polarities different from each other, Vgy_cmpn may be always set to zero.

Moreover, the processing illustrated in the flowchart of FIG. 16 may be performed in place of the processing within the dashed-line frame of FIG. 17 to find the skid speed change rate required correction amount Vgdot_y_cmpn.

Further, the vehicle motion estimator 24d may calculate the vehicle center-of-gravity skid angle estimated value βg_estm as an estimated value of one state quantity of the skid motion of the vehicle 1 in the same manner as the description on the second embodiment.

[Fourth Embodiment]

Subsequently, a fourth embodiment of the present invention will be described with reference to FIG. 18 to FIG. 20. This embodiment differs from the first or second embodiment only in a part of the processing of the controller 20. Therefore, in the description of the present invention, the matters different from those of the first or second embodiment will be mainly described and the description of the same matters as those of the first or second embodiment will be omitted.

Figure 18:
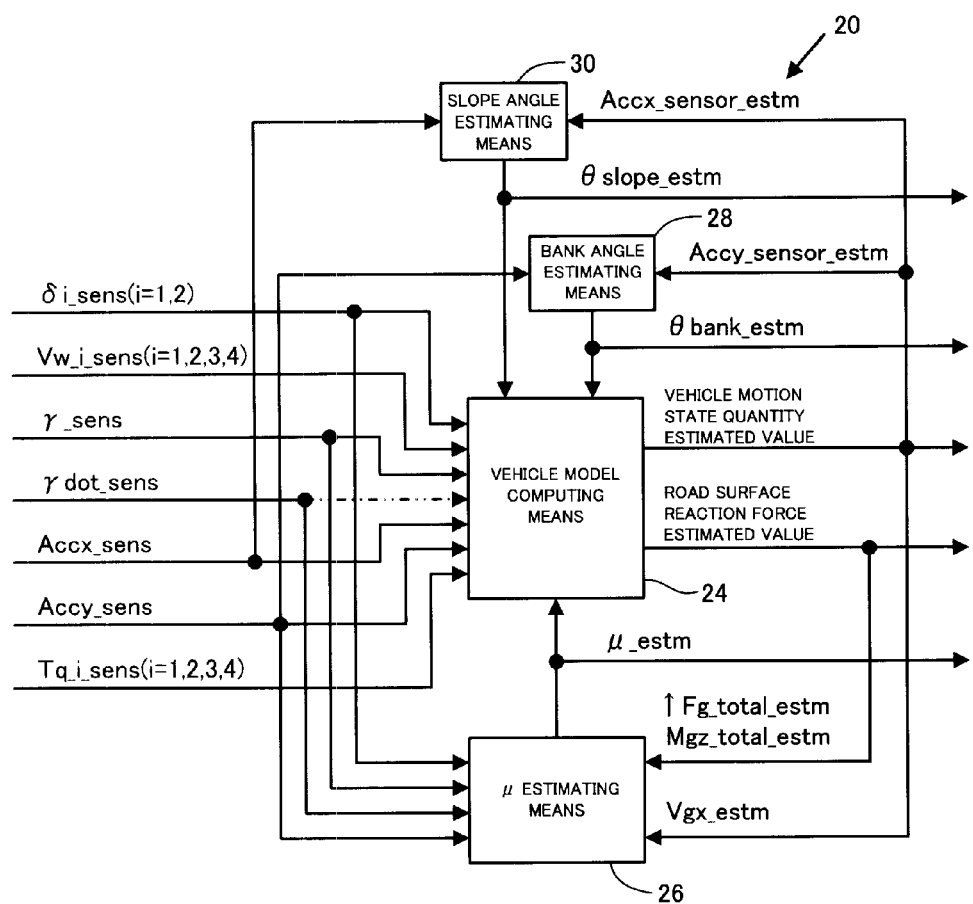
FIG. 18 is a block diagram illustrating the main functions of a controller in a fourth embodiment.

In this embodiment, as illustrated in the block diagram of FIG. 18, the controller 20 includes, as its main functional means, the bank angle estimating means 28, which sequentially performs the processing of estimating the road surface bank angle θbank (the bank angle θbank of the road surface on which the vehicle 1 is traveling), and the slope angle estimating means 30, which sequentially performs the processing of estimating the road surface slope angle θslope (the slope angle θslope of the road surface on which the vehicle 1 is traveling), in addition to the quantity-to-be-observed detecting means 22, the vehicle model computing means 24, and the μ estimating means 26.

In this case, the functions and processing of the quantity-to-be-observed detecting means 22 and the μ estimating means 26 are the same as those of the first embodiment.

On the other hand, in this embodiment, the vehicle model computing means 24 differs from the first embodiment only in a part of the processing (more specifically, the processing of the vehicle motion estimator 24d (the processing of S114 in FIG. 4)). In the processing of the vehicle motion estimator 24d, there are used a road surface bank angle estimated value θbank_estm, which is the estimated value of the actual road surface bank angle θbank_act found as described later by the bank angle estimating means 28 and a road surface slope angle estimated value θslope_estm, which is the estimated value of the actual road surface slope angle θslope_act found as described later by the slope angle estimating means 30.

More specifically, in the processing of the vehicle model computing means 24 in this embodiment, the vehicle motion model, for which the road surface bank angle θbank or the road surface slope angle θslope is considered, is used in place of the vehicle motion model premised on that the road surface is a horizontal plane. Therefore, in this embodiment, as illustrated in the block diagram of FIG. 18, the vehicle model computing means 24 receives inputs of the quantity-to-be-observed detected value, which is generated by the quantity-to-be-observed detecting means 22, and the road surface friction coefficient estimated value μ_estm, which is calculated by the μ estimating means 26, and further inputs of the road surface bank angle estimated value θbank_estm and the road surface slope angle estimated value θslope_estm, which are calculated as described later by the bank angle estimating means 28 and the slope angle estimating means 30, respectively.

The quantity-to-be-observed detected values, which are input to the vehicle model computing means 24, are the same as those of the first embodiment (δf_sens (=δ1_sens=δ2_sens), Vw_i_sens (i=1, 2, 3, 4), γ_sens, Accx_sens, Accy_sens, and Tq_i_sens (i=1, 2, 3, 4)) or the same as those of the second embodiment ((δf_sens (=δ1_sens=δ2_sens), Vw_i_sens (i=1, 2, 3, 4), γ_sens, γdot_sens, Accx_sens, Accy_sens, and Tq_i_sens (i=1, 2, 3, 4)). Therefore, in FIG. 18, the input of γdot_sens to the vehicle model computing means 24 is indicated by a two-dot chain line. In the following description, the fourth embodiment, in which γdot_sens is not input to the vehicle model computing means 24, is sometimes referred to as the 4A embodiment, while the fourth embodiment, in which γdot_sens is input to the vehicle model computing means 24, is sometimes referred to as the 4B embodiment.

In this embodiment (the 4A embodiment and the 4B embodiment), the vehicle model computing means 24 calculates the road surface reaction force estimated value and the vehicle motion state quantity estimated value by using the aforesaid input values. In this case, the road surface reaction force estimated value calculated by the vehicle model computing means 24 is the same as that of the first or second embodiment.

On the other hand, in this embodiment (the 4A embodiment and the 4B embodiment), the vehicle motion state quantity estimated value calculated by the vehicle model computing means 24 includes the sensed-by-sensor longitudinal acceleration estimated value Accx_sensor_estm, which is the estimated value of the longitudinal acceleration of the vehicle 1 sensed by the longitudinal acceleration sensor 14, and the sensed-by-sensor lateral acceleration estimated value Accy_sensor_estm, which is the estimated value of the lateral acceleration of the vehicle 1 sensed by the lateral acceleration sensor 15.

Moreover, in this embodiment (the 4A embodiment and the 4B embodiment), the bank angle estimating means 28 receives the inputs of the aforesaid sensed-by-sensor lateral acceleration estimated value Accy_sensor_estm and the vehicle center-of-gravity lateral acceleration detected value Accy_sens (=sensed-by-sensor lateral acceleration detected value Accy_sensor_sens), which has been generated by the quantity-to-be-observed detecting means 22. Then, the bank angle estimating means 28 finds the road surface bank angle estimated value θbank_estm by using these input values.

Further, in this embodiment (the 4A embodiment and the 4B embodiment), the slope angle estimating means 30 receives the inputs of the aforesaid sensed-by-sensor longitudinal acceleration estimated value Accx_sensor_estm and the vehicle center-of-gravity longitudinal acceleration detected value Accx_sens (=sensed-by-sensor longitudinal acceleration detected value Accx_sensor_sens), which has been generated by the quantity-to-be-observed detecting means 22. Then, the slope angle estimating means 30 finds the road surface slope angle estimated value θslope_estm by using these input values.

The following describes the processing of the vehicle model computing means 24, the bank angle estimating means 28, and the slope angle estimating means 30 in this embodiment (the 4A embodiment and the 4B embodiment) in more detail.

The processing of the vehicle model computing means 24 in this embodiment (the 4A embodiment and the 4B embodiment) differs from the processing of the first embodiment or the second embodiment only in a part of the processing of the vehicle motion estimator 24d. Therefore, the processes of the steps other than S114 among the processes of S102 to S116 in FIG. 4 are the same as those of the first embodiment or the second embodiment.

In this case, the vehicle motion estimator 24*d* in this embodiment (the 4A embodiment and the 4B embodiment) calculates the vehicle motion state quantity estimated value by using the vehicle motion model (the vehicle motion model represented by expressions 1-13b, 1-14b, and the aforesaid expression 1-15), in which the aforesaid expressions 1-13 and 1-14 are replaced by, for example, expressions 1-13b and 1-14b given below, respectively. The vehicle motion state quantity estimated value calculated by the vehicle motion estimator 24*d* includes Vgx_estm, Vgx_predict, Vgy_estm, Vgy_predict, γ_estm, γ_predict, Accx_sensor_estm, and Accy_sensor_estm in this embodiment (the 4A embodiment and the 4B embodiment).

$$Fgx\_total = m^*(Vgdot\_x - Vgy^* \gamma - g^* \sin(\theta slope)) \quad \text{Expression 1-13b}$$

$$Fgy\_total = m^*(Vgdot\_y + Vgx^* \gamma + g^* \sin(\theta bank)) \quad \text{Expression 1-14b}$$

Expression 1-13b is an expression obtained by adding an influence portion of the road surface slope angle θslope (the gravitational acceleration component in the longitudinal direction of the vehicle 1 caused by θslope) to the aforesaid expression 1-13, and expression 1-14b is an expression obtained by adding an influence portion of the road surface bank angle θbank (the gravitational acceleration component in the lateral direction of the vehicle 1 caused by θbank) to the aforesaid expression 1-14. Note that "g" denotes a gravitational acceleration constant.

The vehicle motion estimator 24 calculates the vehicle motion state quantity estimated value specifically as described below. The calculation processing of the yaw rate estimated value γ_estm among the vehicle motion state quantity estimated values is quite the same as that of the first embodiment and therefore the description thereof is omitted.

The vehicle motion estimator 24*d* calculates the vehicle center-of-gravity longitudinal speed change rate estimated value Vgdot_x_estm and the vehicle center-of-gravity skid speed change rate estimated value Vgdot_y_estm according to expression 1-13c given below, which is derived from the aforesaid expression 1-13b, and expression 1-14c given below, which is derived from the aforesaid expression 1-14b, in place of the aforesaid expressions 1-13a and 1-14a.

$$Vgdot\_x\_estm = Fgx\_total\_estm/m + Vgy\_predict\_p^*$$
$$\gamma\_estm\_p + g^* \sin(\theta slope\_estm\_p) \quad \text{Expression 1-13c}$$

$$Vgdot\_y\_estm = Fy\_total\_estm/m - Vgx\_estm\_p^*$$
$$\gamma\_estm\_p - g^* \sin(\theta bank\_estm\_p) \quad \text{Expression 1-14c}$$

In this case, Fx_total_estm and Fy_total_estm required for the computation of expressions 1-13 c and 1-14c are the current values calculated by the resultant force calculator 24*c* in S112 of FIG. 4, Vgx_estm_p, Vgy_predict_p, and γ_estm_p are the previous values calculated by the vehicle motion estimator 24*d* in the previous arithmetic processing cycle, and θslope_estm_p and θbank_estm_p are the previous values calculated by the slope angle estimating means 30 and the bank angle estimating means 28, respectively, in the previous arithmetic processing cycle. In addition, the value of m is a predetermined value set beforehand.

In addition, the current value or the previous value of the yaw rate detected value γ_sens may be used in place of γ_estm_p. Furthermore, the previous value or the current value of the selected wheel speed detected value Vw_i_sens select may be used in place of Vgx_estm_p.

Then, the vehicle motion estimator 24*d* finds the vehicle center-of-gravity longitudinal speed model estimated value Vgx_predict and the vehicle center-of-gravity longitudinal speed estimated value Vgx_estm in the same method as in the first embodiment by using Vgdot_x_estm, which has found as described above. In other words, Vgx_estm is found by performing the arithmetic processing of the aforesaid expressions 1-18, 1-22, and 1-23. The vehicle center-of-gravity longitudinal speed model estimated value Vgx_predict and the vehicle center-of-gravity longitudinal speed estimated value Vgx_estm may be agreed with the selected wheel speed detected value Vw_i_sens select.

Moreover, the vehicle motion estimator 24*d* finds the vehicle center-of-gravity skid speed model estimated value Vgy_predict in the same method as in the first embodiment by using Vgdot_y_estm, which has found as described above. In other words, Vgy_predict is found according to the aforesaid expression 1-19 (by the integral computation of Vgdot_y_estm).

Further, in this embodiment (the 4A embodiment and the 4B embodiment), the vehicle motion estimator 24*d* calculates the sensed-by-sensor longitudinal acceleration estimated value Accx_sensor_estm, which is the estimated value of acceleration sensed by the longitudinal acceleration sensor 14, and the sensed-by-sensor lateral acceleration estimated value Accy_sensor_estm, which is the estimated value of acceleration sensed by the lateral acceleration sensor 15, according to expressions 1-51a and 1-52a given below, respectively.

Specifically, the vehicle motion estimator 24*d* calculates Accx_sensor_estm and Accy_sensor_estm by dividing each of the road surface reaction force resultant longitudinal force estimated value Fgx_total_estm (the current value) and the road surface reaction force resultant lateral force estimated value Fgy_total_estm (the current value), which have been calculated in S112, by the vehicle mass m.

$$Accx\_sensor\_estm = Fgx\_total\_estm/m \quad \text{Expression 1-51a}$$

$$Accy\_sensor\_estm = Fgy\_total\_estm/m \quad \text{Expression 1-52a}$$

In addition, a value obtained by subtracting the second term and the third term in the right side of the aforesaid expression 1-13c from the left side thereof may be calculated as Accx_sensor_estm, and a value obtained by subtracting the second term and the third term in the right side of the aforesaid expression 1-14c from the left side thereof may be calculated as Accy_sensor_estm. In other words, Accx_sensor_estm and Accy_sensor_estm may be calculated according to expressions 1-51b and 1-52b given below, respectively.

$$Accx\_sensor\_estm = Vgdot \times estm - Vgy\_estm\_p^*$$
$$\gamma\_estm\_p - g^* \sin(\theta slope\_estm\_p) \quad \text{Expression 1-51b}$$

$$Accy\_sensor\_estm = Vgdot\_y\_estm + Vgx\_estm\_p^*$$
$$\gamma\_estm\_p + g^* \sin(\theta bank\_estm\_p) \quad \text{Expression 1-52b}$$

Subsequently, as described below, the vehicle motion estimator 24*d* determines a value obtained by correcting the vehicle center-of-gravity skid speed model estimated value Vgy_predict as the vehicle center-of-gravity skid speed estimated value Vgy_estm.

Specifically, the vehicle motion estimator 24*d* calculates a deviation between the vehicle center-of-gravity lateral acceleration detected value Accy_sens, which has been obtained in the processing of S100, and the sensed-by-sensor lateral acceleration estimated value Accy_sensor_estm, which has been calculated according to the aforesaid expression 1-52a or 1-52b as described above, as the vehicle center-of-gravity lateral acceleration deviation Accy_err for the correction of the vehicle center-of-gravity skid speed model estimated value Vgy_predict. In other words, the vehicle motion estimator 24*d* calculates the vehicle center-of-gravity lateral acceleration deviation Accy_err for the correction of Vgy_predict according to expression 1-53 given below.

Accy_err=Accy_sens−Accy_sensor_estm    Expression 1-53

Supplementally, Accy_sens is the detected value of an actual sensed-by-sensor lateral acceleration Accy_sensor_act (=Vgdot_y_act+Vgx_act*γ_act+g*sin(θbank_estm_p)). Therefore, in a state where the second term in the right side of the aforesaid expression 1-52b, i.e., the estimated value of the lateral acceleration component of the center-of-gravity point of the vehicle 1 caused by a centrifugal force from a turning motion of the vehicle 1 agrees or substantially agrees with the actual value of the acceleration component (=Vgx_act*γ_act) and θbank_estm_p in the third term of the right side of expression 1-52b agrees or substantially agrees with the actual road surface bank angle θbank_act, the aforesaid vehicle center-of-gravity lateral acceleration deviation Accy_err corresponds to an error (=Vgdot_y_act−Vgdot_y_estm) of the vehicle center-of-gravity skid speed change rate estimated value Vgdot_y_estm (the estimated value on the vehicle motion model), which has been calculated according to the aforesaid expression 1-14c to the actual vehicle center-of-gravity skid speed change rate Vgdot_y_act.

Subsequently, the vehicle motion estimator 24d determines the vehicle center-of-gravity skid speed estimated value Vgy_estm by correcting the vehicle center-of-gravity skid speed model estimated value Vgy_predict, which has been calculated according to the aforesaid expression 1-19. This correction method differs between the 4A embodiment and the 4B embodiment.

Describing this in more detail, in the 4A embodiment in which γdot_sens is not input to the vehicle motion estimator 24d, the vehicle motion estimator 24d determines a value obtained by correcting Vgy_predict according to Accy_err as the vehicle center-of-gravity skid speed estimated value Vgy_estm in the same method as in the first embodiment (by performing the same processing as the processing illustrated in the block diagram of FIG. 10(a)) on the basis of the vehicle center-of-gravity lateral acceleration deviation Accy_err, which has been calculated according to the aforesaid expression 1-53, and the vehicle center-of-gravity skid speed model estimated value Vgy_predict, which has been calculated according to the aforesaid expression 1-19.

Figure 10B:
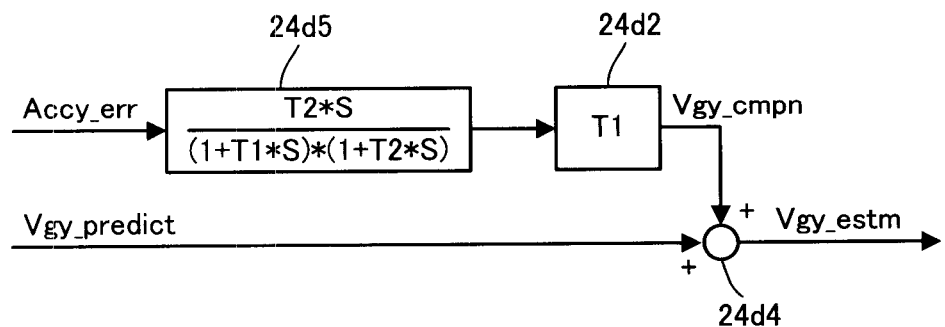

The vehicle center-of-gravity skid speed estimated value Vgy_estm may be determined by performing the processing illustrated in the block diagram of FIG. 10(b).

Moreover, in the 4B embodiment in which γdot_sens is input to the vehicle motion estimator 24d, the vehicle motion estimator 24d calculates the yaw angular acceleration deviation γdot_err by performing the processing of S114-7 and S114-8 in FIG. 14 similarly to the second embodiment.

Then, the vehicle motion estimator 24d determines a value obtained by correcting Vgy_predict according to Accy_err and γdot_err as the vehicle center-of-gravity skid speed estimated value Vgy_estm in the same method as in the second embodiment (by performing the same processing as the processing illustrated in the block diagram of FIG. 15).

In addition, the processing of the flowchart in FIG. 16 may be performed in place of the processing within the dashed-line frame in FIG. 15.

The processing of the vehicle motion estimator 24d in this embodiment (the 4A embodiment and the 4B embodiment) is the same as that in the first or second embodiment except the matters described hereinabove.

Subsequently, the processing of the bank angle estimating means 28 and the processing of the slope angle estimating means 30 in this embodiment (the 4A embodiment and the 4B embodiment) are performed as illustrated in the flowchart of FIG. 19 and the flowchart of FIG. 20, respectively. The processing of the bank angle estimating means 28 and the processing of the slope angle estimating means 30 are the same in both of the 4A embodiment and the 4B embodiment.

Here, the sensed-by-sensor longitudinal acceleration estimated value Accx_sensor_estm, which is found as described above by the vehicle model computing means 24, carries a meaning of a sensed-by-sensor longitudinal acceleration estimated value that is found on the assumption that the previous value (the latest value) of the road surface slope angle estimated value θslope_estm_p is accurate.

Similarly, Accy_sensor_estm, which is found as described above by the vehicle model computing means 24, carries a meaning of a sensed-by-sensor lateral acceleration estimated value that is found on the assumption that the previous value (the latest value) of the road surface bank angle estimated value θbank_estm_p is accurate.

Therefore, it is conceivable that the deviation between the vehicle center-of-gravity longitudinal acceleration detected value Accx_sens based on the output of the longitudinal acceleration sensor 14 (=sensed-by-sensor longitudinal acceleration detected value) and the sensed-by-sensor longitudinal acceleration estimated value Accx_sensor_estm corresponds to the error of θslope_estm_p.

Similarly, it is conceivable that the deviation between the vehicle center-of-gravity lateral acceleration detected value Accy_sens based on the output of the lateral acceleration sensor 15 (=sensed-by-sensor lateral acceleration detected value) and the sensed-by-sensor lateral acceleration estimated value Accy_sensor_estm corresponds to the error of θbank_estm_p.

Therefore, in this embodiment, the bank angle estimating means 28 finds a new road surface bank angle estimated value θbank_estm by updating the road surface bank angle estimated value θbank_estm according to the deviation between the vehicle center-of-gravity lateral acceleration detected value Accy_sens and the sensed-by-sensor lateral acceleration estimated value Accy_sensor_estm so as to converge the deviation to zero according to a feedback control law.

Similarly, the slope angle estimating means 30 finds a new road surface slope angle estimated value θslope_estm by updating the road surface slope angle estimated value θslope_estm according to the deviation between the vehicle center-of-gravity longitudinal acceleration detected value Accx_sens and the sensed-by-sensor longitudinal acceleration estimated value Accx_sensor_estm so as to converge the deviation to zero according to a feedback control law.

Specifically, with reference to FIG. 19, the bank angle estimating means 28, first in S120-1, calculates the sensed-by-sensor lateral acceleration deviation Accy_sensor_err (=Accy_sens−Accy_sensor_estm), which is a deviation between the vehicle center-of-gravity lateral acceleration detected value Accy_sens input from the quantity-to-be-observed detecting means 22 and the sensed-by-sensor lateral acceleration estimated value Accy_sensor_estm input from the vehicle model computing means 24.

Subsequently in S120-2, the bank angle estimating means 28 calculates the bank angle increasing/decreasing manipulated variable Δθbank, which is the increasing/decreasing manipulated variable of the road surface bank angle estimated value θbank_estm according to a feedback control law from the sensed-by-sensor lateral acceleration deviation Accy_sensor_err. In this case, in this embodiment, a proportional law is used as the aforesaid feedback control law and Δθbank is calculated by multiplying Accy_sensor_err by a preset gain Kbank having a predetermined value.

Subsequently in S120-3, the bank angle estimating means 28 calculates a new road surface bank angle estimated value θbank_estm (the current value) by updating the previous value θbank_estm_p of the road surface bank angle estimated value on the basis of the aforesaid bank angle increasing/decreasing manipulated variable Δθbank (by adding the aforesaid bank angle increasing/decreasing manipulated variable Δθbank to θbank_estm_p).

Therefore, in other words, the bank angle estimating means 28 in this embodiment determines a new road surface bank angle estimated value θbank_estm according to expression 1-33 given below.

$$\theta bank\_estm = \theta bank\_estm\_p + Kbank*(Accy\_sens - Accy\_sensor\_estm) \quad \text{Expression 1-33}$$

In addition, referring to FIG. 20, the slope angle estimating means 30, first in S120-11, calculates a sensed-by-sensor longitudinal acceleration deviation Accx_sensor_err (=Accx_sens−Accx_sensor_estm), which is a deviation between the vehicle center-of-gravity longitudinal acceleration detected value Accx_sens input from the quantity-to-be-observed detecting means 22 and the sensed-by-sensor longitudinal acceleration estimated value Accx_sensor_estm input from the vehicle model computing means 24.

Subsequently in S120-12, the slope angle estimating means 30 calculates a slope angle increasing/decreasing manipulated variable Δθslope, which is an increasing/decreasing manipulated variable of the road surface slope angle estimated value θslope_estm according to the feedback control law from the sensed-by-sensor longitudinal acceleration deviation Accx_sensor_err.

In this case, in this embodiment (the 4A embodiment and the 4B embodiment), a proportional law is used as the aforesaid feedback control law and Δθslope is calculated by multiplying Accx_sensor_err by a preset gain Kslope having a predetermined value.

Subsequently in S120-13, the slope angle estimating means 30 calculates a new road surface slope angle estimated value θbank_estm (the current value) by updating the previous value θslope_estm_p of the road surface slope angle estimated value on the basis of the aforesaid slope angle increasing/decreasing manipulated variable Δθslope (by adding the aforesaid slope angle increasing/decreasing manipulated variable Δθslope to θslope_estm_p).

Therefore, in other words, the slope angle estimating means 30 in this embodiment determines a new road surface slope angle estimated value θslope_estm according to expression 1-34 given below.

$$\theta slope\_estm = \theta slope\_estm\_p + Kslope*(Accx\_sens - Accx\_sensor\_estm) \quad \text{Expression 1-34}$$

The above has described the details of this embodiment (the 4A embodiment and the 4B embodiment). This embodiment is also able to provide the same effects as the first or second embodiment.

The correspondence between this embodiment (the 4A embodiment and the 4B embodiment) and the present invention will be additionally described here. The 4A embodiment corresponds to the first aspect of the present invention. In the 4A embodiment, the vehicle model computing means in the present invention is implemented by the processing of the vehicle model computing means 24 similarly to the first embodiment. In this case, the vehicle model in the present invention is implemented by the arithmetic processing, in which expressions 1-13, 1-14, 1-13a, and 1-14a in the arithmetic processing of expressions 1-1 to 1-24 in the first embodiment are replaced by the aforesaid expressions 1-13b, 1-14b, 1-13c, and 1-14c, in this embodiment.

Moreover, similarly to the first embodiment, the predetermined position actual lateral acceleration detecting means in the present invention is implemented by the lateral acceleration sensor 14 and the lateral acceleration detecting means 22f of the quantity-to-be-observed detecting means 22.

Further, in the 4A embodiment, the lateral acceleration model value computing means, the lateral acceleration deviation computing means, and the skid motion state quantity estimated value determining means in the present invention are implemented by a part of the processing of the vehicle motion estimator 24d.

More specifically, the lateral acceleration model value computing means is implemented by the processing of the resultant force calculator 24c (the processing of S112) and the processing of calculating the sensed-by-sensor lateral acceleration estimated value Accy_sensor_estm according to the aforesaid expression 1-52a or 1-52b. In this case, the aforesaid value Accy_sensor_estm corresponds to the predetermined position lateral acceleration model value in the present invention.

Further, the lateral acceleration deviation computing means is implemented by the processing of calculating the vehicle center-of-gravity lateral acceleration deviation Accy_err according to the aforesaid expression 1-53. In this case, the aforesaid value Accy_err corresponds to the lateral acceleration deviation in the present invention.

Moreover, the skid motion state quantity estimated value determining means is implemented in quite the same manner as in the first embodiment by the same processing as the processing illustrated in the block diagram of FIG. 10(a) (or FIG. 10(b)) in the first embodiment.

Subsequently, regarding the correspondence between the 4B embodiment and the present invention, the 4B embodiment corresponds to the fifth aspect of the present invention. In the 4B embodiment, the vehicle model computing means in the present invention is implemented by the processing of the vehicle model computing means 24 similarly to the second embodiment. In this case, however, the vehicle model in the present invention is implemented by the arithmetic processing, in which expressions 1-13, 1-14, 1-13a, and 1-14a in the arithmetic processing of expressions 1-1 to 1-24 in the first embodiment are replaced by the aforesaid expressions 1-13b, 1-14b, 1-13c, and 1-14c, in this embodiment. The correspondence between the 4B embodiment and the present invention is the same as the correspondence between the second embodiment and the present invention except the above.

In the 4B embodiment, the vehicle center-of-gravity skid speed estimated value Vgy_estm is not fed back to the calculation processing of the vehicle center-of-gravity skid speed model estimated value Vgy_predict in the same manner as the second embodiment. In the same manner as the third embodiment, however, Vgy_estm may be fed back to the calculation processing of the vehicle center-of-gravity skid speed model estimated value Vgy_predict.

In this case, expressions 1-2a and expression 1-19a, which have been described in the third embodiment, may be used in place of expression 1-2 and expression 1-19 in the second embodiment, in addition to using an expression in which Vgy_predict_p in the right side of the aforesaid expression 1-13c in this embodiment (the 4B embodiment) is replaced by the previous value Vgy_estm_p of the vehicle center-of-gravity skid speed estimated value.

[Modifications]

The following describes some modifications of the first to fourth embodiments described hereinabove.

In the first to fourth embodiments described above, the skid motion state quantity of the vehicle has been described taking a case where the vehicle center-of-gravity skid speed Vgy is estimated for example. Alternatively, the vehicle center-of-gravity skid angle βg may be estimated in addition to or in place of the vehicle center-of-gravity skid speed Vgy.

Moreover, in the above-described embodiments, the position of the center-of-gravity point of the vehicle 1 has been used as the predetermined position of the vehicle in the present invention. Alternatively, a position different from the center-of-gravity point (for example, the central position on the axle of the front wheels 2-1 and 2-2, the central position on the axle of the rear wheels 2-3 and 2-4, or the like) may be used as the predetermined position of the vehicle in the present invention, and the skid speed or the skid angle in the position may be estimated as the skid motion state quantity.

Moreover, in the aforesaid embodiments, the road surface friction coefficient μ has been estimated in the aforesaid method while estimating the vehicle motion state quantity such as the vehicle center-of-gravity skid speed Vgy or the like. Alternatively, the road surface friction coefficient μ may be estimated in an arbitrary known method, which is different from that of the aforesaid embodiments.

Moreover, the aforesaid embodiments have been described taking an example that the road surface friction coefficient μ is estimated on the basis of the road surface reaction force, which has been estimated by using the vehicle center-of-gravity skid speed model estimated value Vgy_predict. In the estimation processing of the road surface friction coefficient μ, however, the road surface friction coefficient μ may be estimated on the basis of the road surface reaction force, which has been estimated by using the vehicle center-of-gravity skid speed estimated value Vgy_estm. Alternatively, the road surface friction coefficient μ may be estimated by estimation processing not requiring the estimated value of the skid motion state quantity of the vehicle 1 or the estimation processing of the road surface friction coefficient μ may be omitted.

Further, in a case of using an estimated value of the skid motion state quantity of the vehicle 1, for example, for the estimation processing of the road surface friction coefficient μ and for the control processing of the skid motion state quantity of the vehicle 1, each estimated value of the skid motion state quantity to be used for the above does not need to be the same. For example, the vehicle center-of-gravity skid speed estimated value Vgy_estm may be used for one of the above estimation processing and control processing, while the vehicle center-of-gravity skid speed model estimated value Vgy_predict may be used for the other of the above estimation processing and control processing.

Further, in the aforesaid embodiments, the driving/braking force estimated value Fsubx_i_estm and the lateral force estimated value Fsuby_i_estm of each wheel 2-i have been found as road surface reaction forces acting on the wheel 2-i to estimate the skid motion state quantity of the vehicle 1 on the basis of these estimated values. The skid motion of the vehicle 1, however, is highly dependent on the lateral force out of the lateral force and the driving/braking force of each wheel 2-i.

Therefore, when estimating the skid motion state quantity of the vehicle 1 by the vehicle motion estimator 24d, only the lateral translational force acting on the center-of-gravity point of the vehicle 1 due to the resultant force of the lateral force estimated values Fsuby_i_estm of the wheels 2-i (i=1, 2, 3, 4) may be regarded as the entire lateral external force (translational force) acting on the center-of-gravity point of the vehicle 1 to estimate the skid motion state quantity of the vehicle 1.

For example, the value of the lateral translational force acting on the center-of-gravity point of the vehicle 1 due to the resultant force of the lateral force estimated values Fsuby_i_estm of the wheels 2-i (i=1, 2, 3, 4) is found as the total road surface reaction force resultant lateral force estimated values Fgy_total_estm. Then, the computation of the aforesaid expression 1-14a is performed by using the Fgy_total_estm to find a vehicle center-of-gravity skid speed change rate estimated value Vgdot_y_estm, and the obtained Vgdot_y_estm is integrated to find the vehicle center-of-gravity skid speed model estimated value Vgy_predict.

The invention claimed is:

1. A device for estimating a state quantity of a skid motion of a vehicle, the device sequentially estimating a value of a skid motion state quantity with a skid angle or a skid speed in a predetermined position of the vehicle defined as the skid motion state quantity to be estimated and the device comprising:

a vehicle model computing element, which finds road surface reaction force model values, each of which is a value of a road surface reaction force including at least a lateral force out of the road surface reaction force acting on each wheel of the vehicle from a road surface on a vehicle model, by performing arithmetic processing of the vehicle model while inputting an observed value of a predetermined type of quantity to be observed related to a behavior of an actual vehicle, which is required to identify at least a slip of the wheel of the vehicle on the vehicle model, into the vehicle model by using the vehicle model, which includes a friction characteristic model representing a relationship between the slip between the wheel of the vehicle and the road surface and the road surface reaction force acting on the wheel from the road surface and represents the dynamics of the vehicle, and which finds a skid motion state quantity model value, which is a value of the skid motion state quantity generated in the vehicle on the vehicle model due to a resultant force of the road surface reaction force model values;

a predetermined position actual lateral acceleration detecting element, which includes at least a lateral acceleration sensor sensing actual acceleration in the lateral direction of the vehicle and generates an output based on predetermined position actual lateral acceleration, which is the actual acceleration in the lateral direction in the predetermined position of the vehicle;

a lateral acceleration model value computing element, which finds a predetermined position lateral acceleration model value, which is a value of the acceleration in the lateral direction of the vehicle generated in the predetermined position of the vehicle on the vehicle model by the resultant force of the road surface reaction force model values, by using the road surface reaction force model values;

a lateral acceleration deviation computing element, which finds a lateral acceleration deviation, which is a deviation between a detected value of the predetermined position actual lateral acceleration indicated by the output from the predetermined position actual lateral acceleration detecting element and the predetermined position lateral acceleration model value;

a yaw angular acceleration detecting element, which generates an output based on angular acceleration about a predetermined yaw axis of the actual vehicle;

a yaw angular acceleration model value computing element, which finds a yaw angular acceleration model value, which is a value of the angular acceleration generated about the predetermined yaw axis of the vehicle on the vehicle model by the resultant force of the road surface reaction force model values, by using the road surface reaction force model values;

a yaw acceleration deviation computing element, which finds a yaw angular acceleration deviation, which is a deviation between a detected value of angular acceleration indicated by the output from the yaw angular acceleration detecting element and the yaw angular acceleration model value; and a skid motion state Quantity estimated value determining element, which determines a value obtained by correcting the skid motion state quantity model value according to the lateral acceleration deviation and the yaw angular acceleration deviation, as an estimated value of the skid motion state quantity of the actual vehicle, wherein:

the vehicle model computing element includes an element which sequentially finds a new value of the skid motion state quantity model value by using the road surface reaction force model values and a past calculated value of the skid motion state quantity model value;

the skid motion state quantity estimated value determining element includes:

a linear-combined value calculating element, which finds a linear-combined value ($\alpha1*A+\alpha2*B$) obtained by linearly combining two weighting factors ($\alpha1$) and ($\alpha2$) by which the lateral acceleration deviation (A) and the yaw angular acceleration deviation (B) are multiplied, respectively;

a correction basic value determining element, which determines a basic value of a correction manipulated variable for use in correcting the skid motion state quantity model value; and a correction computing element, which determines a value obtained by adding the correction manipulated variable to the skid motion state quantity model value as an estimated value of the skid motion state quantity of the actual vehicle by using a value obtained by passing the basic value through a first filter having a high-cut characteristic or a value obtained by passing the basic value through the first filter and a gain multiplication element, which multiplies an input value by a gain having a predetermined value, as the correction manipulated variable;

the two weighting factors ($\alpha1$) and ($\alpha2$) in the linear-combined value ($\alpha1*A+\alpha2B$)are set, on the assumption that the left direction in a state of facing forward of the vehicle is defined as the positive direction of lateral acceleration of the vehicle and the counterclockwise direction viewed from the above of the vehicle is defined as the positive direction of angular acceleration about the yaw axis of the vehicle, so that the two weighting factors ($\alpha1$) and ($\alpha2$) have mutually the same polarity in the case where the neutral steer point (hereinafter, referred to as "NSP") of the actual vehicle lies on a rear side beyond the center of gravity of the vehicle and so that the two weighting factors ($\alpha1$) and ($\alpha2$) have polarities different from each other in the case where the NSP lies on a front side beyond the center of gravity of the vehicle; and the correction basic value determining element determines the basic value to be zero in the case where the linear-combined value ($\alpha1*A+\alpha2*B$) has a different polarity from the term ($\alpha1*A$) including the lateral acceleration deviation (A) in the linear-combined value and determines the basic value to be a value closer to zero out of the linear-combined value ($\alpha1*A+\alpha2*B$) and the lateral acceleration deviation (A) in the case where the linear-combined value ($\alpha1*A+\alpha2*B$) has the same polarity as the term ($\alpha1*A$) including the second filtering value (A).

2. The device for estimating the state quantity of the skid motion of the vehicle according to claim 1, wherein the predetermined position of the vehicle is the position of the center of gravity of the vehicle.

3. The device for estimating the state quantity of the skid motion of the vehicle according to claim 1, wherein a gain having the predetermined value is set to a value equal to a time constant, which defines a cutoff frequency on the high-frequency side in the high-cut characteristic of the filter.

4. A device for estimating a state quantity of a skid motion of a vehicle, the device sequentially estimating a value of a skid motion state quantity with a skid angle or a skid speed in a predetermined position of the vehicle defined as the skid motion state quantity to be estimated and the device comprising:

a vehicle model computing element, which finds road surface reaction force model values, each of which is a value of a road surface reaction force including at least a lateral force out of the road surface reaction force acting on each wheel of the vehicle from a road surface on a vehicle model, by performing arithmetic processing of the vehicle model while inputting an observed value of a predetermined type of quantity to be observed related to a behavior of an actual vehicle, which is required to identify at least a slip of the wheel of the vehicle on the vehicle model, into the vehicle model by using the vehicle model, which includes a friction characteristic model representing a relationship between the slip between the wheel of the vehicle and the road surface and the road surface reaction force acting on the wheel from the road surface and represents the dynamics of the vehicle, and which finds a skid motion state quantity model value, which is a value of the skid motion state quantity generated in the vehicle on the vehicle model due to a resultant force of the road surface reaction force model values;

a predetermined position actual lateral acceleration detecting element, which includes at least a lateral acceleration sensor sensing actual acceleration in the lateral direction of the vehicle and generates an output based on predetermined position actual lateral acceleration, which is the actual acceleration in the lateral direction in the predetermined position of the vehicle;

a lateral acceleration model value computing element, which finds a predetermined position lateral acceleration model value, which is a value of the acceleration in the lateral direction of the vehicle generated in the predetermined position of the vehicle on the vehicle model by the resultant force of the road surface reaction force model values, by using the road surface reaction force model values;

a lateral acceleration deviation computing element, which finds a lateral acceleration deviation, which is a deviation between a detected value of the predetermined position actual lateral acceleration indicated by the output from the predetermined position actual lateral acceleration detecting element and the predetermined position lateral acceleration model value;

a yaw angular acceleration detecting element, which generates an output based on angular acceleration about a predetermined yaw axis of the actual vehicle;

a yaw angular acceleration model value computing element, which finds a yaw angular acceleration model value, which is a value of the angular acceleration generated about the predetermined yaw axis of the vehicle on the vehicle model by the resultant force of the road surface reaction force model values, by using the road surface reaction force model values;

a yaw acceleration deviation computing element, which finds a yaw angular acceleration deviation, which is a deviation between a detected value of angular acceleration indicated by the output from the yaw angular acceleration detecting element and the yaw angular acceleration model value; and a skid motion state quantity estimated value determining element, which determines a value obtained by correcting the skid motion state quantity model value according to the lateral acceleration deviation and the yaw angular acceleration deviation, as an estimated value of the skid motion state quantity of the actual vehicle, wherein:

the vehicle model computing element includes an element which sequentially finds a new value of the skid motion state quantity model value by using the road surface reaction force model values and a past calculated value of the skid motion state quantity model value;

the skid motion state quantity estimated value determining element includes:

a linear-combined value calculating element, which finds a linear-combined value ($\alpha1*A+\alpha2*B$) obtained by linearly combining two weighting factors ($\alpha1$) and ($\alpha2$) by which a second filtering value (A), which is obtained by passing the lateral acceleration deviation through a second filter having a low-cut characteristic, and a third filtering value (B), which is obtained by passing the yaw angular acceleration deviation through a third filter having a low-cut characteristic, are multiplied, respectively;

a correction basic value determining element, which determines a basic value of a correction manipulated variable for use in correcting the skid motion state quantity model value; and a correction computing element, which determines a value obtained by adding the correction manipulated variable to the skid motion state quantity model value as an estimated value of the skid motion state quantity of the actual vehicle by using a value obtained by passing the basic value through a first filter having a high-cut characteristic or a value obtained by passing the basic value through the first filter and a gain multiplication element, which multiplies an input value by a gain having a predetermined value, as the correction manipulated variable;

the two weighting factors ($\alpha1$) and ($\alpha2$) in the linear-combined value ($\alpha1*A+\alpha2*B$) are set, on the assumption that the left direction in a state of facing forward of the vehicle is defined as the positive direction of lateral acceleration of the vehicle and the counterclockwise direction viewed from the above of the vehicle is defined as the positive direction of angular acceleration about the yaw axis of the vehicle, so that the two weighting factors ($\alpha1$) and ($\alpha2$) have mutually the same polarity in the case where the neutral steer point (hereinafter, referred to as "NSP") of the actual vehicle lies on a rear side beyond the center of gravity of the vehicle and so that the two weighting factors ($\alpha1$) and ($\alpha2$) have polarities different from each other in the case where the NSP lies on a front side beyond the center of gravity of the vehicle; and the correction basic value determining element determines the basic value to be zero in the case where the linear-combined value ($\alpha1*A+\alpha2*B$) has a different polarity from the term ($\alpha1*A$) including the second filtering value (A) in the linear-combined value and determines the basic value to be a value closer to zero out of the linear-combined value ($\alpha1*A+\alpha2*B$) and the lateral acceleration deviation (A) in the case where the linear-combined value ($\alpha1*A+\alpha2*B$) has the same polarity as the term ($\alpha1*A$) including the second filtering value (A).

5. The device for estimating the state quantity of the skid motion of the vehicle according to claim 4, wherein the predetermined position of the vehicle is the position of the center of gravity of the vehicle.

6. The device for estimating the state quantity of the skid motion of the vehicle according to claim 4, wherein a gain having the predetermined value is set to a value equal to a time constant, which defines a cutoff frequency on the high-frequency side in the high-cut characteristic of the filter.

7. A device for estimating a state quantity of a skid motion of a vehicle, the device sequentially estimating a value of a skid motion state quantity with a skid angle or a skid speed in a predetermined position of the vehicle defined as the skid motion state quantity to be estimated and the device comprising:

a vehicle model computing element, which finds road surface reaction force model values, each of which is a value of a road surface reaction force including at least a lateral force out of the road surface reaction force acting on each wheel of the vehicle from a road surface on a vehicle model, by performing arithmetic processing of the vehicle model while inputting an observed value of a predetermined type of quantity to be observed related to a behavior of an actual vehicle, which is required to identify at least a slip of the wheel of the vehicle on the vehicle model, into the vehicle model by using the vehicle model, which includes a friction characteristic model representing a relationship between the slip between the wheel of the vehicle and the road surface and the road surface reaction force acting on the wheel from the road surface and represents the dynamics of the vehicle, and which finds a skid motion state quantity model value, which is a value of the skid motion state quantity generated in the vehicle on the vehicle model due to a resultant force of the road surface reaction force model values;

a predetermined position actual lateral acceleration detecting element, which includes at least a lateral acceleration sensor sensing actual acceleration in the lateral direction of the vehicle and generates an output based on predetermined position actual lateral acceleration, which is the actual acceleration in the lateral direction in the predetermined position of the vehicle;

a lateral acceleration model value computing element, which finds a predetermined position lateral acceleration model value, which is a value of the acceleration in the lateral direction of the vehicle generated in the predetermined position of the vehicle on the vehicle model by the resultant force of the road surface reaction force model values, by using the road surface reaction force model values;

a lateral acceleration deviation computing element, which finds a lateral acceleration deviation, which is a deviation between a detected value of the predetermined position actual lateral acceleration indicated by the output from the predetermined position actual lateral acceleration detecting element and the predetermined position lateral acceleration model value;

a yaw angular acceleration detecting element, which generates an output based on angular acceleration about a predetermined yaw axis of the actual vehicle;

a yaw angular acceleration model value computing element, which finds a yaw angular acceleration model value, which is a value of the angular acceleration generated about the predetermined yaw axis of the vehicle on the vehicle model by the resultant force of the road surface reaction force model values, by using the road surface reaction force model values;

a yaw acceleration deviation computing element, which finds a yaw angular acceleration deviation, which is a deviation between a detected value of angular acceleration indicated by the output from the yaw angular acceleration detecting element and the yaw angular acceleration model value; and a skid motion state quantity estimated value determining element, which determines a value obtained by correcting the skid motion state quantity model value according to the lateral acceleration deviation and the yaw angular acceleration deviation, as an estimated value of the skid motion state quantity of the actual vehicle, wherein:

the vehicle model computing element includes an element which sequentially finds a new value of the skid motion state quantity model value by using the road surface reaction force model values and a past calculated value of an estimated value of the skid motion state quantity;

the skid motion state quantity estimated value determining element includes:

a linear-combined value calculating element, which finds a linear-combined value ($\alpha1*A+\alpha2*B$) obtained by linearly combining two weighting factors ($\alpha1$) and ($\alpha2$) by which the lateral acceleration deviation (A) and the yaw angular acceleration deviation (B) are multiplied, respectively;

a correction basic value determining element, which determines a basic value of a correction manipulated variable for use in correcting the skid motion state quantity model value; and a correction computing element, which determines a value obtained by adding the correction manipulated variable to the skid motion state quantity model value as an estimated value of the skid motion state quantity of the actual vehicle by using the basic value or a value obtained by passing the basic value through a fourth filter having a low-cut characteristic as the correction manipulated variable;

the two weighting factors ($\alpha1$) and ($\alpha2$) in the linear-combined value ($\alpha1*A+\alpha2*B$) are set, on the assumption that the left direction in a state of facing forward of the vehicle is defined as the positive direction of lateral acceleration of the vehicle and the counterclockwise direction viewed from the above of the vehicle is defined as the positive direction of angular acceleration about the yaw axis of the vehicle, so that the two weighting factors ($\alpha1$) and ($\alpha2$) have mutually the same polarity in the case where the neutral steer point (hereinafter, referred to as "NSP") of the actual vehicle lies on a rear side beyond the center of gravity of the vehicle and so that the two weighting factors ($\alpha1$) and ($\alpha2$) have polarities different from each other in the case where the NSP lies on a front side beyond the center of gravity of the vehicle; and the correction basic value determining element determines the basic value to be zero in the case where the linear-combined value ($\alpha1*A+\alpha2*B$) has a different polarity from the term ($\alpha1*A$) including the lateral acceleration deviation (A) in the linear-combined value and determines the basic value to be a value closer to zero out of the linear-combined value ($\alpha1*A+\alpha2*B$) and the lateral acceleration deviation (A) in the case where the linear-combined value ($\alpha1*A+\alpha2*B$) has the same polarity as the term ($\alpha1*A$) including the lateral acceleration deviation (A).

8. The device for estimating the state quantity of the skid motion of the vehicle according to claim 7, wherein the predetermined position of the vehicle is the position of the center of gravity of the vehicle.

9. A device for estimating a state quantity of a skid motion of a vehicle, the device sequentially estimating a value of a skid motion state quantity with a skid angle or a skid speed in a predetermined position of the vehicle defined as the skid motion state quantity to be estimated and the device comprising:

a vehicle model computing element, which finds road surface reaction force model values, each of which is a value of a road surface reaction force including at least a lateral force out of the road surface reaction force acting on each wheel of the vehicle from a road surface on a vehicle model, by performing arithmetic processing of the vehicle model while inputting an observed value of a predetermined type of quantity to be observed related to a behavior of an actual vehicle, which is required to identify at least a slip of the wheel of the vehicle on the vehicle model, into the vehicle model by using the vehicle model, which includes a friction characteristic model representing a relationship between the slip between the wheel of the vehicle and the road surface and the road surface reaction force acting on the wheel from the road surface and represents the dynamics of the vehicle, and which finds a skid motion state quantity model value, which is a value of the skid motion state quantity generated in the vehicle on the vehicle model due to a resultant force of the road surface reaction force model values;

a predetermined position actual lateral acceleration detecting element, which includes at least a lateral acceleration sensor sensing actual acceleration in the lateral direction of the vehicle and generates an output based on predetermined position actual lateral acceleration, which is the actual acceleration in the lateral direction in the predetermined position of the vehicle;

a lateral acceleration model value computing element, which finds a predetermined position lateral acceleration model value, which is a value of the acceleration in the lateral direction of the vehicle generated in the predetermined position of the vehicle on the vehicle model by the resultant force of the road surface reaction force model values, by using the road surface reaction force model values;

a lateral acceleration deviation computing element, which finds a lateral acceleration deviation, which is a deviation between a detected value of the predetermined position actual lateral acceleration indicated by the output from the predetermined position actual lateral acceleration detecting element and the predetermined position lateral acceleration model value;

a yaw angular acceleration detecting element, which generates an output based on angular acceleration about a predetermined yaw axis of the actual vehicle;

a yaw angular acceleration model value computing element, which finds a yaw angular acceleration model value, which is a value of the angular acceleration generated about the predetermined yaw axis of the vehicle on the vehicle model by the resultant force of the road surface reaction force model values, by using the road surface reaction force model values;

a yaw acceleration deviation computing element, which finds a yaw angular acceleration deviation, which is a deviation between a detected value of angular acceleration indicated by the output from the yaw angular acceleration detecting element and the yaw angular acceleration model value; and a skid motion state quantity estimated value determining element, which determines a value obtained by correcting the skid motion state quantity model value according to the lateral acceleration deviation and the yaw angular acceleration deviation, as an estimated value of the skid motion state quantity of the actual vehicle, wherein:

the vehicle model computing element includes an element which sequentially finds a new value of the skid motion state quantity model value by using the road surface reaction force model values and a past calculated value of an estimated value of the skid motion state quantity;

the skid motion state quantity estimated value determining element includes:

a linear-combined value calculating element, which finds a linear-combined value ($\alpha 1*A+\alpha 2*B$) obtained by linearly combining two weighting factors ($\alpha 1$) and ($\alpha 2$) by which a fifth filtering value (A), which is obtained by passing the lateral acceleration deviation through a fifth filter having a low-cut characteristic, and a sixth filtering value (B), which is obtained by passing the yaw angular acceleration deviation through a sixth filter having a low-cut characteristic, are multiplied, respectively;

a correction basic value determining element, which determines a basic value of a correction manipulated variable for use in correcting the skid motion state quantity model value; and a correction computing element, which determines a value obtained by adding the correction manipulated variable to the skid motion state quantity model value as an estimated value of the skid motion state quantity of the actual vehicle by using the basic value or a value obtained by passing the basic value through a fourth filter having a low-cut characteristic as the correction manipulated variable;

the two weighting factors ($\alpha 1$) and ($\alpha 2$) in the linear-combined value ($\alpha 1*A+\alpha 2*B$) are set, on the assumption that the left direction in a state of facing forward of the vehicle is defined as the positive direction of lateral acceleration of the vehicle and the counterclockwise direction viewed from the above of the vehicle is defined as the positive direction of angular acceleration about the yaw axis of the vehicle, so that the two weighting factors ($\alpha 1$) and ($\alpha 2$) have mutually the same polarity in the case where the neutral steer point (hereinafter, referred to as "NSP") of the actual vehicle lies on a rear side beyond the center of gravity of the vehicle and so that the two weighting factors ($\alpha 1$) and ($\alpha 2$) have polarities different from each other in the case where the NSP lies on a front side beyond the center of gravity of the vehicle; and the correction basic value determining element determines the basic value to be zero in the case where the linear-combined value ($\alpha 1*A+\alpha 2*B$) has a different polarity from the term ($\alpha 1*A$) including the fifth filtering value (A) in the linear-combined value and determines the basic value to be a value closer to zero out of the linear-combined value ($\alpha 1*A+\alpha 2*B$) and the second filtering value (A) in the case where the linear-combined value ($\alpha 1*A+\alpha 2*B$) has the same polarity as the term ($\alpha 1*A$) including the fifth filtering value (A).

10. The device for estimating the state quantity of the skid motion of the vehicle according to claim 9, wherein the predetermined position of the vehicle is the position of the center of gravity of the vehicle.

* * * * *